United States Patent
Carlson et al.

(10) Patent No.: US 8,311,018 B2
(45) Date of Patent: *Nov. 13, 2012

(54) SYSTEM AND METHOD FOR OPTIMIZING LOCATION ESTIMATE OF MOBILE UNIT

(75) Inventors: John Carlson, Dulles, VA (US); Martin Alles, Vienna, VA (US); George Maher, Herndon, VA (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 1340 days.

This patent is subject to a terminal disclaimer.

(21) Appl. No.: 12/014,018

(22) Filed: Jan. 14, 2008

(65) Prior Publication Data

US 2008/0188242 A1 Aug. 7, 2008

Related U.S. Application Data

(60) Provisional application No. 60/899,379, filed on Feb. 5, 2007.

(51) Int. Cl.
*H04J 3/00* (2006.01)
(52) U.S. Cl. .................................. 370/336; 370/254
(58) Field of Classification Search .................. None
See application file for complete search history.

(56) References Cited

U.S. PATENT DOCUMENTS

| | | | |
|---|---|---|---|
| 3,150,372 A | 9/1964 | Groth, Jr. | |
| 3,659,085 A | 4/1972 | Potter et al. | |
| 4,728,959 A | 3/1988 | Maloney | |
| 4,814,751 A | 3/1989 | Hawkins | |
| 4,845,504 A | 7/1989 | Roberts et al. | |
| 4,891,650 A | 1/1990 | Sheffer | |
| 5,056,106 A | 10/1991 | Wang | |
| 5,218,618 A | 6/1993 | Sagey | |
| 5,317,323 A | 5/1994 | Kennedy et al. | |
| 5,327,144 A | 7/1994 | Stilp et al. | |
| 5,365,544 A | 11/1994 | Schilling | |

(Continued)

FOREIGN PATENT DOCUMENTS

EP 1471688 A 10/2004

(Continued)

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

(Continued)

*Primary Examiner* — Bunjob Jaroenchonwanit
(74) *Attorney, Agent, or Firm* — Duane Morris LLP

(57) ABSTRACT

The location of a wireless mobile device may be estimated using, at least in part, one or more pre-existing Network Measurement Reports ("NMRs") which include calibration data for a number of locations within a geographic region. The calibration data for these locations is gathered and analyzed so that particular grid points within the geographic region can be determined and associated with a particular set or sets of calibration data from, for example, one or more NMRs. Embodiments of the present subject matter also provide a method of improving a location estimate of a mobile device. Received signal level measurements reported by a mobile device for which a location estimate is to be determined may be evaluated and/or compared with the characteristics associated with the various grid points to estimate the location of the mobile device.

21 Claims, 41 Drawing Sheets

U.S. PATENT DOCUMENTS

| | | | | |
|---|---|---|---|---|
| 5,372,144 | A | 12/1994 | Mortier et al. | |
| 5,404,376 | A | 4/1995 | Dent | |
| 5,423,067 | A | 6/1995 | Manabe | |
| 5,465,289 | A | 11/1995 | Kennedy | |
| 5,506,863 | A | 4/1996 | Meidan et al. | |
| 5,506,864 | A | 4/1996 | Schilling | |
| 5,508,708 | A | 4/1996 | Ghosh et al. | |
| 5,512,908 | A | 4/1996 | Herrick | |
| 5,515,419 | A | 5/1996 | Sheffer | |
| 5,519,760 | A | 5/1996 | Borkowski et al. | |
| 5,559,864 | A | 9/1996 | Kennedy | |
| 5,592,180 | A | 1/1997 | Yokev et al. | |
| 5,608,410 | A | 3/1997 | Stilp et al. | |
| 5,614,914 | A | 3/1997 | Bolgiano et al. | |
| 5,668,374 | A * | 9/1997 | DiFoggio et al. | 250/339.12 |
| 5,675,344 | A | 10/1997 | Tong et al. | |
| 5,736,964 | A | 4/1998 | Ghosh et al. | |
| 5,815,538 | A | 9/1998 | Grell et al. | |
| 5,825,887 | A | 10/1998 | Lennen | |
| 5,870,029 | A | 2/1999 | Otto et al. | |
| 5,920,278 | A | 7/1999 | Tyler et al. | |
| 5,952,969 | A | 9/1999 | Hagerman et al. | |
| 5,959,580 | A | 9/1999 | Maloney et al. | |
| 5,960,341 | A | 9/1999 | LeBlanc et al. | |
| 5,973,643 | A | 10/1999 | Hawkes et al. | |
| 5,987,329 | A * | 11/1999 | Yost et al. | 455/456.1 |
| 6,014,102 | A | 1/2000 | Mitzlaff et al. | |
| 6,047,192 | A | 4/2000 | Maloney | |
| 6,091,362 | A | 7/2000 | Stilp | |
| 6,097,336 | A | 8/2000 | Stilp | |
| 6,097,959 | A * | 8/2000 | Yost et al. | 455/456.2 |
| 6,101,178 | A | 8/2000 | Beal | |
| 6,108,555 | A | 8/2000 | Maloney et al. | |
| 6,115,599 | A | 9/2000 | Stilp | |
| 6,119,013 | A | 9/2000 | Maloney et al. | |
| 6,127,975 | A | 10/2000 | Maloney | |
| 6,144,711 | A | 11/2000 | Raleigh et al. | |
| 6,172,644 | B1 | 1/2001 | Stilp | |
| 6,184,829 | B1 | 2/2001 | Stilp | |
| 6,188,351 | B1 | 2/2001 | Bloebaum | |
| 6,191,738 | B1 | 2/2001 | Pfeil et al. | |
| 6,201,499 | B1 | 3/2001 | Hawkes et al. | |
| 6,201,803 | B1 | 3/2001 | Munday et al. | |
| 6,212,319 | B1 | 4/2001 | Cayrefourcq | |
| 6,233,459 | B1 | 5/2001 | Sullivan et al. | |
| 6,246,884 | B1 | 6/2001 | Karmi et al. | |
| 6,266,013 | B1 | 7/2001 | Stilp et al. | |
| 6,281,834 | B1 | 8/2001 | Stilp | |
| 6,285,321 | B1 | 9/2001 | Stilp et al. | |
| 6,288,675 | B1 | 9/2001 | Maloney | |
| 6,288,676 | B1 | 9/2001 | Maloney | |
| 6,295,455 | B1 | 9/2001 | Fischer et al. | |
| 6,311,043 | B1 | 10/2001 | Haardt et al. | |
| 6,317,081 | B1 | 11/2001 | Stilp | |
| 6,317,604 | B1 | 11/2001 | Kovach, Jr. et al. | |
| 6,334,059 | B1 | 12/2001 | Stilp et al. | |
| 6,351,235 | B1 | 2/2002 | Stilp | |
| 6,366,241 | B2 | 4/2002 | Pack | |
| 6,388,618 | B1 | 5/2002 | Stilp et al. | |
| 6,400,320 | B1 | 6/2002 | Stilp et al. | |
| 6,407,703 | B1 | 6/2002 | Minter et al. | |
| 6,463,290 | B1 | 10/2002 | Stilp et al. | |
| 6,470,195 | B1 | 10/2002 | Meyer | |
| 6,477,161 | B1 | 11/2002 | Hudson | |
| 6,483,460 | B2 | 11/2002 | Stilp et al. | |
| 6,492,944 | B1 | 12/2002 | Stilp | |
| 6,501,955 | B1 | 12/2002 | Durrant et al. | |
| 6,519,465 | B2 | 2/2003 | Stilp et al. | |
| 6,546,256 | B1 | 4/2003 | Maloney | |
| 6,553,322 | B1 | 4/2003 | Ignagni | |
| 6,563,460 | B2 | 5/2003 | Stilp et al. | |
| 6,564,065 | B1 * | 5/2003 | Chang et al. | 455/457 |
| 6,571,082 | B1 | 5/2003 | Rahman | |
| 6,603,428 | B2 | 8/2003 | Stilp | |
| 6,603,761 | B1 | 8/2003 | Wang | |
| 6,640,106 | B2 | 10/2003 | Gutowski et al. | |
| 6,646,604 | B2 | 11/2003 | Anderson | |
| 6,661,379 | B2 | 12/2003 | Stilp et al. | |
| 6,765,531 | B2 | 7/2004 | Anderson | |
| 6,771,625 | B1 | 8/2004 | Beal | |
| 6,771,969 | B1 | 8/2004 | Chinoy | |
| 6,782,264 | B2 | 8/2004 | Anderson | |
| 6,834,234 | B2 | 12/2004 | Scherzinger et al. | |
| 6,839,539 | B2 | 1/2005 | Durrant et al. | |
| 6,845,240 | B2 | 1/2005 | Carlson et al. | |
| 6,859,172 | B2 | 2/2005 | Powers et al. | |
| 6,871,077 | B2 | 3/2005 | Kennedy | |
| 6,873,290 | B2 | 3/2005 | Anderson et al. | |
| 6,876,859 | B2 | 4/2005 | Anderson et al. | |
| 6,920,329 | B2 | 7/2005 | Kennedy, Jr. et al. | |
| 6,922,170 | B2 | 7/2005 | Alexander, Jr. | |
| 6,952,158 | B2 | 10/2005 | Kennedy, Jr. | |
| 6,987,979 | B2 | 1/2006 | Carlsson | |
| 6,996,392 | B2 | 2/2006 | Anderson | |
| 7,023,383 | B2 | 4/2006 | Stilp et al. | |
| 7,167,713 | B2 | 1/2007 | Anderson | |
| 7,257,411 | B2 * | 8/2007 | Gwon et al. | 455/456.1 |
| 7,260,408 | B2 * | 8/2007 | Friday et al. | 455/456.1 |
| 7,271,765 | B2 | 9/2007 | Stilp et al. | |
| 7,340,259 | B2 | 3/2008 | Maloney | |
| 7,427,952 | B2 | 9/2008 | Bull et al. | |
| 7,437,917 | B1 * | 10/2008 | McNaughton et al. | 73/121 |
| 7,440,762 | B2 | 10/2008 | Maloney et al. | |
| 7,529,236 | B2 * | 5/2009 | Kota et al. | 370/386 |
| 7,593,738 | B2 | 9/2009 | Anderson | |
| 2002/0007336 | A1 * | 1/2002 | Robbins | 705/37 |
| 2002/0172223 | A1 | 11/2002 | Stilp et al. | |
| 2003/0016174 | A1 * | 1/2003 | Anderson | 342/378 |
| 2003/0064734 | A1 | 4/2003 | Stilp et al. | |
| 2003/0139188 | A1 | 7/2003 | Chen et al. | |
| 2003/0146871 | A1 * | 8/2003 | Karr et al. | 342/457 |
| 2003/0154044 | A1 | 8/2003 | Lundstedt et al. | 702/104 |
| 2003/0190919 | A1 * | 10/2003 | Niemenmaa | 455/456.1 |
| 2003/0203738 | A1 | 10/2003 | Brown et al. | |
| 2004/0043775 | A1 | 3/2004 | Kennedy, Jr. et al. | |
| 2004/0132466 | A1 | 7/2004 | Kennedy, Jr. et al. | |
| 2004/0152471 | A1 * | 8/2004 | MacDonald et al. | 455/456.1 |
| 2004/0193064 | A1 * | 9/2004 | Shusterman | 600/504 |
| 2004/0203921 | A1 | 10/2004 | Bromhead et al. | |
| 2004/0218664 | A1 | 11/2004 | Kennedy, Jr. et al. | |
| 2004/0219932 | A1 * | 11/2004 | Verteuil | 455/456.2 |
| 2004/0252752 | A1 | 12/2004 | Kennedy, Jr. et al. | |
| 2004/0266457 | A1 | 12/2004 | Dupray | |
| 2005/0040968 | A1 | 2/2005 | Damarla et al. | |
| 2005/0058182 | A1 | 3/2005 | Kennedy, Jr. et al. | |
| 2005/0078033 | A1 | 4/2005 | Tamaki et al. | |
| 2005/0112695 | A1 * | 5/2005 | Meyer | 435/7.1 |
| 2005/0136945 | A1 | 6/2005 | Kennedy, Jr. et al. | |
| 2005/0164712 | A1 | 7/2005 | Kennedy, Jr. et al. | |
| 2005/0176442 | A1 | 8/2005 | Ju et al. | |
| 2005/0192026 | A1 | 9/2005 | Carlson et al. | |
| 2005/0216207 | A1 * | 9/2005 | Kermani | 702/20 |
| 2005/0243936 | A1 | 11/2005 | Agrawala et al. | |
| 2005/0255865 | A1 * | 11/2005 | Sillasto et al. | 455/456.5 |
| 2005/0266855 | A1 * | 12/2005 | Zeng et al. | 455/456.1 |
| 2006/0003695 | A1 | 1/2006 | Kennedy, Jr. et al. | |
| 2006/0003775 | A1 | 1/2006 | Bull et al. | |
| 2006/0030333 | A1 | 2/2006 | Ward et al. | |
| 2006/0116130 | A1 * | 6/2006 | Kennedy, Jr. et al. | 455/456.1 |
| 2006/0125695 | A1 | 6/2006 | Kennedy, Jr. et al. | |
| 2006/0141998 | A1 | 6/2006 | Kennedy, Jr. et al. | |
| 2006/0154607 | A1 | 7/2006 | Kennedy, Jr. et al. | |
| 2006/0240836 | A1 | 10/2006 | Kennedy, Jr. et al. | |
| 2006/0240843 | A1 | 10/2006 | Spain et al. | |
| 2006/0242706 | A1 * | 10/2006 | Ross | 726/23 |
| 2007/0087689 | A1 | 4/2007 | Kennedy, Jr. et al. | |
| 2007/0103363 | A1 * | 5/2007 | Boiero et al. | 342/357.1 |
| 2007/0111746 | A1 * | 5/2007 | Anderson | 455/522 |
| 2007/0155401 | A1 | 7/2007 | Ward et al. | |
| 2007/0155489 | A1 | 7/2007 | Beckley et al. | |
| 2007/0202885 | A1 | 8/2007 | Kennedy, Jr. et al. | |
| 2007/0234102 | A1 * | 10/2007 | Fan et al. | 714/4 |
| 2008/0084298 | A1 * | 4/2008 | King | 340/540 |
| 2008/0132244 | A1 | 6/2008 | Anderson et al. | |
| 2008/0132247 | A1 | 6/2008 | Anderson et al. | |
| 2008/0137524 | A1 | 6/2008 | Anderson et al. | |
| 2008/0158059 | A1 | 7/2008 | Bull et al. | |

| | | | |
|---|---|---|---|
| 2008/0160952 A1 | 7/2008 | Bull et al. | |
| 2008/0160953 A1* | 7/2008 | Mia et al. | 455/404.2 |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2010/0222081 A1* | 9/2010 | Ward et al. | 455/456.3 |
| 2010/0227626 A1* | 9/2010 | Dressler et al. | 455/456.1 |
| 2011/0287783 A1* | 11/2011 | Alizadeh-Shabdiz et al. | 455/456.1 |

FOREIGN PATENT DOCUMENTS

| | | |
|---|---|---|
| JP | 06-347529 | 12/1994 |
| WO | 0034799 A1 | 6/2000 |
| WO | 02082832 A | 10/2002 |
| WO | 2006088472 A1 | 8/2006 |

OTHER PUBLICATIONS

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. Macnaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7; Jul. 1989, pp. 996-1000.

B. Yang, "Projection Approximation Subspace Tracking," IEEE Transactions on Signal Processing, vol. 43, No. 1, Jan. 1995, pp. 95-107.

* cited by examiner

SYSTEM AND METHOD FOR OPTIMIZING LOCATION ESTIMATE OF MOBILE UNIT

CROSS REFERENCE TO RELATED APPLICATIONS

The present application claims priority benefit to and hereby incorporates by reference in its entirety U.S. Provisional Patent Application Ser. No. 60/899,379 filed on 5 Feb. 2007.

BACKGROUND

The present subject matter is directed generally towards a system and method for estimating the location of a wireless mobile device that is in communication with a wireless communications network. More specifically, the present subject matter relates to the problem of estimating the location of a wireless mobile device using information from one or more Network Measurement Reports ("NMRs") which may be generated by a wireless communications network or the mobile device.

As is well known in the art, the use of wireless communication devices such as telephones, pagers, personal digital assistants, laptop computers, anti-theft devices, etc., hereinafter referred to collectively as "mobile devices", has become prevalent in today's society. Along with the proliferation of these mobile devices is the safety concern associated with the need to locate the mobile device, for example in an emergency situation. For example, the Federal Communication Commission ("FCC") has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911). In addition to E911 emergency related issues, there has been increased interest in technology which can determine the geographic position, or "geolocate" a mobile device. For example, wireless telecommunications providers are developing location-enabled services for their subscribers including roadside assistance, turn-by-turn driving directions, concierge services, location-specific billing rates and location-specific advertising.

Currently in the art, there are a number of different ways to geolocate a mobile device. For example, providers of wireless communication services have installed mobile device location capabilities into their networks. In operation, these network overlay location systems take measurements on radio frequency ("RF") transmissions from mobile devices at base station locations surrounding the mobile device and estimate the location of the mobile device with respect to the base stations. Because the geographic location of the base stations is known, the determination of the location of the mobile device with respect to the base station permits the geographic location of the mobile device to be determined. The RF measurements of the transmitted signal at the base stations can include the time of arrival, the angle of arrival, the signal power, or the unique/repeatable radio propagation path (radio fingerprinting) derivable features. In addition, the geolocation systems can also use collateral information, e.g., information other than that derived for the RF measurement to assist in the geolocation of the mobile device, i.e., location of roads, dead-reckoning, topography, map matching, etc.

In a network-based geolocation system, the mobile device to be located is typically identified and radio channel assignments determined by (a) monitoring the control information transmitted on radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider.

The monitoring of the RF transmissions from the mobile device or wireline interfaces to identify calls of interest is known as "tipping", and generally involves recognizing a call of interest being made from a mobile device and collecting the call setup information. Once the mobile device is identified and the call setup information is collected, the location determining system can be tasked to geolocate the mobile device.

While the above-described systems are useful in certain situations, there is a need to streamline the process in order to efficiently and effectively handle the vast amount of data being sent between the wireless communications network and the large number of mobile devices for which locations are to be determined. In this regard, the present subject matter overcomes the limitations of the prior art by estimating the location of a wireless mobile device using, at least in part, one or more pre-existing Network Measurement Reports ("NMRs") which include calibration data for a number of locations within a geographic region. The calibration data for these locations must be gathered and analyzed so that particular points (e.g., "grid points") within the geographic region can be determined and associated with a particular set or sets of calibration data from, for example, one or more NMRs. Then, the received signal level measurements reported by the mobile device to be geolocated may be compared with the data associated with the various grid points to estimate the location of the mobile device. The performance of a grid-based pattern matching system such as that disclosed herein is typically dependent on stored received signal level measurements that accurately reflect the levels that are likely to be reported by the mobile device to be located. These grid points do not necessarily have to be part of a uniform grid and usually will not be uniformly distributed throughout the geographic region. These non-uniform grid points ("NUGs"), once determined, can be assigned geographic coordinates so that the NUGs may be used in determining the location of a mobile device exhibiting certain attributes as discussed in more detail below.

Accordingly, an embodiment of the present subject matter provides a method for assigning geographical coordinates to a grid point located in a geographic region for the location of a mobile device where the method provides calibration data for each of one or more calibration points in the geographic region and where for each of the calibration points the associated calibration data is evaluated and based on that evaluation a determination is made as to whether at least one grid point should be defined, and if so, geographical coordinates are assigned to the grid point.

An additional embodiment of the present subject matter further includes in the above method a determination of geographical coordinates for each of a plurality of nodes of a uniform grid spanning the geographic region and for each of the grid points determining a closest node from the plurality of nodes and assigning characteristic data associated with the grid point to the closest node.

A further embodiment includes a method of assigning geographical coordinates to a grid point located in a geographic region for the location of a mobile device where calibration data for each of one or more calibration points in the geographic region are provided, and where for the calibration data associated with each of the calibration points the calibration data is evaluated, a determination is made based on the evaluation as to whether at least one grid point should be defined, and geographical coordinates are assigned to the grid point.

In another embodiment of the present subject matter, a system for assigning geographical coordinates to a grid point located in a geographic region is presented where the system includes a database and a processor for receiving calibration data for each of one or more calibration points in the geographic region and for each of the calibration points the processor is programmed to evaluate the associated calibration data, determine if at least one grid point should be defined based on the evaluation, assign geographical coordinates to the at least one grid point, and populate the database with the geographical coordinates.

A further embodiment of the present subject matter includes in the above system circuitry for determining geographical coordinates for each of a plurality of nodes of a uniform grid spanning the geographic region, and circuitry for determining, for each of the at least one grid point, a closest node from the plurality of nodes and assigning characteristic data associated with the grid point to the closest node.

Yet another embodiment of the present subject matter provides a method of locating a mobile device. The method comprises the steps of providing a plurality of grid points in a geographic region, providing a plurality of network measurement reports for a mobile device in the geographic region, and comparing ones of the plurality of grid points to at least one parameter of ones of the plurality of network measurement reports. The method further includes generating a first location estimate of the mobile device for each of the ones of said plurality of network measurement reports, and determining a second location estimate of the mobile device as a function of at least one of the generated first location estimates. An additional embodiment includes the step of identifying and omitting outlier first location estimates by determining a Mahalanobis distance from each first location estimate to the second location estimate, determining a distance threshold from a median of the Mahalanobis distances multiplied by a predetermined factor, and determining a third location estimate by averaging two or more of said first location estimates. Another embodiment may also interpolate between ones of the plurality of grid points when more than one grid point corresponds to the at least one parameter of the plurality of network measurement reports. An additional embodiment may provide a default location for the second location estimate if a second location estimate cannot be determined as a function of at least one of the generated first location estimates.

An additional embodiment of the present subject matter provides a method of improving a location estimate of a mobile device. The method comprises the steps of providing a plurality of grid points in a geographic region, providing a set of network measurement reports for a mobile device in the geographic region, the set of network measurement reports including one or more subsets of network measurement reports, and comparing ones of the plurality of grid points to at least one parameter of a subset of the network measurement reports. The method further includes generating a first location estimate of the mobile device for each subset of network measurement reports, determining a second location estimate of the mobile device as a function of at least one of the generated first location estimates, and indicating an attribute of the second location estimate as a function of a parameter of a subset of the network measurement reports.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
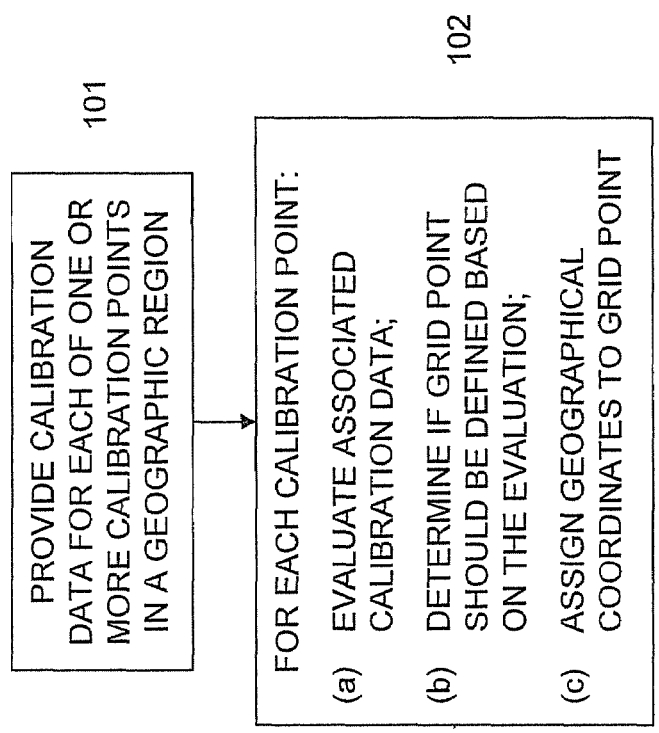
FIG. 1 is a flow chart for a method for assigning geographical coordinates according to an embodiment of the present subject matter.

With reference to the Figures where generally like elements have been given like numerical designations to facilitate an understanding of the present subject matter, the various embodiments of a system and method for optimizing a location estimate of a mobile unit are herein described.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that some of the desired benefits of the present subject matter can be obtained by selecting some of the features of the present subject matter without utilizing other features. Accordingly, those who work in the art will recognize that many modifications and adaptations of the present subject matter are possible and may even be desirable in certain circumstances and are part of the present subject matter. Thus, the following description is provided as illustrative of the principles of the present subject matter and not in limitation thereof. While the following exemplary discussion of embodiments of the present subject matter may be directed primarily towards calibration data, it is to be understood that the discussion is not intended to limit the scope of the present subject matter in any way and that the principles presented are equally applicable to other types of data, e.g., signal strength, GPS, NMR, Cell-ID, TDOA, RTT, TA, AOA, etc., capable of being delivered by components in a communications network such as a base station, location measurement unit, other mobile devices, etc. In addition, the use of various combinations of all of these sources, as in a hybrid location scheme, is within the scope of the subject matter disclosed herein.

The present subject matter is directed generally to the problem of estimating the location of a wireless mobile device using calibration data contained in one or more Network Measurement Reports ("NMRs"). The calibration data for various points must be gathered and analyzed so that particular points (e.g., "grid points") within the geographic region can be determined and associated with a particular set or sets of calibration data from, for example, one or more NMRs. In order to do so geographic coordinates may be assigned to grid points located in a geographic region. The grid points may be non-uniformly spaced throughout the geographic region and hence may be referred to as non-uniform grid points ("NUGs"). The location of a wireless mobile device may be estimated by comparing data reported by the mobile device to be geolocated with the data (and more particularly the characteristics derived from this data) associated with the various grid points to thereby estimate the location of the mobile.

The system and/or method of the present subject matter may apply to the situation where calibration data is available over discrete points in a 2-dimensional region "R" (3-D region is also contemplated such as within large multi-level structures). The calibration data may be contained within a Network Measurement Report ("NMR") as is known in the art or the calibration data may be obtained using other known methods. The calibration data may be obtained at each of several calibration points, which may be discrete points within region R each having geographical coordinates (e.g., latitude and longitude) associated therewith. The calibration data may include, but is not limited to, the following: (a) signal strengths observed for signals transmitted by a set of transmitters of known location within or in proximity to the region R; (b) signal strength of a transmitter located at the calibration point as measured by a set of receivers of known location within or in proximity to the region R; (c) round trip time for a signal between the calibration point and an external known point; (d) time difference of arrival at the calibration point with respect pairs of external points located within or in proximity to region R as measured by either a receiver at the calibration point or the external points; (e) the serving cell or sector for a mobile wireless device operating at that calibration point; (f) the network state at the time of collection—a finite number of such states may be required to distinguish between network conditions that vary diurnally, weekly or in some other manner; and (g) combinations of the above.

As a non-limiting example, the case in (a) may apply to the Integrated Digital Enhanced Network ("IDEN") specification, (c) may apply to the Global System for Mobile communications ("GSM") specification as in the Timing Advance ("TA") parameter or the Round Trip Time ("RTT") parameter in the Universal Mobile Telecommunications System ("UMTS") specification, (d) may apply to the UMTS specification, while the external receivers may be the base stations. In general, the calibration data may be any of those measurements made by a mobile wireless device located at the calibration point or any measurement made on the transmissions or characteristics of the mobile wireless device at a set of external transmitter/receivers in the region R or in proximity thereto.

The calibration data may consist of many such sets (i.e., vectors) obtained at one or more calibration points. At each calibration point, the data gathering may have resulted in either a single data vector or multiple data vectors, so that there are potentially multiple sets of data and/or data vectors associated with each calibration point.

A NUG generator or a method to produce NUGs may begin the NUG generation operation using, for example, one of more of the following: (a) a fixed uniform grid ("UG") defined over the region R with the calibration point data being assigned to the fixed grid points by some rule (e.g., allocated by closest fixed grid point, a centroid of a set of fixed grid points, etc.); (b) random grid points to define the start of each NUG; (c) combinations of (a) and (b) depending on the characteristics of the calibration data; or (d) some other useful method.

In any of these cases, the NUG generator may evaluate the data vectors at a particular (candidate) calibration point, or at a fixed grid point to which the data vector(s) is/are assigned. This calibration point or grid point may serve as the root of a first NUG. The root of the NUG may be the calibration data vector that initiates the creation of that NUG. The vectors may be examined using, for example, increasingly stringent tests of statistical sufficiency. In particular, a determination may be made as to whether the data vectors exhibit clustering. If the data exhibits tight clustering, the data for the next candidate calibration point may be aggregated to the former calibration point and the clustering property may be re-evaluated. For example, if the second calibration point also has a cluster but this cluster is sufficiently different than the cluster of the first calibration point, a determination may be made that the data for the two considered calibration points should be allocated to the roots of separate NUGs. If the aggregate cluster (i.e., a cluster including data from both the first and second calibration points) is statistically very similar to either of the first or second clusters (taken independently), then the data for the two calibration points may be allocated to the same NUG. All adjacent calibration data points may be similarly evaluated with respect to the first considered calibration point. Thus one or more of the adjacent calibration points may either wind up having all their data accumulated into a single NUG or, at the other extreme, each such calibration point may become the root of a separate NUG.

The primary test made to determine the allocation may be one of a variety of clustering tests, such as, for example, the K-means algorithm. Statistical similarity may be determined by, for example, the probability density function ("pdf") of the data parameters (e.g., neighboring cell signal levels, timing information, etc.), the mean and variance of the data parameters, the serving cell/sector, or other functions of the calibration data.

Those measurements or parameter values that do not cluster may be referred to as outliers. The performance of a grid-based pattern matching system such as that disclosed herein is typically dependent on stored received signal level measurements that accurately reflect the levels that are likely to be reported by the mobile device to be located. If the drive test data, for example, used to create the RF signal level grid contains outlier measurements, the statistically consistent value of the signal level will be distorted. Therefore, the present subject matter also describes a system and method used to identify and eliminate outlier signal level measurements and timing advance values (or in general, any parameter within the NMR) during NUG or grid creation so as to improve the estimate of the mean parameter value.

As a non-limiting example, in a very simple consideration of clustering one could consider the mean value of a parameter. In this scenario, neighbor cell control channel signal level measurement outliers could be eliminated as follows: At each grid point, the average received signal level of a particular control channel signal may be computed from all of the measurements of that signal assigned to the grid point. The deviation of each individual measurement from the mean may be computed. Measurements that deviate by more than a configurable predetermined threshold from the mean may be omitted. The average may then be recomputed without the omitted outliers. In a scenario where there are very few measurements, typically less than five or so, the original mean value will be greatly influenced by any outlier measurements and thus may falsely identify too many of the measurements as outliers, or fail to detect outliers at all. For this reason, another parameter is used to only perform the outlier check if there are at least a minimum number of measurements.

In a more general case, a cluster may be a region in N-dimensional NMR vector space where there is a sufficient number of such vectors with a mutual variation such that the mutual variation could be ascribed purely to noise in the measurement. Thus, for example, if within a few feet of the original measurement, if a particular parameter is blocked (say by a large structure such as a building) that parameter would fall out of the original cluster. If sufficient such blocked locations have data falling near the original cluster, one may obtain a secondary cluster where the difference between the first and second clusters is the large variation in this particular parameter.

In addition, if any of the examined sets of data associated with a calibration point exhibit more than one cluster, it may be necessary to define one or more co-located NUGs. Thus, if there are, for example, three well defined clusters associated with a particular calibration point, these clusters could form the roots of three co-located NUGs. The data in these NUGs may grow depending on whether similar clusters can also be found in adjacent (or close) calibration points in which case the similar clusters may be aggregated to the original NUGs or, if the adjacent clusters are not similar, the adjacent clusters (or cluster) may form separate root NUGs (or NUG).

Further, if the quantity of data associated with a particular calibration point is insufficient to sensibly test for statistical similarity or clustering, data from adjacent calibration grid points may be accumulated first and the statistical or clustering test performed thereafter. Thus, based on the results of the clustering test using the accumulated data the determination of how one should separate out the data into NUGs may be made.

The technique may be repeated until all calibration grid points in the region R are exhausted. At the end of this process one has divided the region into a collection of NUGs, where multiple co-located NUGs may exist. The NUGs may fully cover the region R and each NUG may have statistically similar data accumulated into itself. The geometrical shape (i.e., the shape defined by the union of locations of calibration points assigned to the NUG) and the amount of data accumulated into such NUGs is seen to be variable since these are determined by the statistical similarity of the data allocated to a NUG.

Additionally, we may also consider the method of generating NUGs based not on statistical consistency of calibration data, but on other conditions such as (a) a minimum number of unique neighbors observed in data accumulated from allocated calibration grid points; (b) a minimum number of data vectors (NMRs); (c) a maximum and/or minimum NUG radius; (d) a specific set of neighboring cells; (e) a specific set of neighboring cells with power ordering; or (f) any combination of the above. Additionally, the method of using statistical consistency or similarity or data clustering combined with any of these other conditions may be employed.

For each so obtained NUG, a variety of parameters and functions may be generated and stored to describe that NUG. These are termed the NUG characteristics. The NUG characteristics are a representation in that attempt to capture the nature and variability of the data associated with that NUG in a compact and representative form. These characteristics may include, but are not limited to, the following: (a) an ordered list of neighboring cells; (b) functions defined on the absolute neighboring cell power levels (e.g., mean, median, $k^{th}$ moment, cluster-mean, etc.); (c) functions defined on the relative neighboring cell power differences (e.g., mean, median, $k^{th}$ moment, cluster-mean, etc.); (d) serving cell/sector; (e) timing advance parameter (or equivalent); (f) individual pdf (probability density function or probability distribution function) of each neighboring cell power level; (g) joint pdf of neighboring cell power levels; (h) mean and variance of neighboring cell power levels; (i) mobile device orientation (e.g., indoors, outdoors, direction mobile device is facing (e.g., North, South, etc.), tilted upwards, azimuth, elevation, etc.); (j) a compact and/or efficient representation that enables retrieval of the calibration data NMR vectors assigned to this NUG; (k) the network state as indicated in the calibration data; (l) a confidence measure indicative of the reliability of the calibration data feeding this NUG; and (m) any combinations of the above.

If a pdf is determined for a NUG, that pdf may be generated using either the Parzen technique or the method of Gaussian mixtures or some variant thereof. In addition when a need to specify the variance or covariance exists, that parameter may be set to a value dependent on the observed variance for a particular neighboring cell power level or the observed covariance matrix for a set of neighboring cell power levels.

The location ascribed to the NUG may be, for example, any internal point within the NUG. If the NUG contains only a single calibration point, the location of the NUG may be set as the location of the calibration point. If the NUG encompasses several calibration points, the location of any one of the calibration points or the centroid of such calibration points or some other similar measure may be used to define the NUG location. Also, in the case of multiple co-located NUGs, all such NUGs may have their assigned location set to the same value.

With reference now to FIG. 1, a flow chart is depicted for a method for assigning geographical coordinates according to an embodiment of the present subject matter. At block 101, calibration data may be provided for each of one or more calibration points in a geographic region. At block 102, for each of the calibration points calibration data associated with the calibration point is evaluated and a determination is made as to whether a grid point, such as a NUG, should be defined. If it is determined that a grid point is to be defined, geographical coordinates are assigned to the grid point so that the grid point may be useful in estimating the location of a mobile device.

Figure 2:
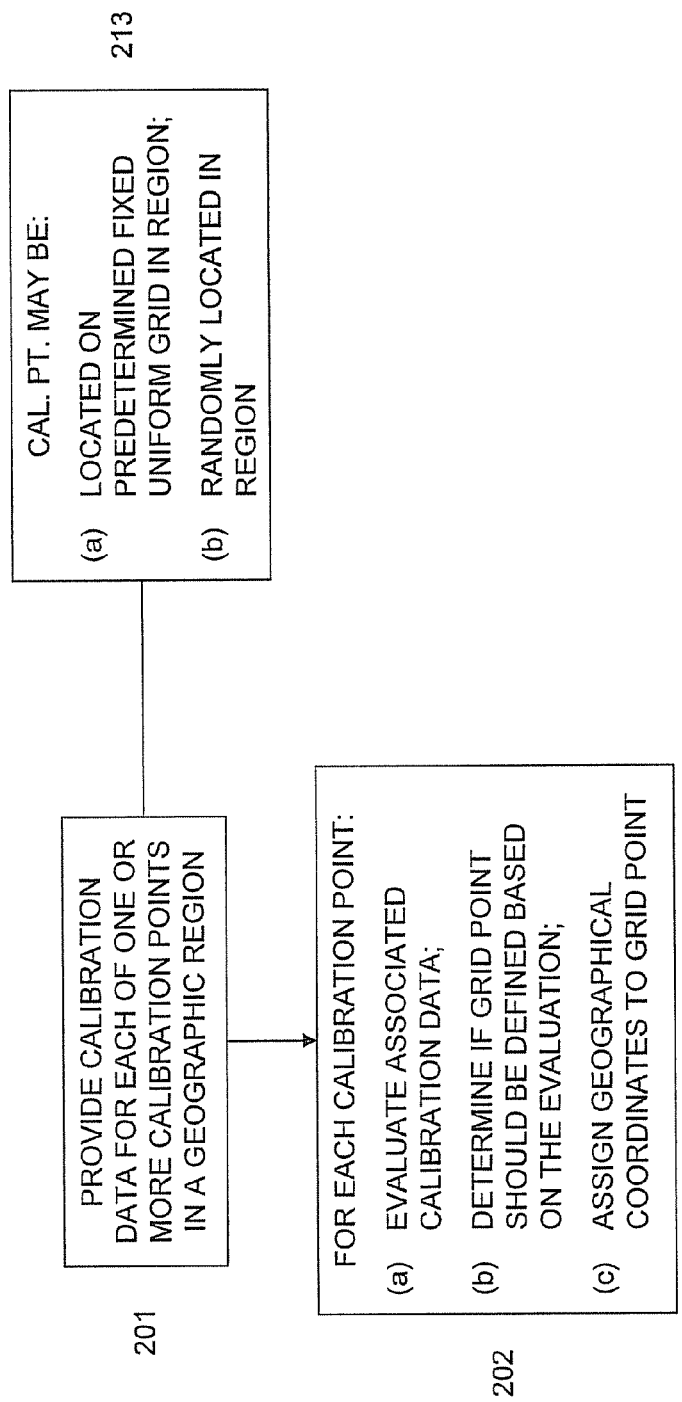
FIG. 2 is a flow chart for a method for assigning geographical coordinates including a calibration point according to an embodiment of the present subject matter.

FIG. 2 is a flow chart for a method for assigning geographical coordinates including a calibration point according to an embodiment of the present subject matter. Blocks 201 and 202 are similar to blocks 101 and 102, respectively. At block 213, the calibration point may be located on a predetermined fixed uniform grid defined over the geographic region or the calibration point may be randomly located within the geographic region.

Figure 3:
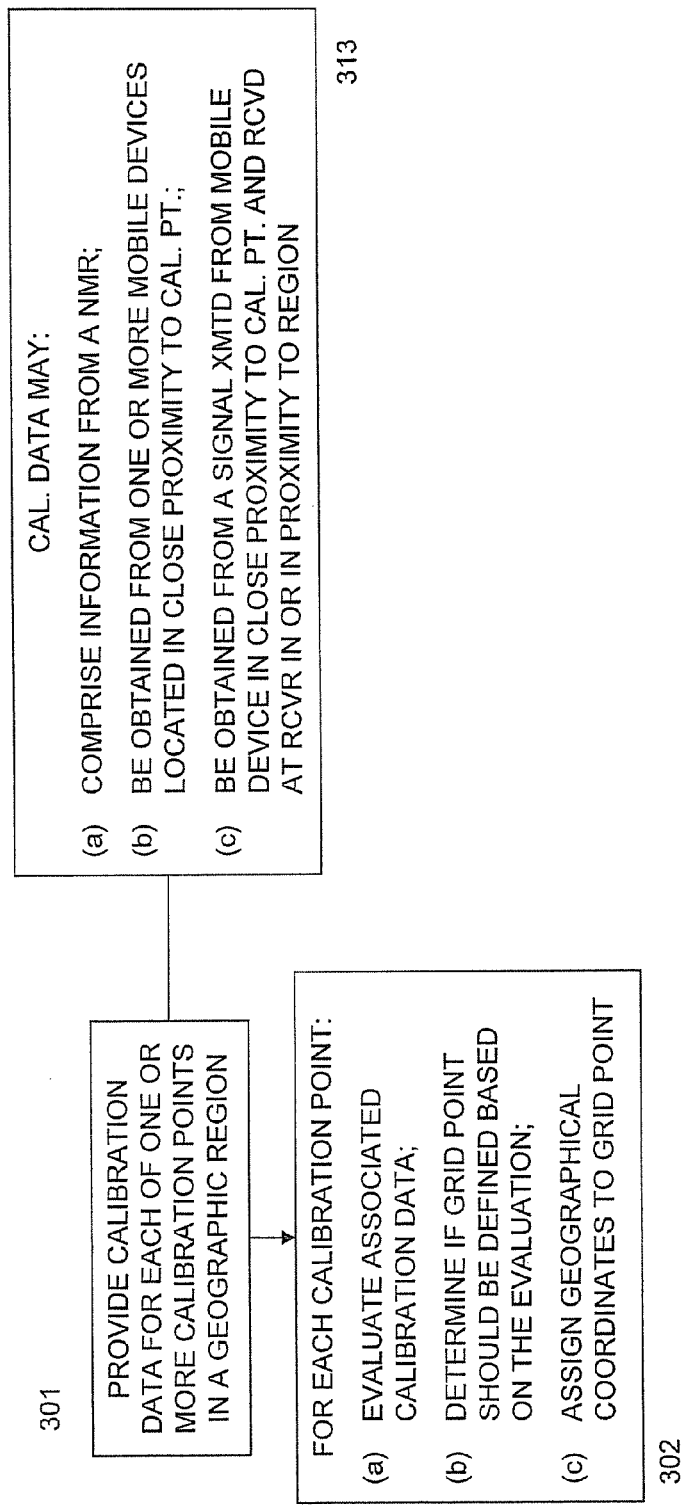
FIG. 3 is a flow chart for a method for assigning geographical coordinates including calibration data according to an embodiment of the present subject matter.

FIG. 3 is a flow chart for a method for assigning geographical coordinates including calibration data according to an embodiment of the present subject matter. Blocks 301 and 302 are similar to blocks 101 and 102, respectively. At block 313, the calibration data associated with one or more calibration points may be comprised of information from a NMR, or the calibration data for a particular calibration point may be obtained from one or more mobile devices located at or in close proximity to the calibration point, or the calibration data for a particular calibration point may be obtained from a signal transmitted from a mobile device (or devices) located at or in close proximity to the calibration point where the signal is received by a receiver in or in proximity to the geographic region.

Figure 4:
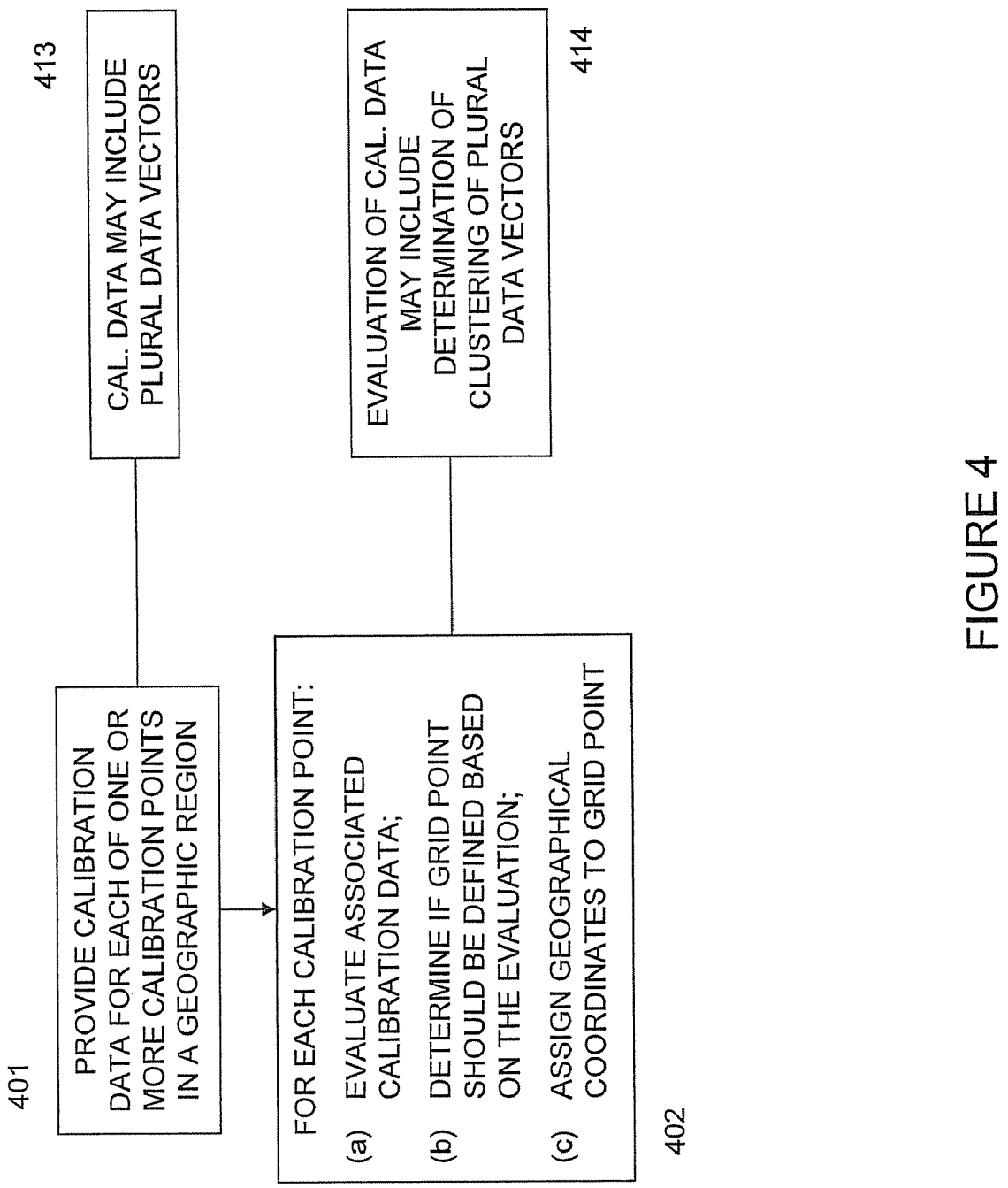
FIG. 4 is a flow chart for a method for assigning geographical coordinates including clustering of data according to an embodiment of the present subject matter.

FIG. 4 is a flow chart for a method for assigning geographical coordinates including clustering of data according to an embodiment of the present subject matter. Blocks 401 and 402 are similar to blocks 101 and 102, respectively. At block 413, for one or more of the calibration points the calibration data may include multiple data vectors and, at block 414, the evaluation of the data vectors may include a determination of clustering of the multiple data vectors as described above.

Figure 5:
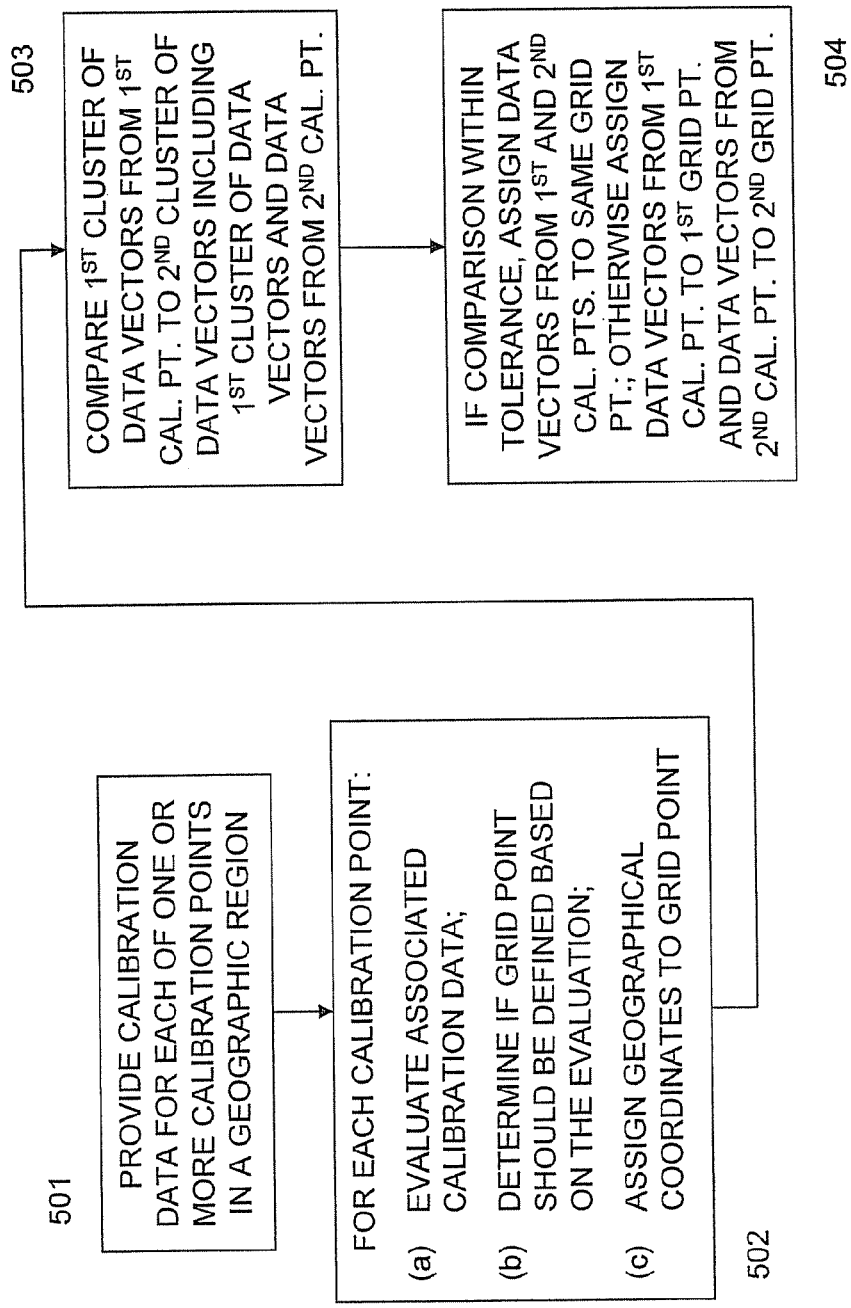
FIG. 5 is a flow chart for a method for assigning geographical coordinates including clustering of data vectors according to an embodiment of the present subject matter.

Considering now the flow chart depicted in FIG. 5, the flow chart indicates a method for assigning geographical coordinates including clustering of data vectors according to an embodiment of the present subject matter. Blocks 501 and 502 are similar to blocks 101 and 102, respectively. At block 503, the determination of whether at least one grid point should be defined based on the evaluation of the calibration data associated with a calibration point includes a comparison of a first cluster of data vectors from a first calibration point to a second cluster of data vectors where the second cluster of data vectors includes the first cluster of data vectors as well as data vectors from a second calibration point. At block 504, if the comparison in block 503 results in the difference between the first and second cluster of data vectors being within a predetermined tolerance value, then the data vectors from the first and second calibration points are assigned to the same grid point. However, if the comparison is not within tolerance, then the data vectors from the first calibration point are assigned to a first grid point and the data vectors from the second calibration point are assigned to a second grid point.

Figure 6:
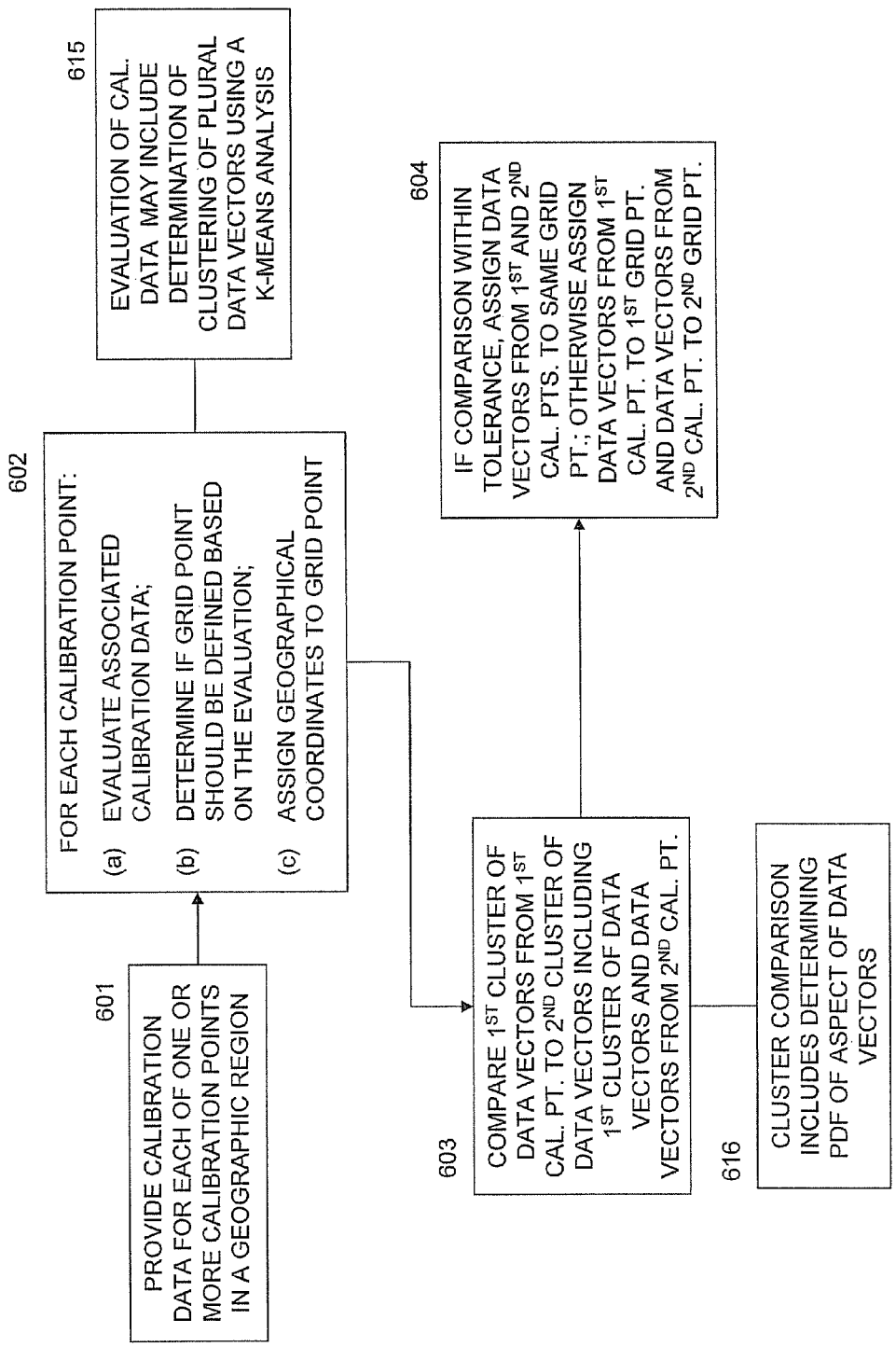
FIG. 6 is a flow chart for a method for assigning geographical coordinates including clustering according to an embodiment of the present subject matter.

The flow chart shown in FIG. 6 illustrates another method for assigning geographical coordinates including clustering according to an embodiment of the present subject matter. Here, blocks 601, 602, 603, and 604 are similar to blocks 501, 502, 503, and 504, respectively. At block 615 the evaluation of calibration data for one or more calibration points may include determining the clustering of plural data vectors using a K-means analysis. At block 616 the comparing of clusters of data vectors may include determining a probability density function of an aspect of the data vectors.

Figure 7:
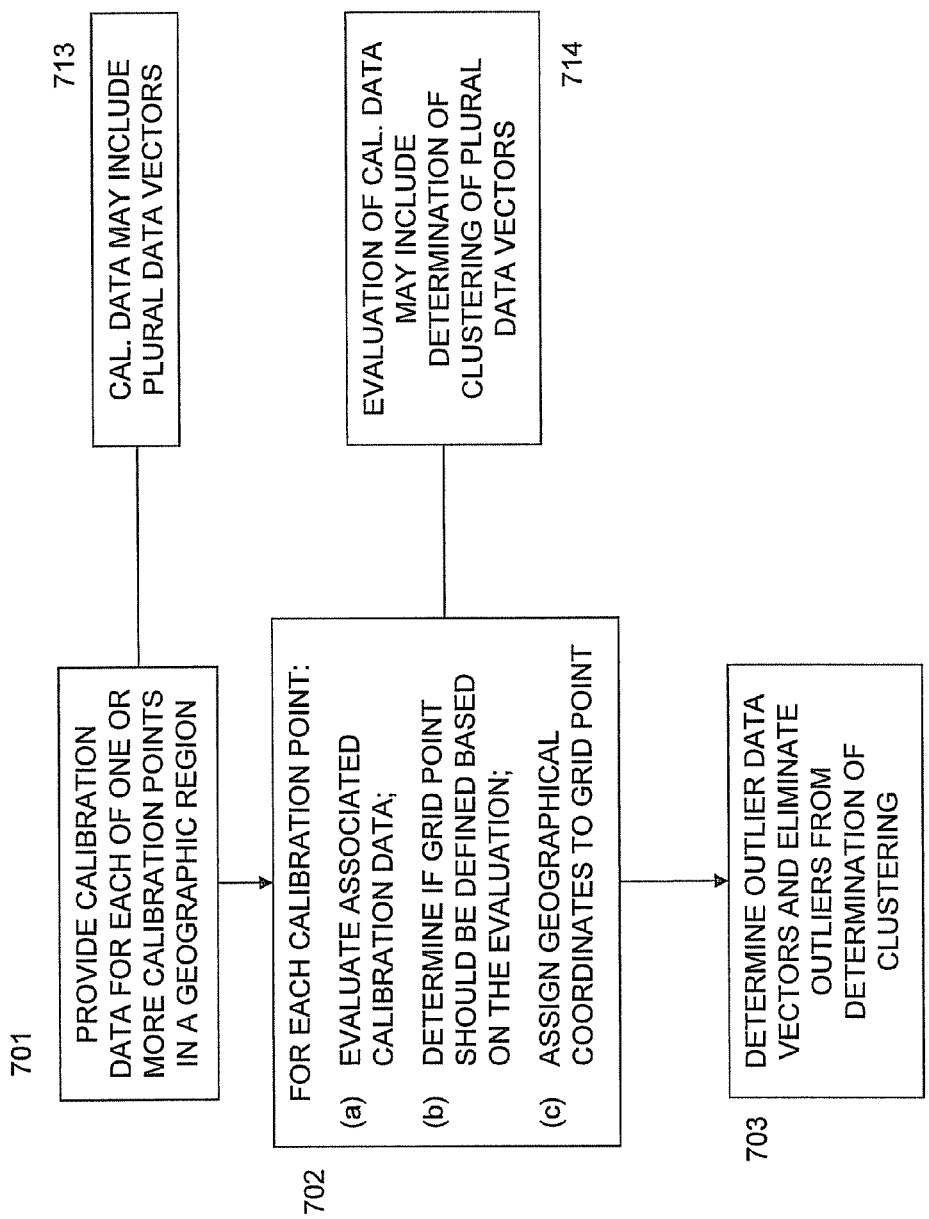
FIG. 7 is a flow chart for a method for assigning geographical coordinates including determining outliers according to an embodiment of the present subject matter.

FIG. 7 is a flow chart for a method for assigning geographical coordinates including determining outliers according to an embodiment of the present subject matter. Blocks 701, 702, 713, and 714 are similar to blocks 401, 402, 413, and 414, respectively. At block 703, a determination of outlier data vectors may be made and the outlier data vectors may be eliminated from the determination of data vector clustering.

Figure 8:
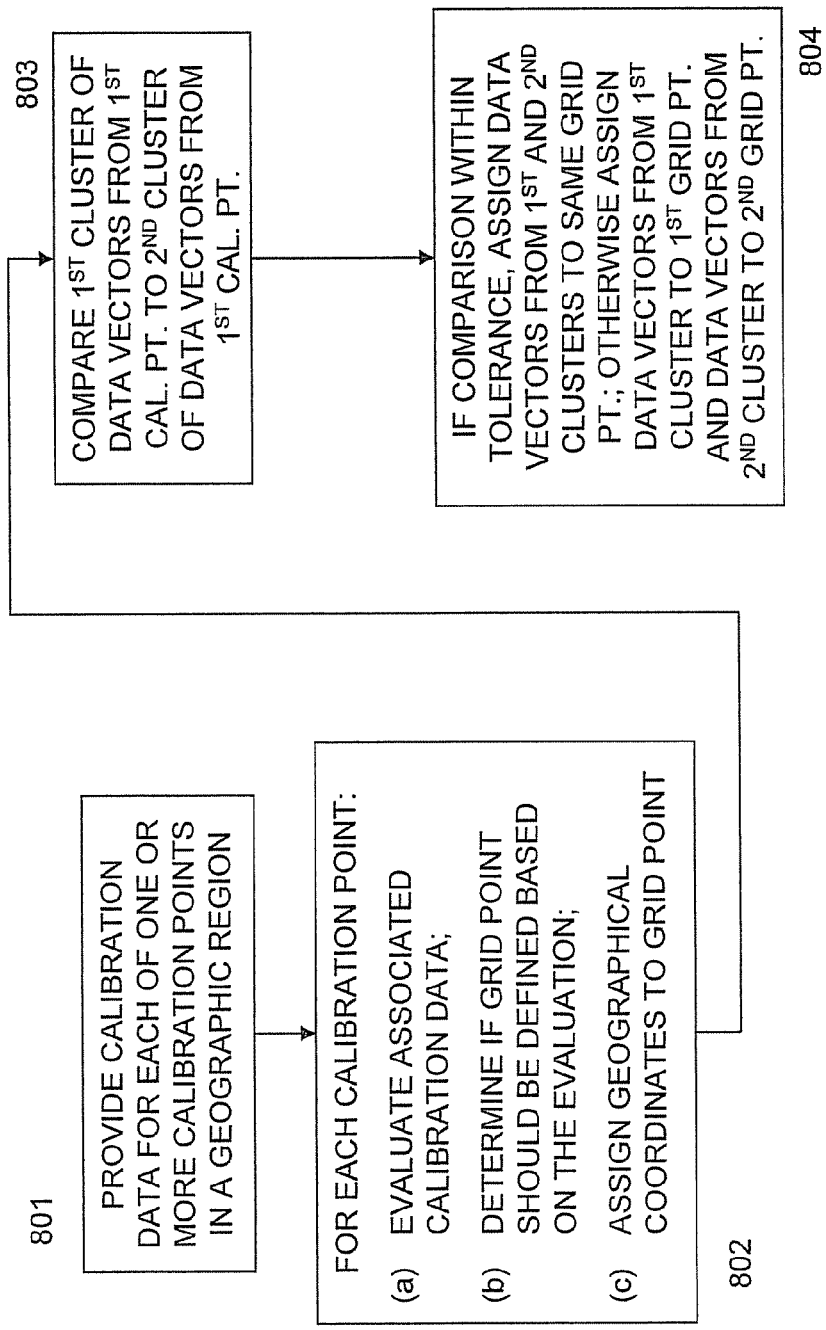
FIG. 8 is a flow chart for a method for assigning geographical coordinates including clustering of data vectors at the same calibration point according to an embodiment of the present subject matter.

Regarding FIG. 8, a flow chart is represented for a method for assigning geographical coordinates including clustering of data vectors at the same calibration point according to an embodiment of the present subject matter. Blocks 801 and 802 are similar to blocks 101 and 102, respectively. At block 803, the determination if at least one grid point should be defined based on the evaluation of calibration data may include a comparison of a first cluster of data vectors associated with a first calibration point to a second cluster of data vectors associated with the first calibration point. If the result of the comparison is within a predetermined tolerance, then the data vectors from the first and second clusters may be assigned to the same grid point; otherwise, the data vectors from the first cluster may be assigned to a first grid point while the data vectors from the second cluster may be assigned to a second grid point.

Figure 9:
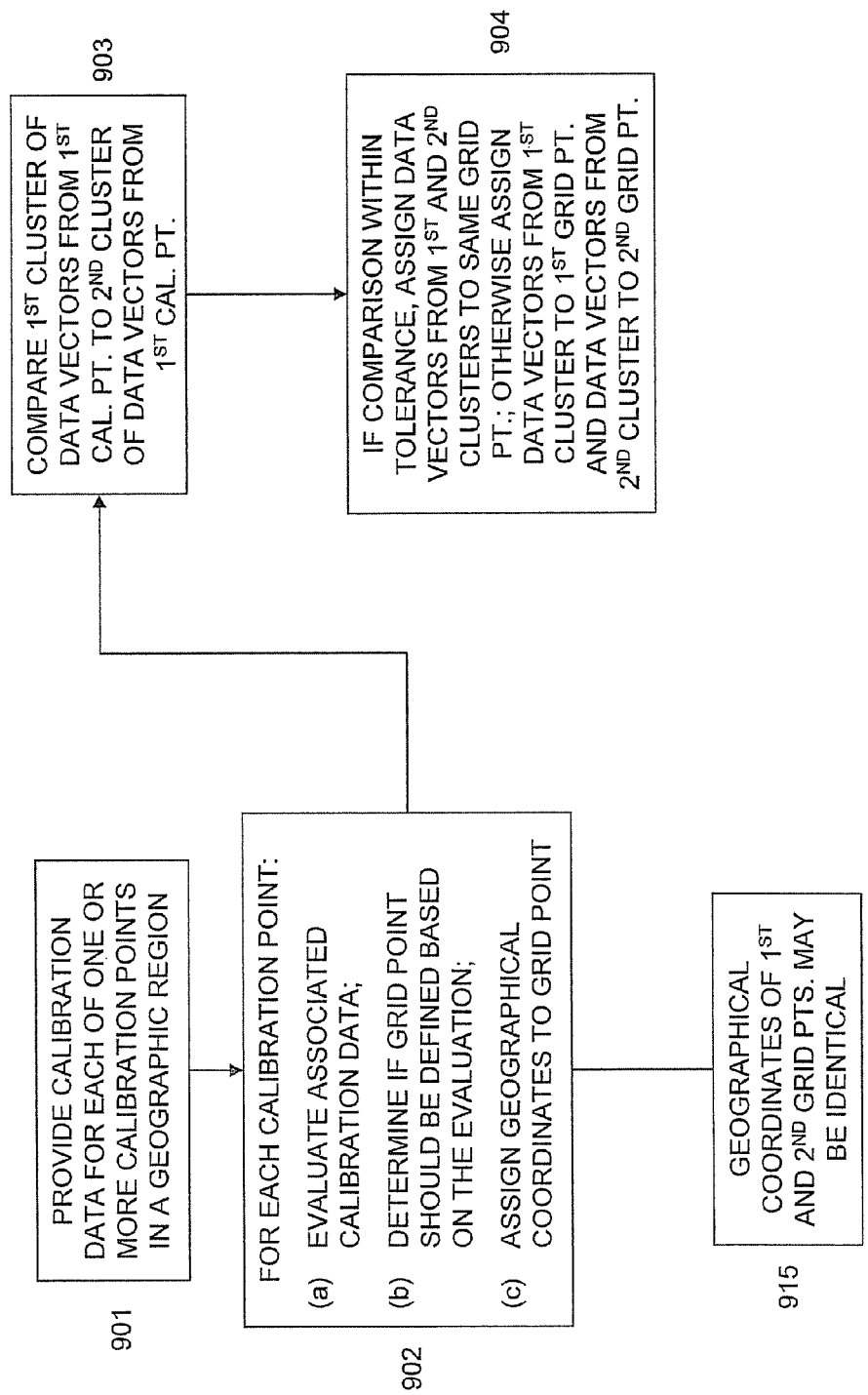
FIG. 9 is a flow chart for a method for assigning geographical coordinates including clustering of data vectors at the same calibration point according to an embodiment of the present subject matter.

FIG. 9 is a flow chart illustrating another method for assigning geographical coordinates including clustering of data vectors at the same calibration point according to an embodiment of the present subject matter. Here, blocks 901, 902, 903, and 904 are similar to blocks 801, 802, 803, and 804, respectively. At block 915 the geographical coordinates assigned to the first and second grid points may be identical.

Figure 10:
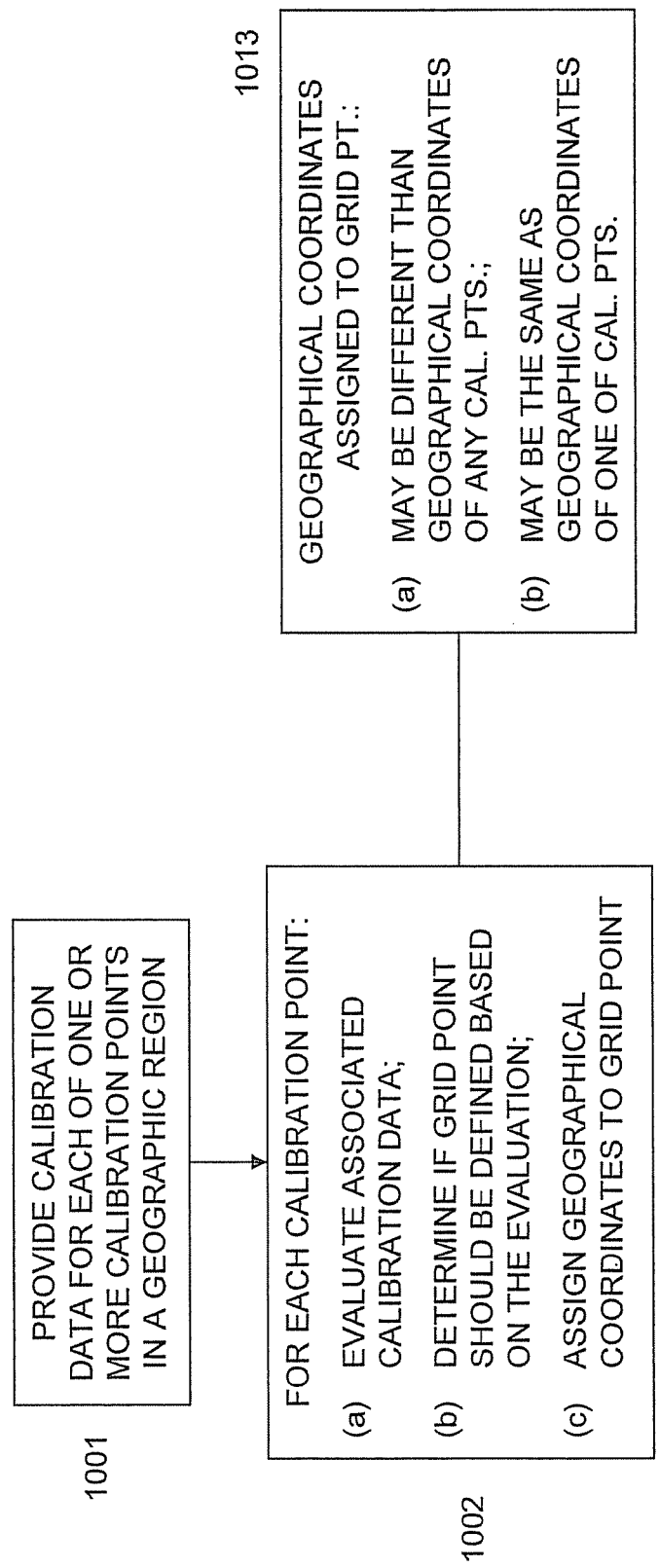
FIG. 10 is a flow chart for a method for assigning geographical coordinates to a grid point according to an embodiment of the present subject matter.

Directing attention now towards FIG. 10, a flow chart is presented for a method for assigning geographical coordinates to a grid point according to an embodiment of the present subject matter. Blocks 1001 and 1002 are similar to blocks 101 and 102, respectively. At block 1013, the geographical coordinates assigned to a first grid point may be different than the geographical coordinates assigned to a second grid point or the geographical coordinates assigned to a first grid point may be the same as the geographical coordinates assigned to a second grid point.

Figure 11:
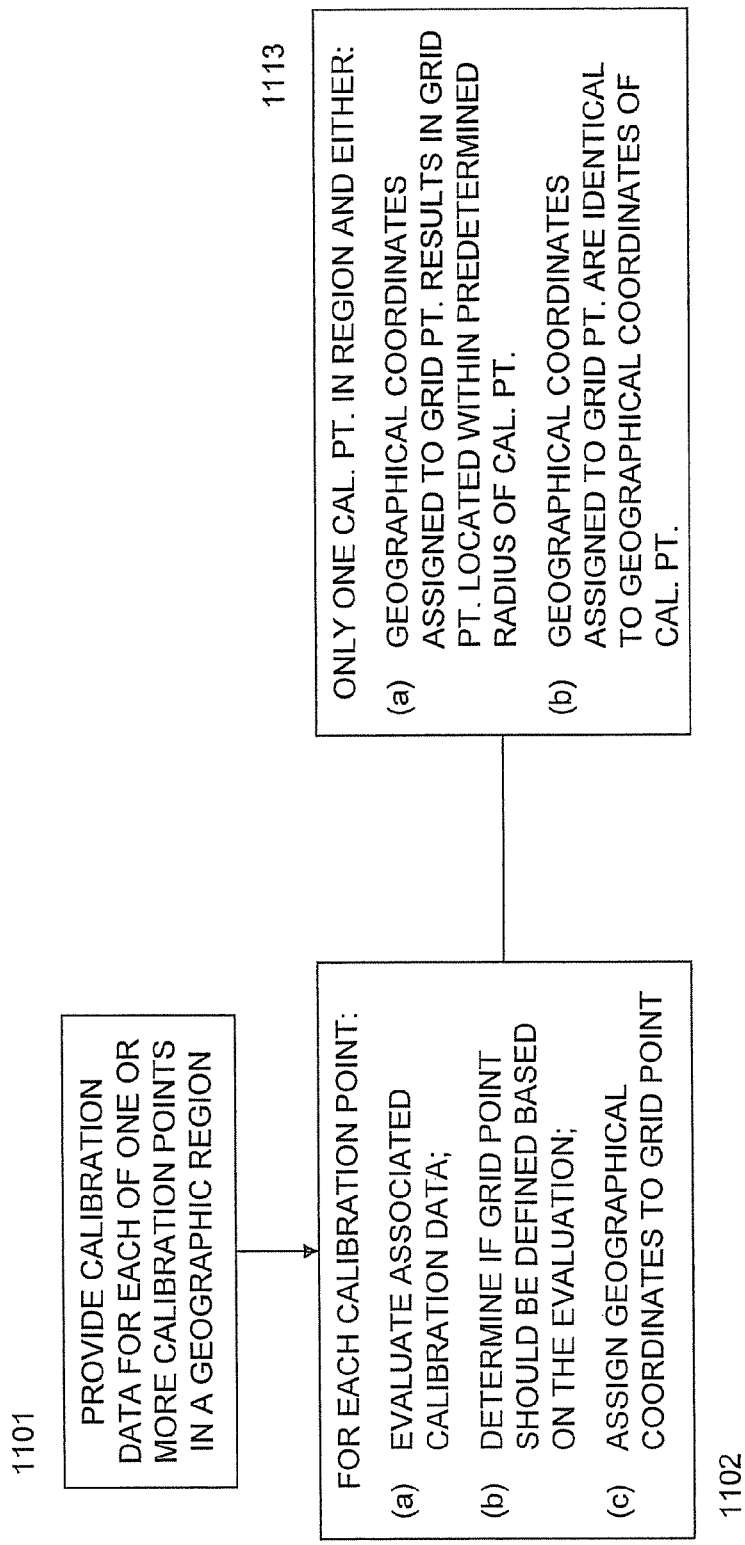
FIG. 11 is a flow chart for a method for assigning geographical coordinates including assigning geographical coordinates to a grid point where only one calibration point is in a geographic region according to an embodiment of the present subject matter.

FIG. 11 is a flow chart for a method for assigning geographical coordinates including assigning geographical coordinates to a grid point where only one calibration point is in a geographic region according to an embodiment of the present subject matter. Blocks 1101 and 1102 are similar to blocks 101 and 102, respectively. At block 1113, if there is only one calibration point within the geographic region, then the geographical coordinates assigned to a grid point may result in the grid point being located within a predetermined radius of the one calibration point. Or, the geographical coordinates assigned to a grid point may be identical to the geographical coordinates of the calibration point.

Figure 12:
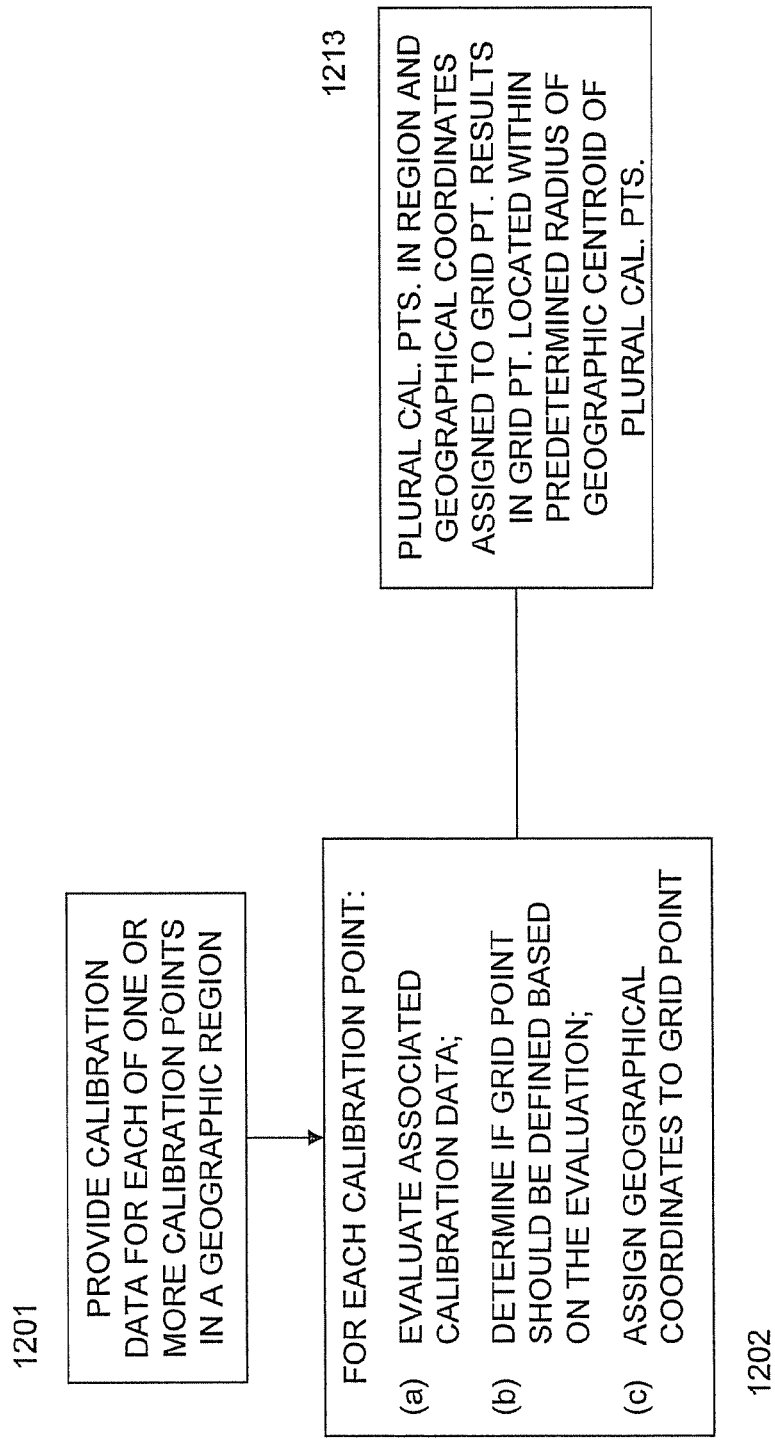
FIG. 12 is a flow chart for a method for assigning geographical coordinates including assigning geographical coordinates to a grid point where there are plural calibration points in a geographic region according to an embodiment of the present subject matter.

Moving now to FIG. 12, a flow chart is shown for a method for assigning geographical coordinates including assigning geographical coordinates to a grid point where there are plural calibration points in a geographic region according to an embodiment of the present subject matter. Blocks 1201 and 1202 are similar to blocks 101 and 102, respectively. At block 1213, where there are multiple calibration points in the geographic region, the geographical coordinates assigned to a grid point may result in the grid point being located within a predetermined radius of a centroid of a polygon formed by connecting the multiple calibration points.

Figure 13:
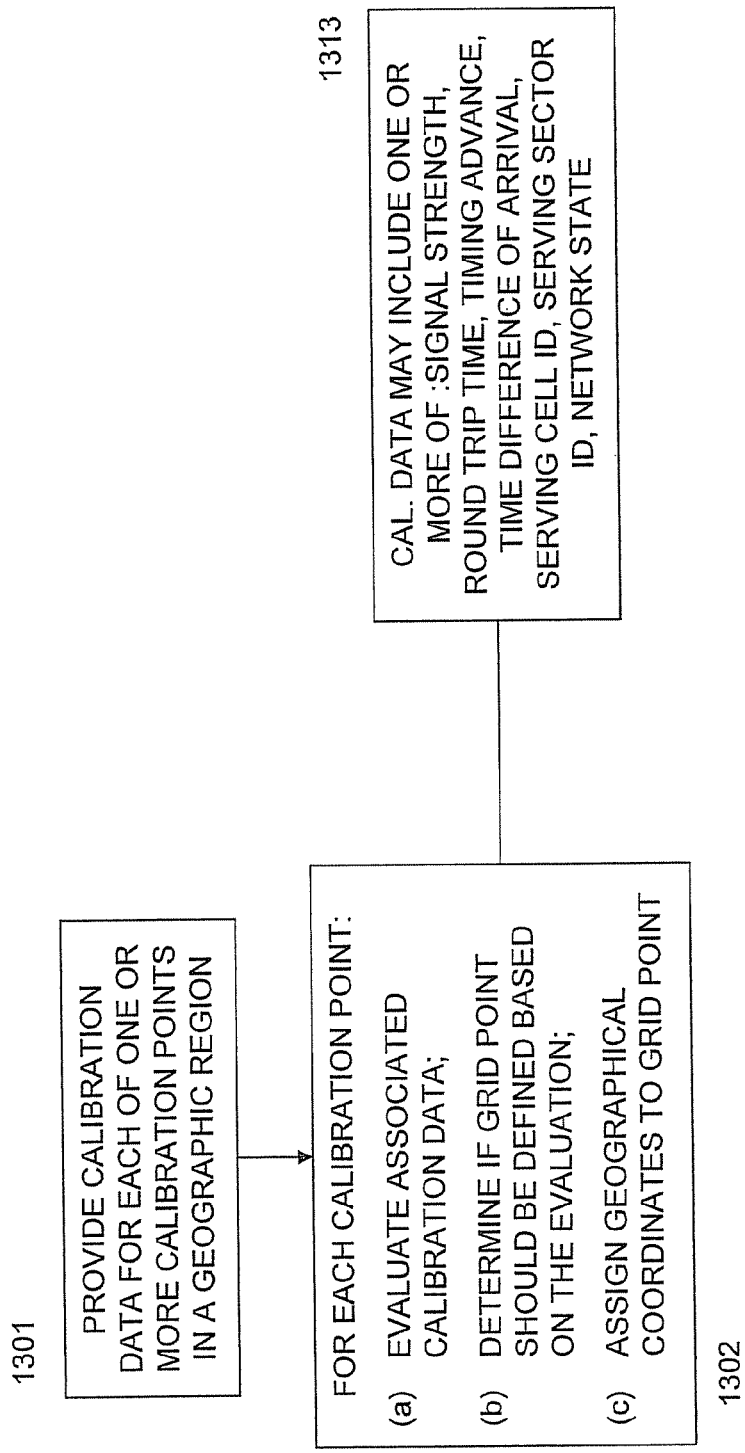
FIG. 13 is a flow chart for a method for assigning geographical coordinates including calibration data information according to an embodiment of the present subject matter.

FIG. 13 is a flow chart for a method for assigning geographical coordinates including calibration data information according to an embodiment of the present subject matter. Blocks 1301 and 1302 are similar to blocks 101 and 102, respectively. At block 1313, the calibration data may include one or more of the following: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of plural signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 14:
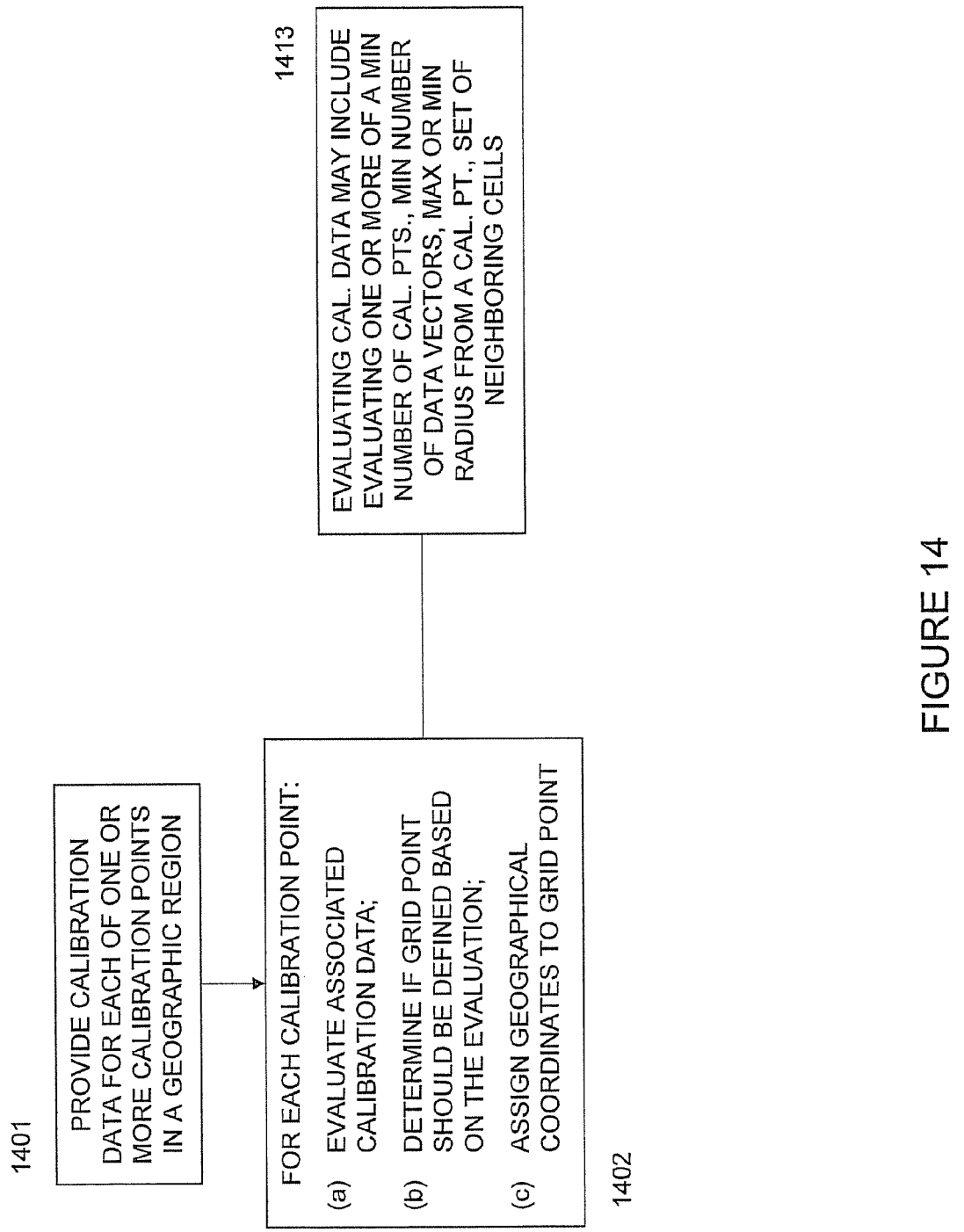
FIG. 14 is a flow chart for a method for assigning geographical coordinates including evaluating calibration data according to an embodiment of the present subject matter.

FIG. 14 is a flow chart for a method for assigning geographical coordinates including evaluating calibration data according to an embodiment of the present subject matter. Blocks 1401 and 1402 are similar to blocks 101 and 102, respectively. At block 1413, the evaluating of the calibration data associated with a calibration point may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 15:
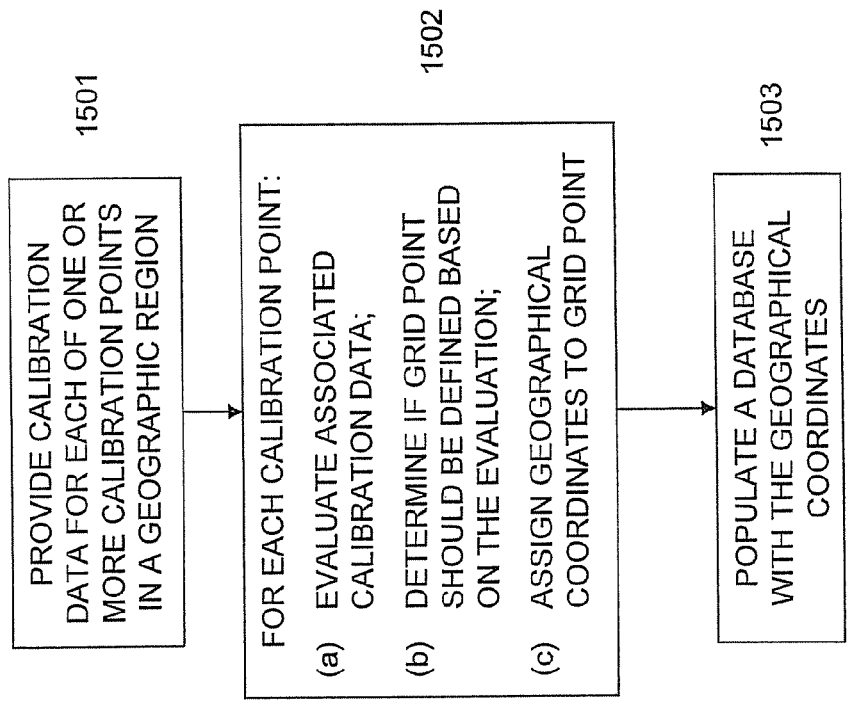
FIG. 15 is a flow chart for a method for assigning geographical coordinates including populating a database with the geographical coordinates according to an embodiment of the present subject matter.

FIG. 15 is a flow chart for a method for assigning geographical coordinates including populating a database with the geographical coordinates according to an embodiment of the present subject matter. Blocks 1501 and 1502 are similar to blocks 101 and 102, respectively. At block 1503, a database may be populated with the geographical coordinates assigned to the grid points.

Figure 16:
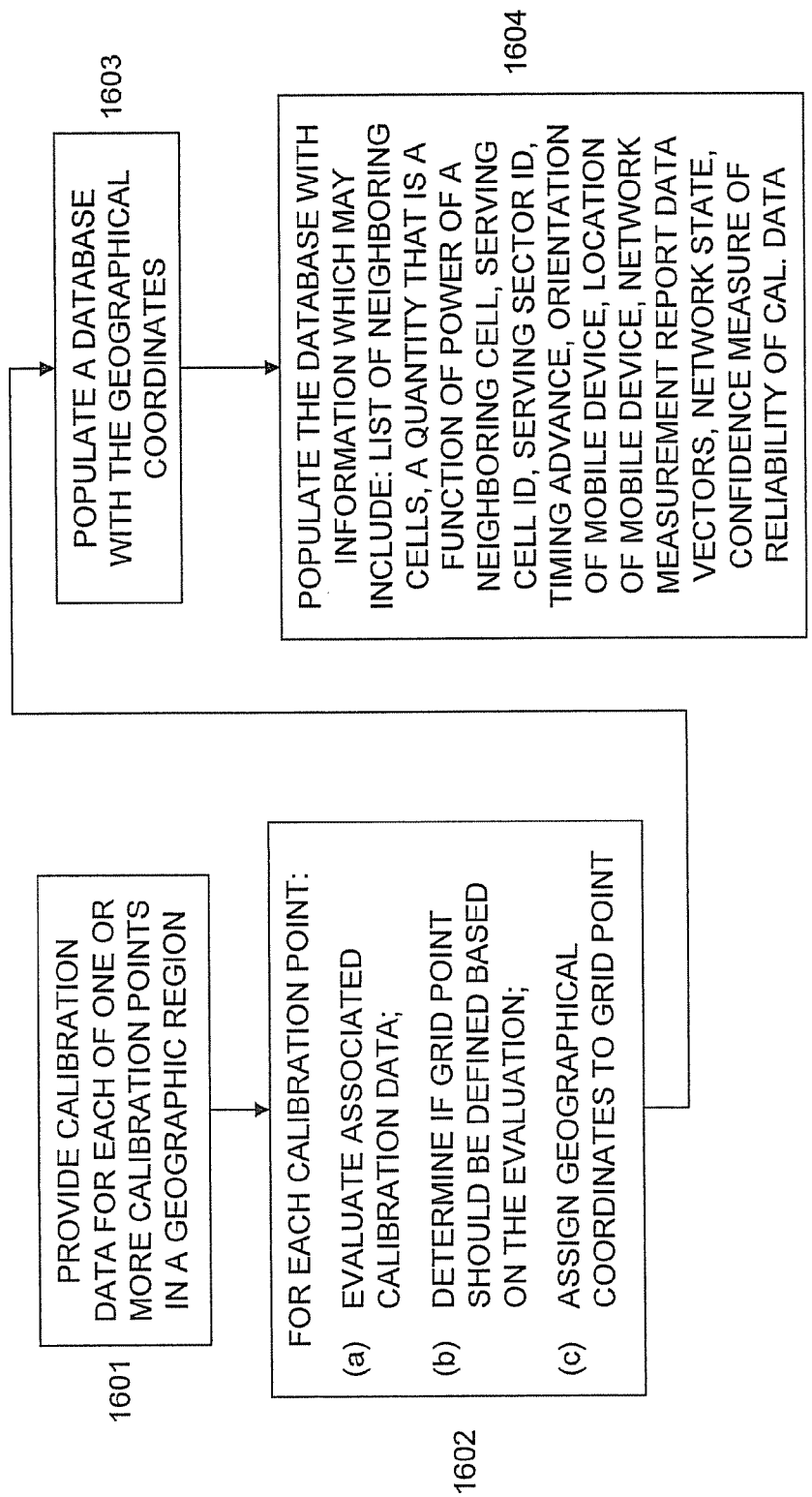
FIG. 16 is a flow chart for a method for assigning geographical coordinates including database information according to an embodiment of the present subject matter.

FIG. 16 is a flow chart for a method for assigning geographical coordinates including database information according to an embodiment of the present subject matter. Blocks 1601, 1602, and 1603 are similar to blocks 1501, 1502, and 1503, respectively. At block 1604, the database may be populated with information such as: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 17:
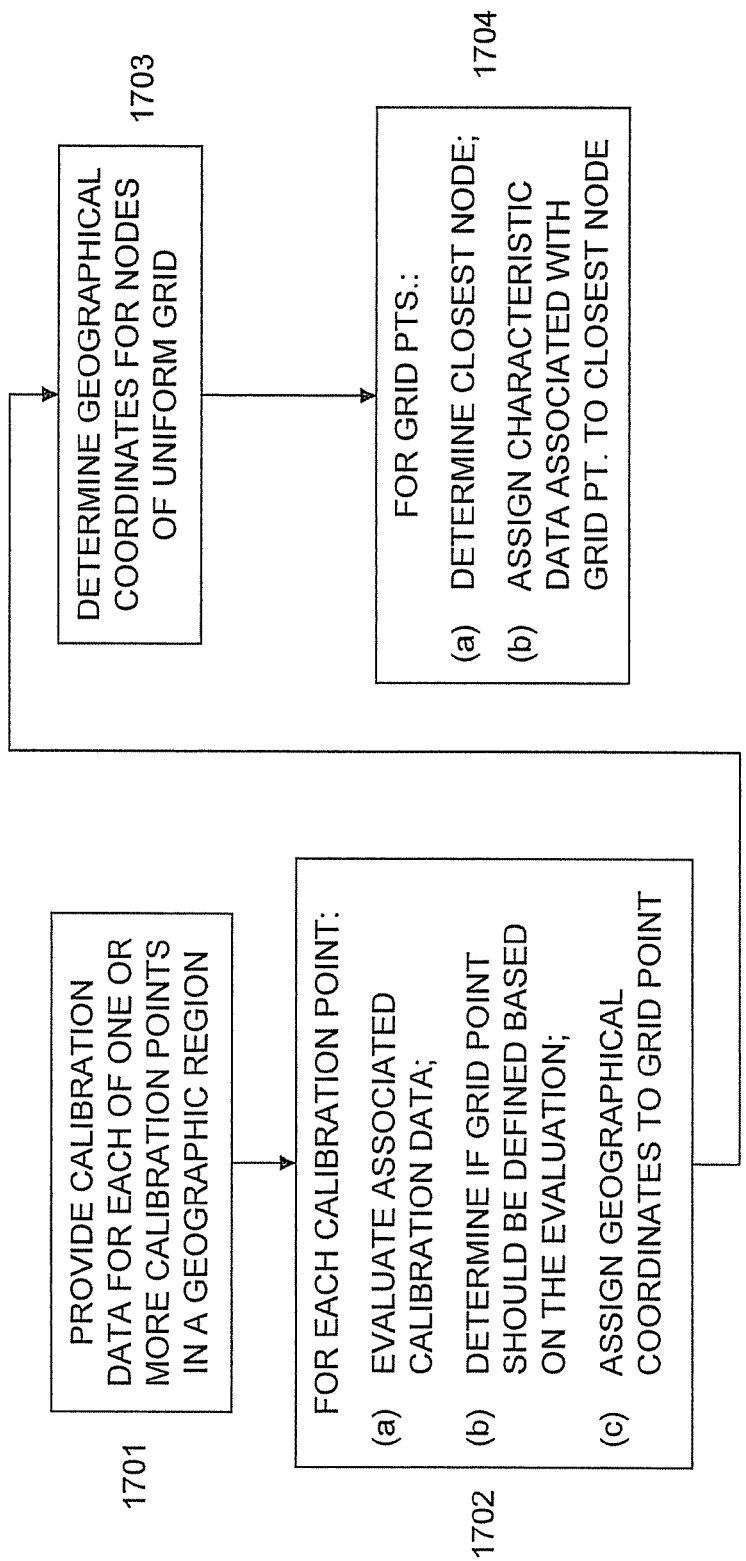
FIG. 17 is a flow chart for a method for assigning geographical coordinates including determining geographical coordinates for nodes of a uniform grid according to an embodiment of the present subject matter.

Directing attention now to FIG. 17, a flow chart is presented for a method for assigning geographical coordinates including determining geographical coordinates for nodes of a uniform grid according to an embodiment of the present subject matter. Blocks 1701 and 1702 are similar to blocks 101 and 102, respectively. At block 1703, geographical coordinates may be determined for the nodes of a uniform grid spanning the geographic region. At block 1704, for each of the grid points, a determination of the closest node of the uniform grid is made and the characteristic data associated with the grid point may be assigned to the closest node.

Figure 18:
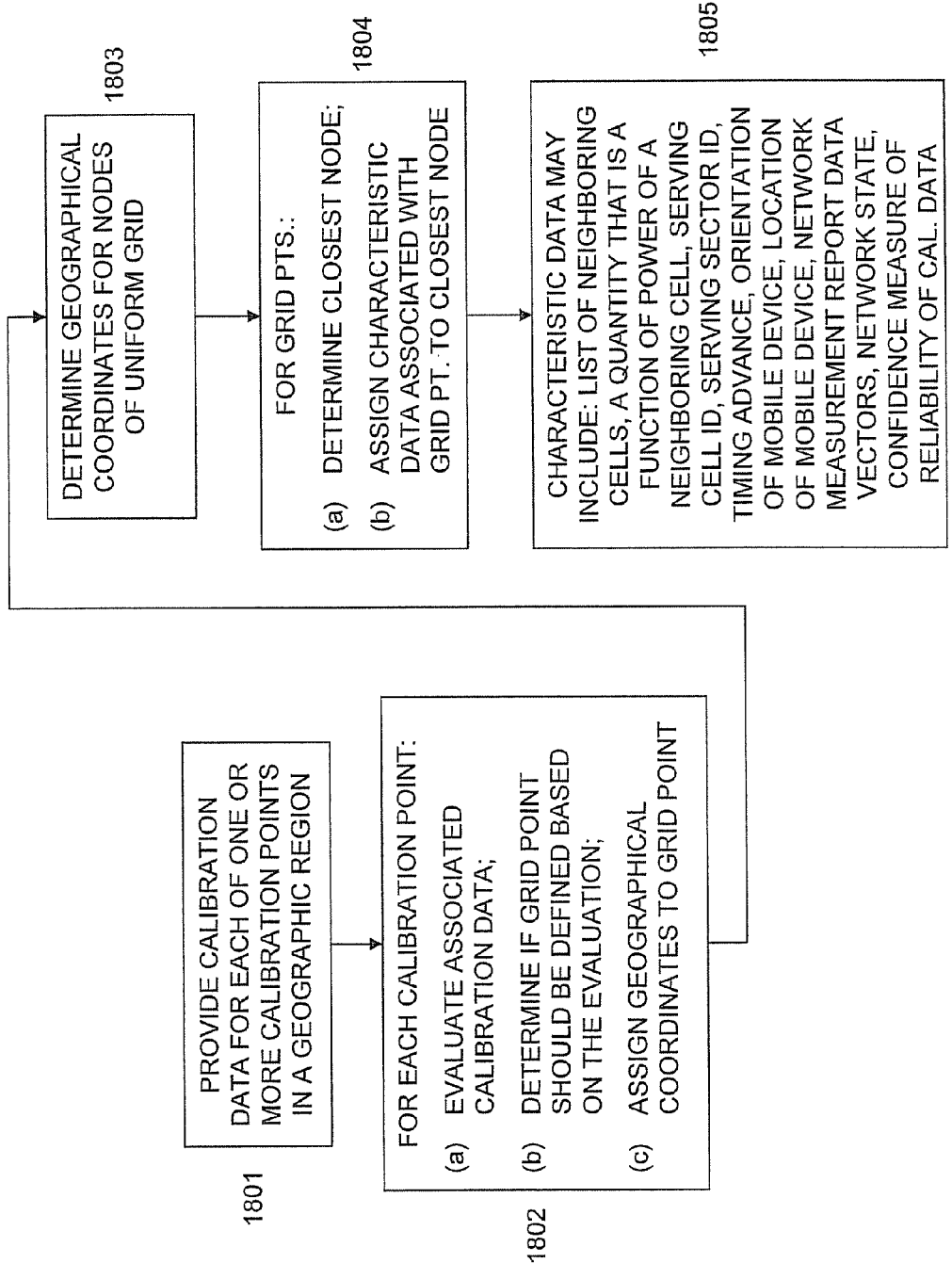
FIG. 18 is a flow chart for a method for assigning geographical coordinates including characteristic data to nodes of uniform grid according to an embodiment of the present subject matter.

Further, FIG. 18 is a flow chart for a method for assigning geographical coordinates including characteristic data to nodes of uniform grid according to an embodiment of the present subject matter. Here, blocks 1801, 1802, 1803, and 1804 are similar to blocks 1701, 1702, 1703, and 1704, respectively. At block 1805, the characteristic data may include a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 19:
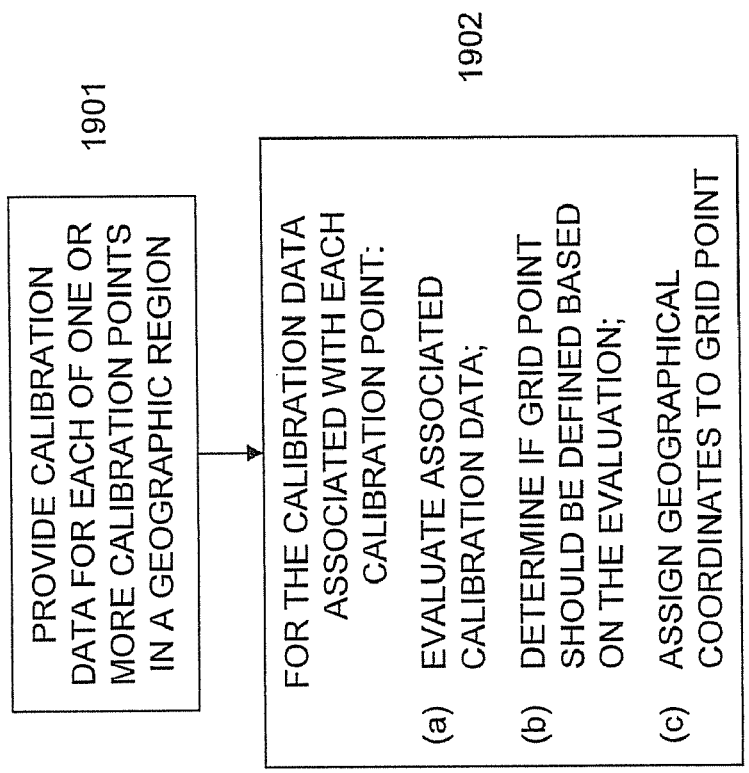
FIG. 19 is a flow chart for a method for assigning geographical coordinates for calibration data for each of one or more calibration points in a geographic region according to an embodiment of the present subject matter.

With reference to FIG. 19, a flow chart is illustrated for a method for assigning geographical coordinates for calibration data for each of one or more calibration points in a geographic region according to an embodiment of the present subject matter. At block 1901, calibration data may be provided for each of one or more calibration points in a geographic region. At block 1902, for the calibration data for each of the calibration points in the geographic region, the calibration data is evaluated and a determination is made as to whether a grid point should be defined based on the evaluation. If it is determined that a grid point is to be defined, geographical coordinates are assigned to the grid point so that the grid point may be useful in estimating the location of a mobile device.

Figure 20:
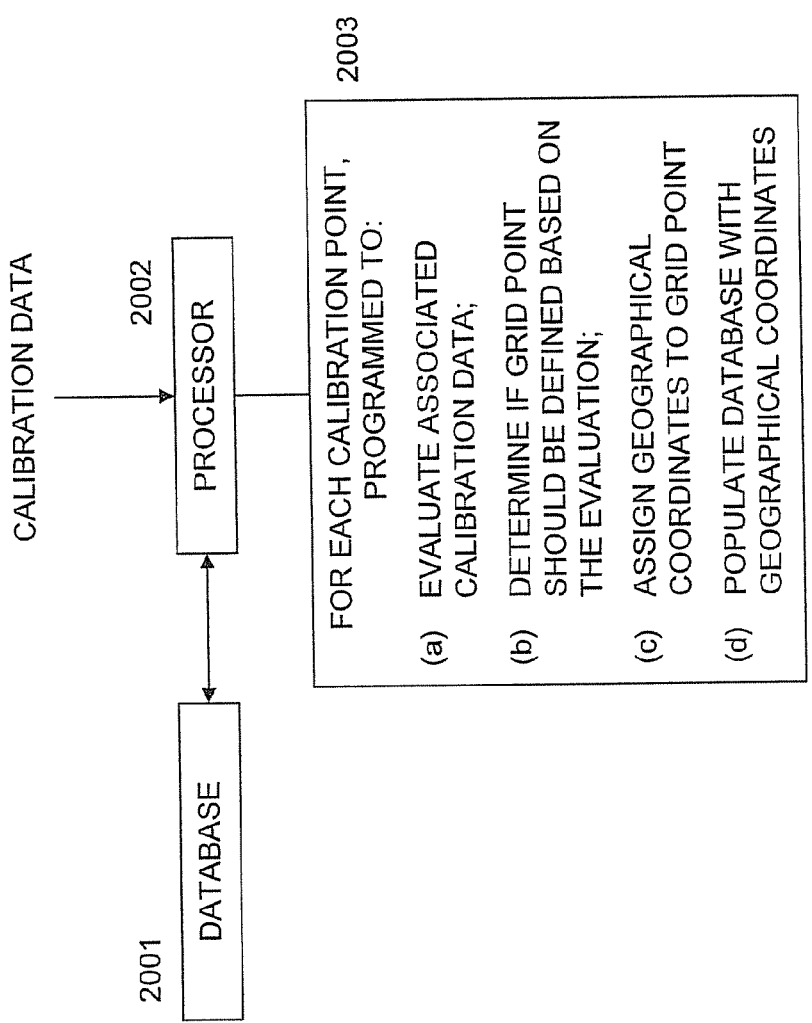
FIG. 20 is a block diagram for a system for assigning geographical coordinates according to an embodiment of the present subject matter.

With attention now directed to FIG. 20, a block diagram is presented that represents a system for assigning geographical coordinates according to an embodiment of the present subject matter. A database 2001 is operatively connected to a processor 2002. The processor 2002 is capable of receiving calibration data for each of one or more calibration points in a geographic region. The processor 2002 may be programmed, as shown in block 2003, to evaluate the calibration data associated with the calibration points, determine if at least one grid point should be defined based on the evaluation, assign geographical coordinates to the one or more grid points, and populate the database 2001 with the geographical coordinates.

Figure 21:
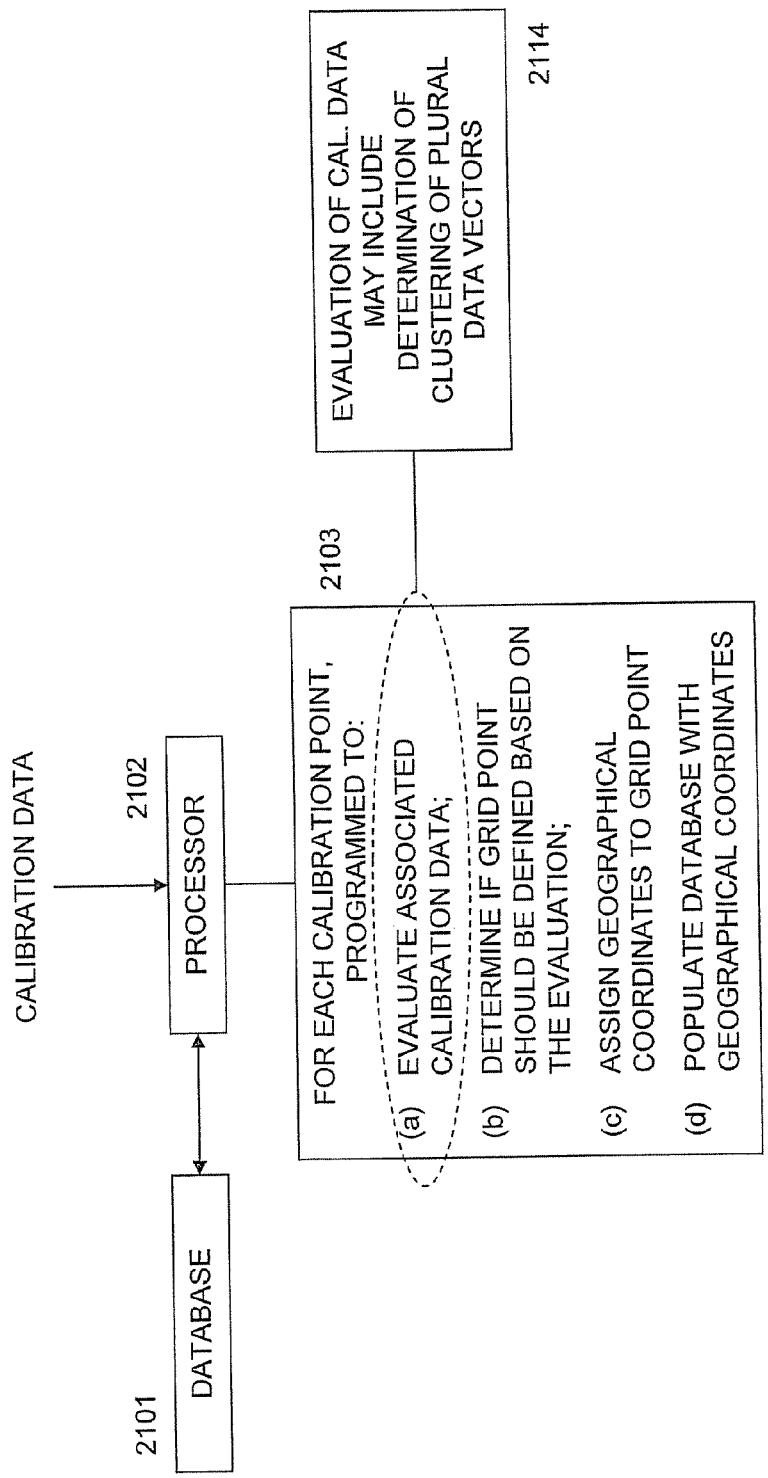
FIG. 21 is a block diagram for a system for assigning geographical coordinates including a determination of clustering of plural data vectors according to an embodiment of the present subject matter.

FIG. 21 is a block diagram for a system for assigning geographical coordinates including a determination of clustering of plural data vectors according to an embodiment of the present subject matter. The database 2101, the processor 2102, and block 2103 are similar to the database 2001, the processor 2002, and block 2003, as described above, respectfully. At block 2114, for each of select ones of the calibration points, the calibration data may include multiple data vectors and the evaluating of the calibration data may include a determination of clustering of the multiple data vectors.

Figure 22:
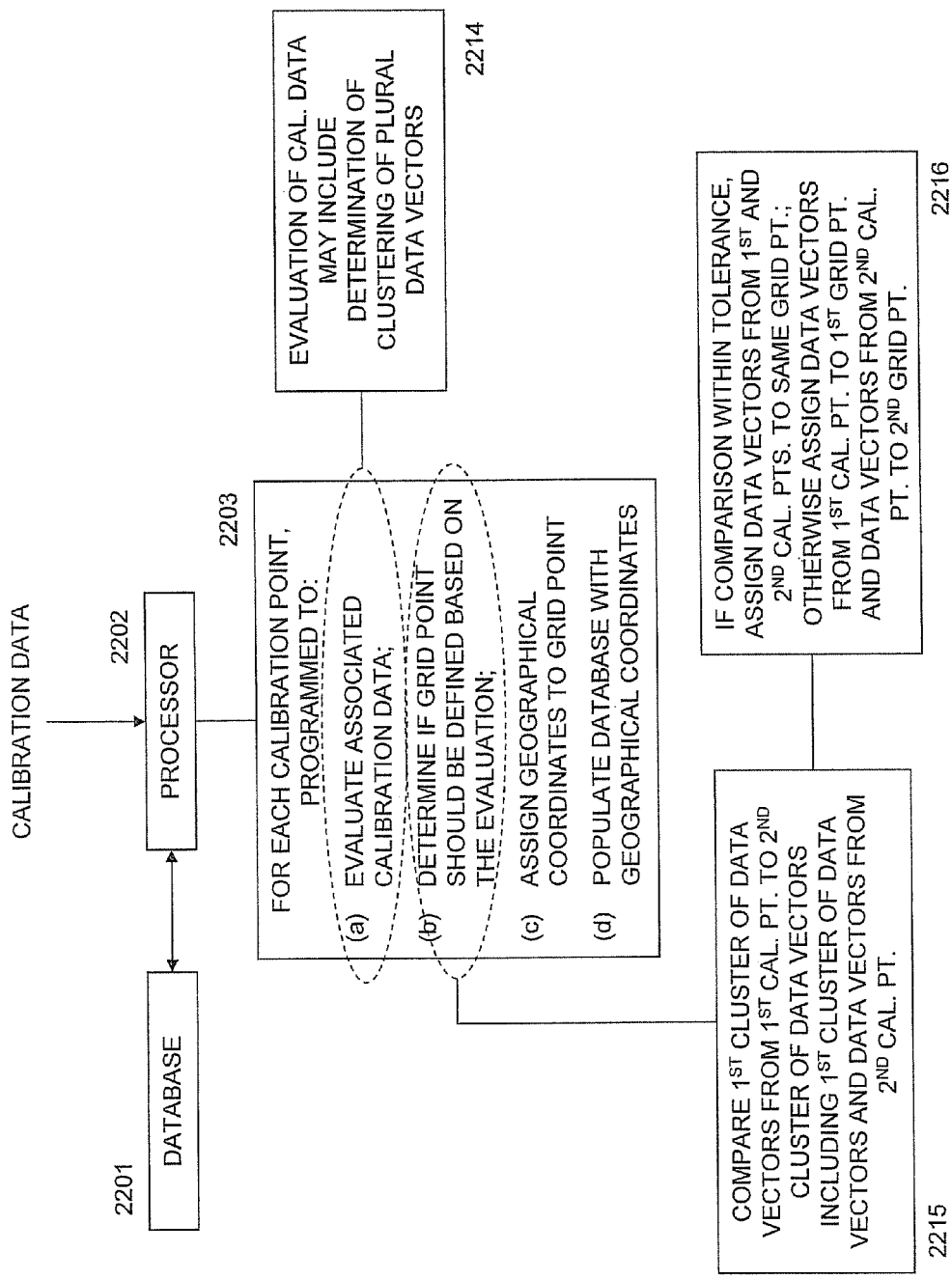
FIG. 22 is a block diagram for a system for assigning geographical coordinates including comparing clusters of data vectors from different calibration points according to an embodiment of the present subject matter.

FIG. 22 is a block diagram for a system for assigning geographical coordinates including comparing clusters of data vectors from different calibration points according to an embodiment of the present subject matter. The database 2201, the processor 2202, block 2203, and block 2214 are similar to the database 2101, the processor 2102, block 2103, and block 2114, as described above, respectfully. At block 2215, the determination if at least one grid point should be defined based on the evaluation may include comparing a first cluster of data vectors from a first one of the select calibration points to a second cluster of data vectors, where the second cluster of data vectors may include the first cluster of data vectors and data vectors from a second one of the select calibration points. At block 2216, if the result of the comparison is within a predetermined tolerance, then the data vectors from the first and second calibration points may be assigned to the same grid point; otherwise, the data vectors from the first calibration point may be assigned to a first grid point and the data vectors from the second calibration point may be assigned to a second grid point.

Figure 23:
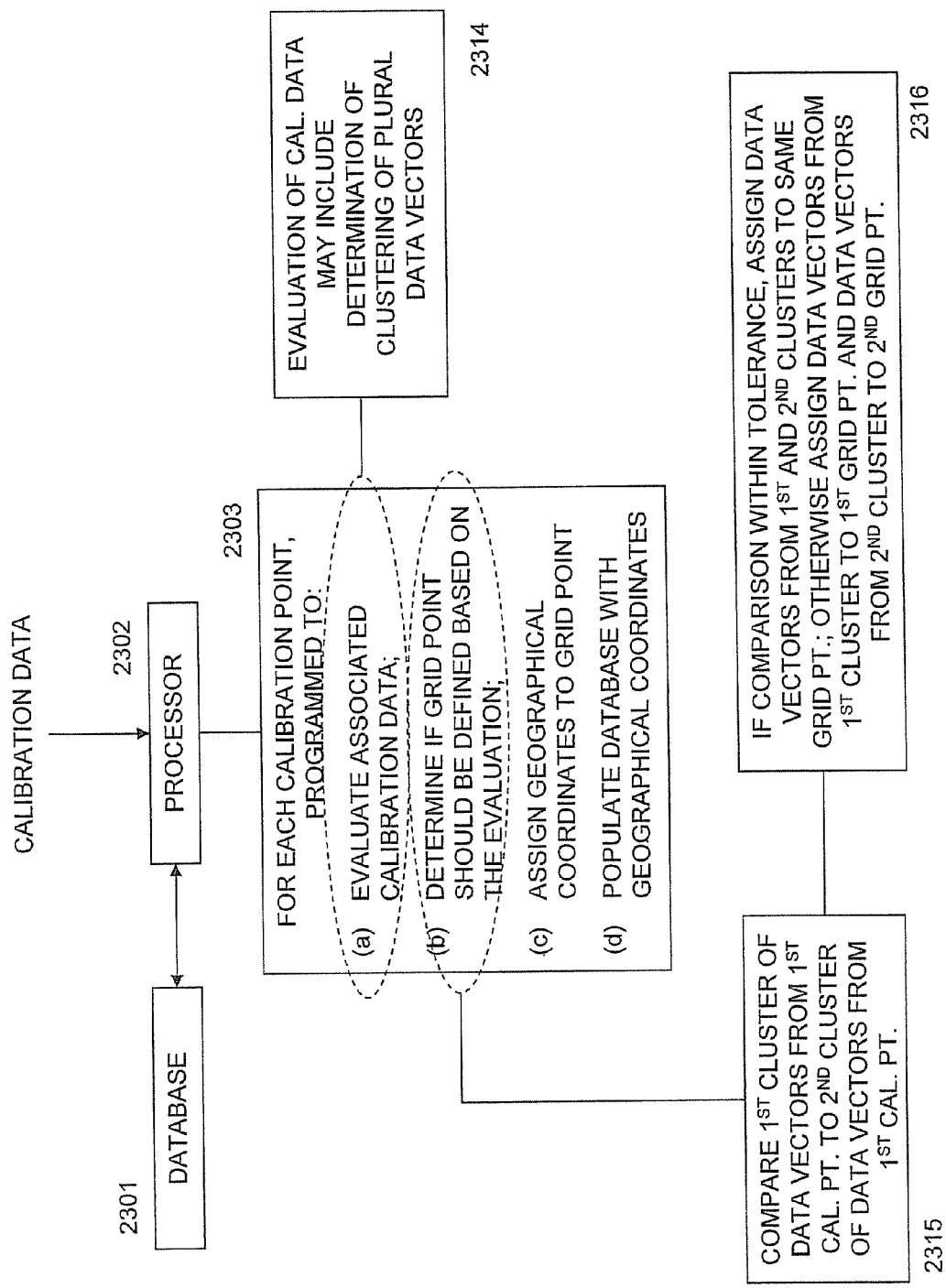
FIG. 23 is a block diagram for a system for assigning geographical coordinates including comparing clusters of data vectors from the same calibration point according to an embodiment of the present subject matter.

FIG. 23 is a block diagram for a system for assigning geographical coordinates including comparing clusters of data vectors from the same calibration point according to an embodiment of the present subject matter. The database 2301, the processor 2302, block 2303, and block 2314 are similar to the database 2101, the processor 2102, block 2103, and block 2114, as described above, respectfully. At block 2315, the determination if at least one grid point should be defined based on the evaluation may include comparing a first cluster of data vectors from a first one of the select calibration points to a second cluster of data vectors from the first one of the select calibration points. At block 2316, if the result of the comparison is within a predetermined tolerance, then the data vectors from the first and second calibration points may be assigned to the same grid point; otherwise, the data vectors from the first cluster may be assigned to a first grid point and the data vectors from the second cluster may be assigned to a second grid point.

Figure 24:
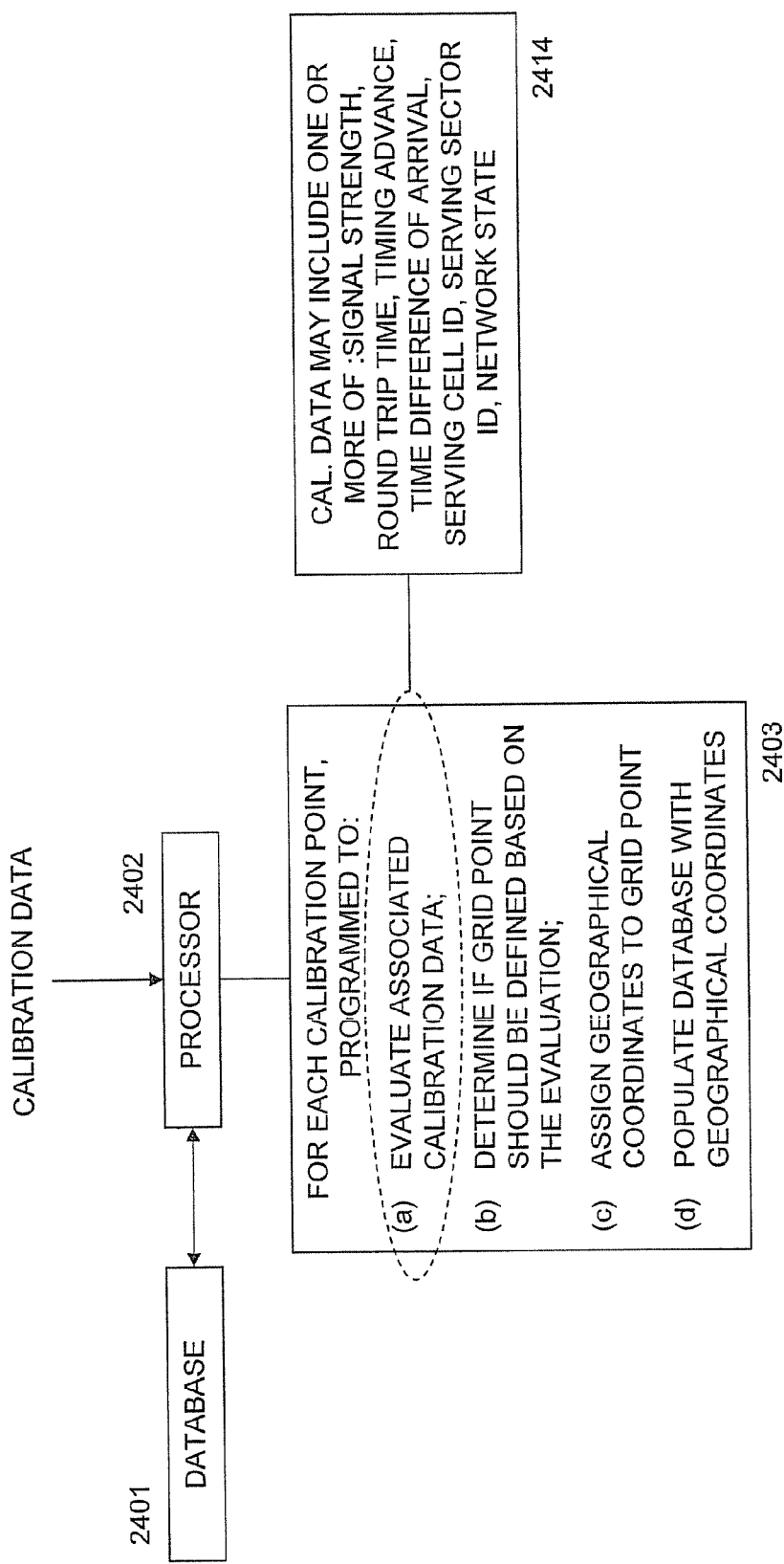
FIG. 24 is a block diagram for a system for assigning geographical coordinates including calibration data according to an embodiment of the present subject matter.

Looking now at FIG. 24, a block diagram is presented representing a system for assigning geographical coordinates including calibration data according to an embodiment of the present subject matter. The database 2401, the processor 2402, and block 2403 are similar to the database 2001, the processor 2002, and block 2003, as described above, respectfully. At block 2414, the calibration data may include: signal strength for a signal transmitted by a transmitter having a known location as received by a receiver at a calibration point; signal strength of a signal transmitted by a transmitter located at a calibration point as received by a receiver at a known location; round trip time for a signal traveling between a calibration point and a known location; timing advance of a signal received by a mobile device at a calibration point; time difference of arrival of multiple signals at a calibration point with respect to a pair of known locations as measured by a receiver at a calibration point or at the known locations; the identification of a serving cell or serving sector of a mobile device located at a calibration point; a state of a wireless network serving a mobile device, and combinations thereof.

Figure 25:
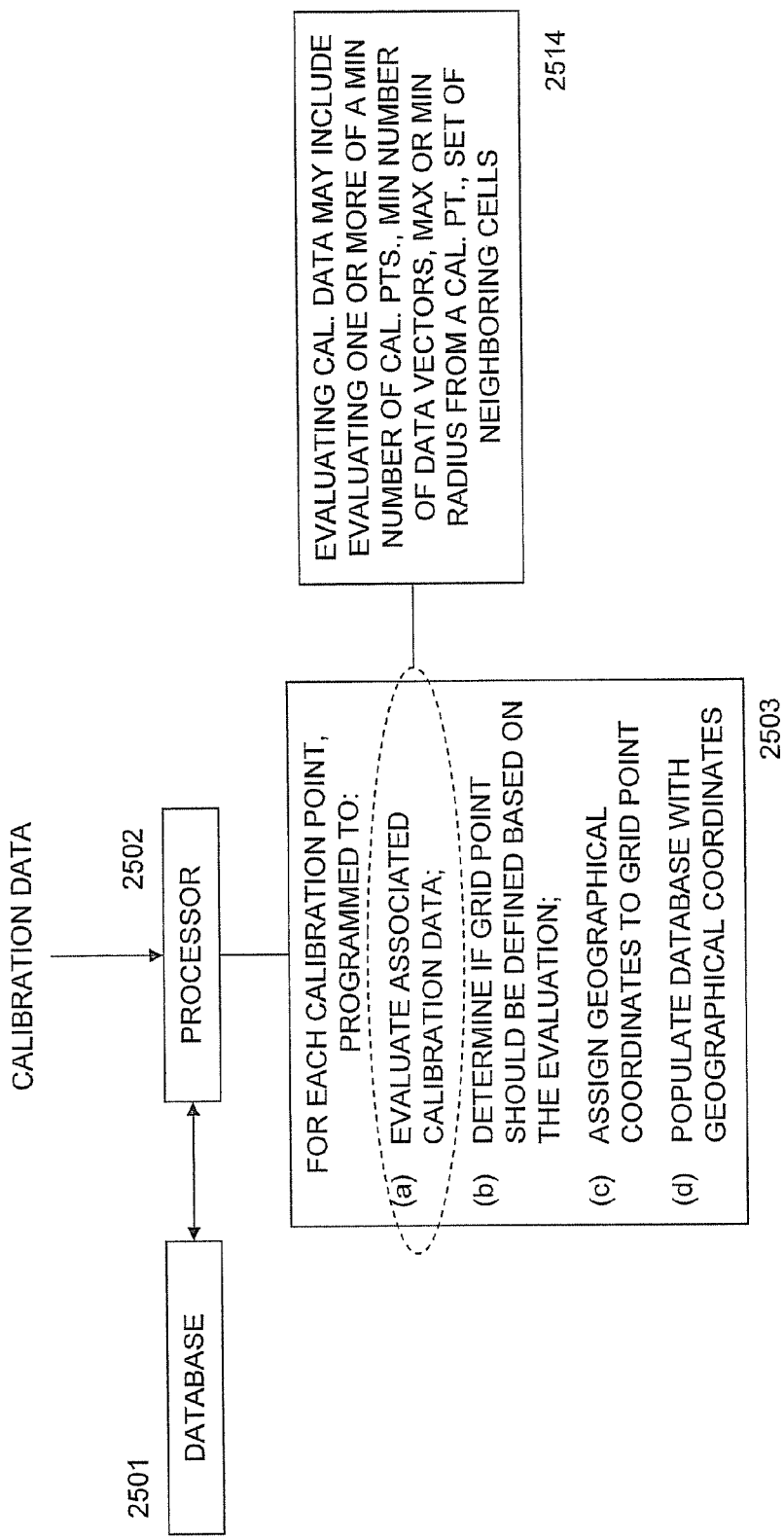
FIG. 25 is a block diagram for a system for assigning geographical coordinates including evaluating calibration data according to an embodiment of the present subject matter.

FIG. 25 is a block diagram for a system for assigning geographical coordinates including evaluating calibration data according to an embodiment of the present subject matter. The database 2501, the processor 2502, and block 2503 are similar to the database 2001, the processor 2002, and block 2003, as described above, respectfully. At block 2514, the evaluation of the associated calibration data may include an evaluation such as: a minimum number of unique neighboring calibration points as determined by calibration data of the neighboring calibration points; a minimum number of data vectors or network measurement reports; a predetermined maximum or minimum radius from a calibration point; a predetermined set of cells neighboring a cell serving a mobile device; and combinations thereof.

Figure 26:
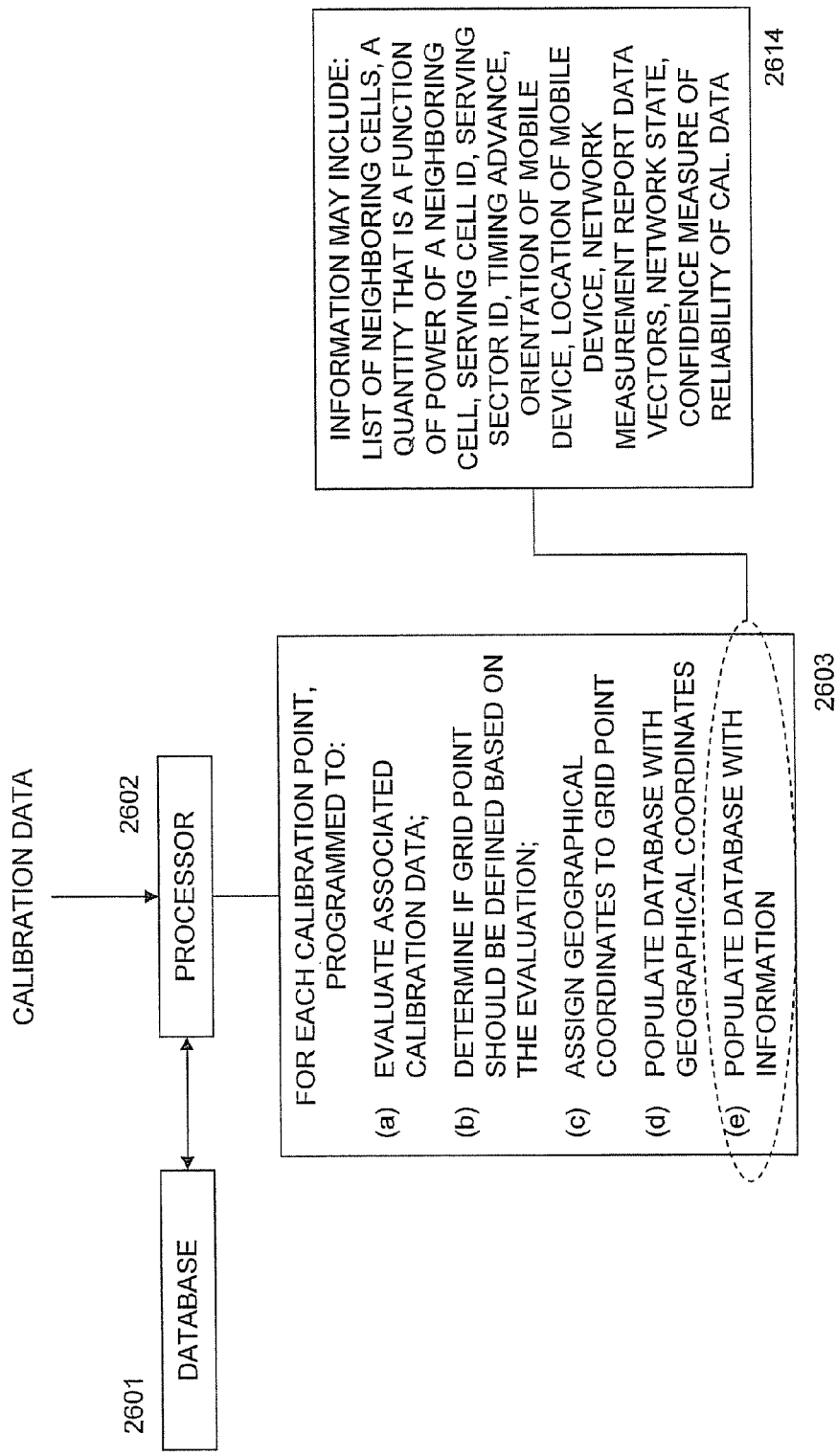
FIG. 26 is a block diagram for a system for assigning geographical coordinates including information for populating a database according to an embodiment of the present subject matter.

FIG. 26 is a block diagram for a system for assigning geographical coordinates including information for populating a database according to an embodiment of the present subject matter. The database 2601 and the processor 2602 are similar to the database 2001 and the processor 2002, as described above, respectfully. At block 2603, the processor 2602 may be programmed to evaluate the calibration data associated with the calibration points, determine if at least one grid point should be defined based on the evaluation, assign geographical coordinates to the one or more grid points, populate the database 2601 with the geographical coordinates, and populate the database 2601 with information which may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

Figure 27:
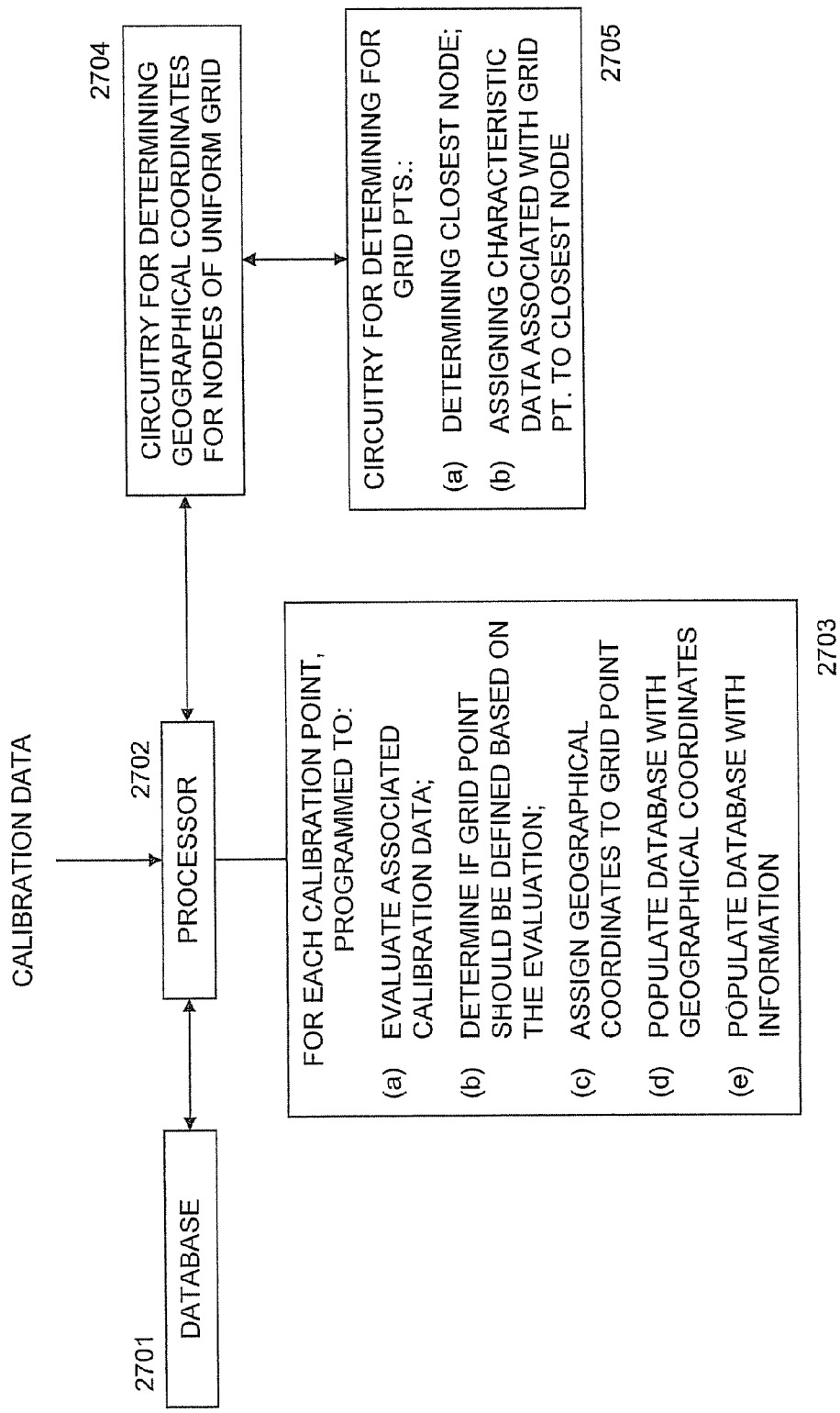
FIG. 27 is a block diagram for a system for assigning geographical coordinates including circuitry for determining geographical coordinates for nodes of a uniform grid according to an embodiment of the present subject matter.

FIG. 27 is a block diagram for a system for assigning geographical coordinates including circuitry for determining geographical coordinates for nodes of a uniform grid according to an embodiment of the present subject matter. The database 2701, the processor 2702, and block 2703 are similar to the database 2601, the processor 2602, and block 2603, as described above, respectfully. The system may further comprise circuitry 2704 for determining geographical coordinates for each of a plurality of nodes of a uniform grid spanning the geographic region, and circuitry 2705 for determining, for each of the one or more grid points, a closest node from the plurality of nodes of the uniform grid and assigning characteristic data associated with each of the grid point to its closest node.

Figure 28:
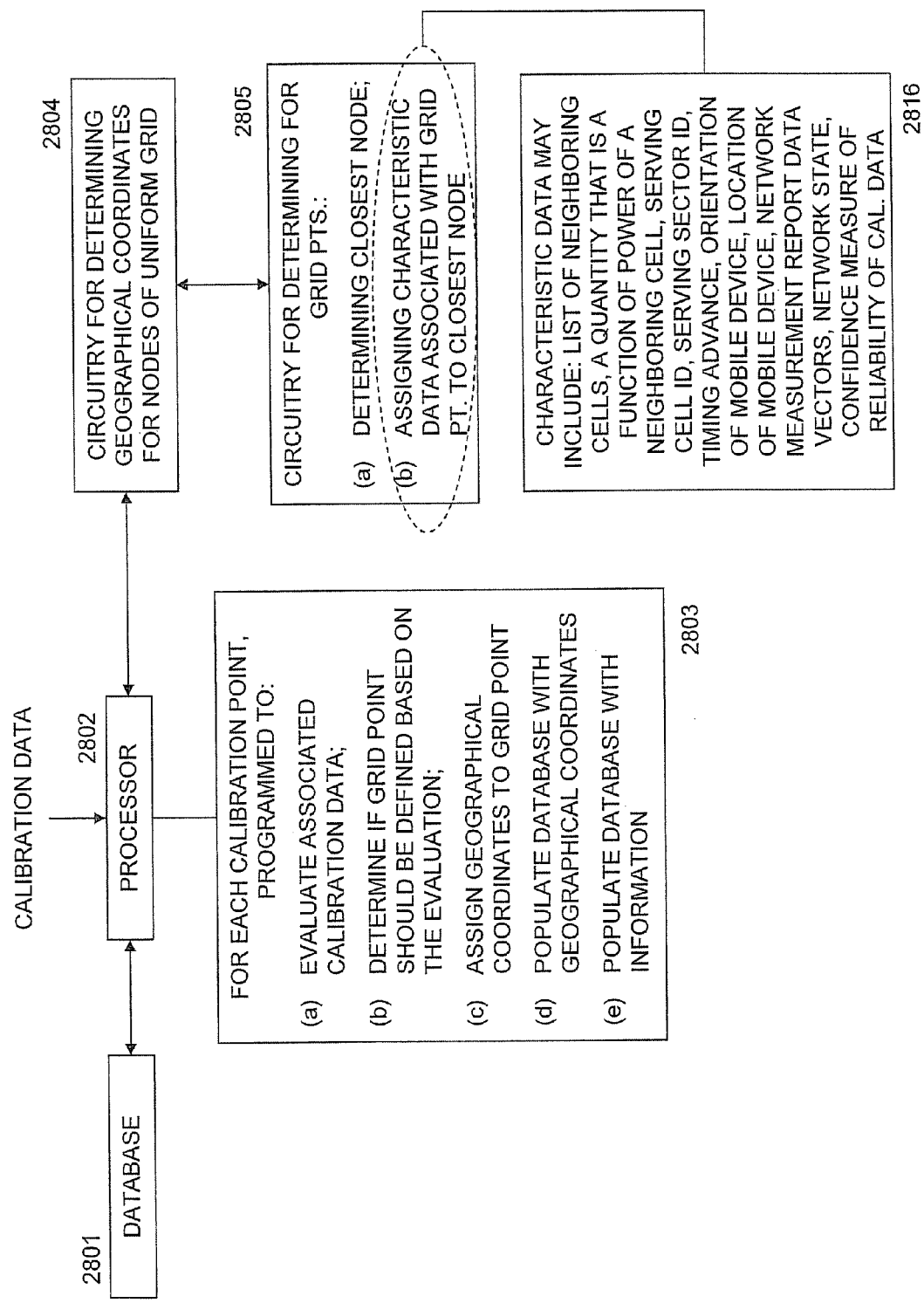
FIG. 28 is a block diagram for a system for assigning geographical coordinates including characteristic data according to an embodiment of the present subject matter.

FIG. 28 is a block diagram for a system for assigning geographical coordinates including characteristic data according to an embodiment of the present subject matter. The database 2801, the processor 2802, block 2803, circuitry 2804, and circuitry 2805 are similar to the database 2701, the processor 2702, block 2703, circuitry 2704, and circuitry 2705, as described above, respectfully. At block 2816, the characteristic data may include: a list of cells neighboring a cell serving a mobile device; a quantity that is a function of a power level of one or more cells neighboring a cell serving a mobile device; an identity of a cell or a sector serving a mobile device; a timing advance parameter; a geographical orientation of a mobile device; a location of a mobile device; network measurement report data vectors; a state of a network serving a mobile device; a confidence measure indicative of a reliability of the calibration data; and combinations thereof.

In a typical signal strength pattern matching mobile location system the time allowed to produce a location may be such that multiple NMRs and sets and subsets thereof may be available. By way of a non-limiting example, in the GSM air standard, mobile measurements are reported at an approximate rate of approximately two per second. Generally, the time allowed to produce a location may be on the order of thirty seconds. It is therefore an aspect of embodiments of the present subject matter to improve location accuracy by combining individual locations from calibration data, e.g., multiple NMRs, to produce a final location estimate.

Grid-based signal strength pattern matching location systems typically determine a quantitative measure of how close each candidate grid point matches with mobile-reported measurement parameters. An estimate of a mobile device's location may then be given by a grid point having the closest match thereto or a location interpolated between several grid point locations. As multiple NMRS are generally available during the time allotted to report the estimated location of a mobile device, embodiments of the present subject matter may utilize each NMR to generate an independent location estimate. These independent or individual location estimates may then be averaged or another mathematical function employed thereon to produce a final estimated mobile location that may be statistically more accurate.

Many location systems may also "fall back" to a default location as a function of the serving cell when the system is unable to determine a grid point match location. In such an instance, a location status variable may be utilized to identify the default location as a fall back location. Such a fall back location is generally less accurate than a location estimate determined by a pattern matching location system; however, an exemplary location combiner may omit any fall back locations and average or combine location estimates determined by an exemplary pattern matching algorithm.

A correlation may exist between location accuracy and mismatch distance metrics, e.g., "cost" values. The correlation may be exploited by flagging individual location estimates as having a high cost or metric (e.g., using a location status variable), and the corresponding location estimates are likely to possess a large location error. Embodiments of the present subject matter may present a refinement to the location combiner by skipping or omitting individual locations exceeding a predetermined "cost" threshold. Thus, the resulting location accuracy may be significantly improved. In further embodiments, the correlation between mismatch distance metrics and location accuracy may be exploited by employing weighted averaging of the individual estimated locations, weighting by an inverse of the metrics, normalizing by a sum of the inverses, or any combination thereof. A further metric that may be utilized for weighting the contribution of individual location estimates to a final location estimate may be the number of reporting neighboring cells. By way of a non-limiting example, assuming five individual location estimates are combined and four of the five individual location estimates possessed six reporting neighboring cells and the fifth location estimate possessed four reporting neighboring cells, the fifth location estimate may then be de-weighted in the final location estimation.

Another embodiment of the present subject matter may identify and omit outlier individual location estimates to improve the final location estimation. For example, a Mahalanobis distance from each individual location estimate to the final location estimate may be determined. A dynamic distance threshold may be determined from the median of these distances multiplied by a configurable factor. An individual location estimate having a distance to the final location estimate exceeding the threshold may be identified as an outlier. The final location estimate may then be re-determined with the outlier locations omitted. In the event that weighted averaging is utilized in such a determination, the weights may be re-determined prior to the final location estimation.

It may also be noted that estimated locations derived utilizing subsets of available NMRs may often differ. For example, considering an NMR including a set of ordered (e.g., in descending magnitude) reporting neighboring cell (NC) power levels, with the NC having an order ABCDE. If the lowest power NC (NC=E) is omitted from the NMR, the locations determined using ABCD NCs may be different from ABCDE. Similarly, the location determined for ABCE NCs may differ from that for ABDE NCs.

An examination or evaluation of the location estimates derived from subsets of the NMRs may provide an indication regarding the quality of the final location estimate. By way of a non-limiting example, if the location estimates derived utilizing any possible method of mapping the NMR or sets thereof to a specific geographic location or grid point, whether using NUGs or uniform grid points, agree under combinations of subsets, the confidence in the location estimate may be high and thus represent a confidence measure on the location estimate. Further, the fraction of total location estimates within a predetermined distance of the final location estimate may also qualify as a confidence measure.

In one embodiment of the present subject matter, for each NMR, one may form a set of all subsets of a selected NMR. Therefore, in a non-limiting example of an ordered set of NCs given by ABC, a full set of subsets is {ABC, AB, AC, BC, A, B, C}. In each case, an estimated location may be derived utilizing any method of location. Each of the locations in this set of locations, L, may possess an associated probability or other measure derived from the particular location method, thus defining a set M. A variety of schemes may be defined and implemented upon the set L and the set of associated measures on L, given by M, such as, but not limited to: (a) computing the final estimated location by clustering the set L without any reference to the measures in M; (b) computing the final estimated location as the centroid of a region containing the tightest cluster in L having an aggregate measure higher than some pre-set value; (c) computing the final estimated location as the location of the NUG (e.g., centroid of the NUG) which occurs most often in L; (d) computing the final estimated location by clustering the subset of L obtained by dropping the least power member in the NMR successively (e.g., the subset {ABC, AB, A}); (e) computing the final estimated location as the subset of L obtained by successively dropping the least power member in the NMR and with weighting by the corresponding measure in M.

Considering that the individual marginal probabilities for each NMR component, characteristic or parameter over a set of candidate NUGs or uniform grid points (UG) have been determined, it may be assumed that for every subset in L, the measure set M provides the joint probability for the subsets of the NMR. Using the subset AB in the previous example, the marginal probability for A, B and C over all NUGs has been determined. To determine the joint probability of A and B, for example, the marginal probabilities for A and B may be multiplied over the NUGs (or other locations). This generates the measure set M, and having the set L and set M defined, any one or combination of the methods in (a)-(e) described in the previous paragraph may be applied thereto for an estimation of an exemplary confidence measure.

The same principles may be applied to multiple NMRs and each of their respective subsets where each subset of each NMR may be assigned its respective measure in a now larger set M. It follows that the methods in (a)-(e) described above are equally applicable. In the case of multiple NMRs, a representative NMR may be determined through a clustering algorithm applied to each parameter of the NMR viewed over the set of NMRs. The methods in (a)-(e) described above may then be applied to this representative NMR for an estimation of an exemplary confidence measure.

It is also an aspect of embodiments of the present subject matter to provide an estimate of the location error in a signal strength pattern matching location system. As discussed above, a confidence measure may be determined that provides an indication of the quality of the location estimate.

In one embodiment of the present subject matter, if the final estimated location is an average of the individual locations, the degree to which the individual locations are clustered around the final estimation may provide an indication of the location error. The error estimate may be determined as the average of the distances from each individual location to the final estimated location as a function of the following relationship:

$$\hat{e} \equiv \frac{\sum_{i=1}^{N} d_i}{N} \qquad (1)$$

where N is the number of estimated locations and $d_i$ is the Euclidean distance from the $i^{th}$ estimated location to the final estimated location.

The error estimate may also be determined as a function of the following relationship:

$$\hat{e} \equiv \frac{\sum_{i=1}^{N} w_i d_i}{\sum_{i=1}^{N} w_i} \qquad (2)$$

where N is the number of estimated locations, $d_i$ is the Euclidean distance from the $i^{th}$ estimated location to the final estimated location, and $w_i$ is a series of weighting factors.

As discussed above, when subsets of available NMRs are considered, however, the estimated locations may also differ. Therefore, an exemplary confidence measure may also be defined upon an estimated location given by any function that increases as the number of subset locations agree with the final estimated location. A non-limiting example of such a function may be the fraction of total locations that agree with the final estimated location or the fraction of total locations that lie within a certain distance of the final estimated location. In a further embodiment, weights may be assigned to the location estimates by utilizing the parameters or functions employed in determining the estimated location to thereby weight the determination of the associated confidence measure. Further exemplary confidence measures may be a function of pdfs, distortion measures, Mahalanobis distances, etc. with respect to any one or sets of NUGs.

Exemplary weighting quantities, e.g., distortion measures, pdfs, etc., may also be derived while estimating any location from single and multiple NMRs or their subsets, and may also be utilized to estimate location error. Empirically, the magnitudes of these weighting quantities may be correlated with the expected error. This relationship may be established graphically or in tabular format as a function of environmental characteristics (e.g., urban, suburban, seasonal, etc.). As a result, given a set of weighting quantities, an associated error may be predicted for a specific location estimate.

In one embodiment of the present subject matter, if the set of derived locations utilizing a set and/or subset of NMRs exhibit clusters, cluster separation may be employed between the highest aggregate weighted clusters to define an expected error. Such a distance may be termed as an inverse confidence measure as the larger the distance becomes, the greater the chance of error in the final location estimate if the corresponding cluster were selected. It follows that if the aggregate weight for a distant cluster is small, this distance should be modified to de-weight the associated distance by the weight of the cluster. An exemplary determination may multiply the cluster distance by a ratio of the weight of a selected cluster to the weight of a distant cluster; however, many such variations of this fundamental idea are clearly conceivable and such an example should not limit the scope of the claims appended herewith.

In another embodiment of the present subject matter, when each of the individual location estimates are generally at the same location (e.g., each located at the same calibration or grid point) the resulting error estimate would be zero or near zero. In such a scenario, the error estimate may be bounded by a minimum error value such as, but not limited to, a configurable constant based upon the overall expected system accuracy (e.g., the 25th percentile of overall system error, etc.).

It should be noted that the statistical averaged or weighted averaged location accuracy improves as the number of individual location estimates averaged or determined increases. For example, a final location estimate that comprises the average of two individual locations may generally be less accurate than a final location estimate comprising an average of twenty individual location estimates. Further, the optimal number of location estimates to combine or consider is dependent upon several factors including, but not limited to, the speed of the mobile device, the rate of acquiring NMRs, etc. This relationship may also be utilized to improve the error estimate as the number of individual location estimates increases.

In embodiments of the present subject matter wherein any one or multiple individual location estimates are "fall back" locations (e.g., default locations that may be based upon serving cell identification location), a default error estimate may be determined based upon an expected statistical accuracy of cell identification location. This determination may be a function of cell site geometry in an associated or corresponding operating market and may also be determined empirically through accuracy testing. Exemplary scenarios in which default locations may be encountered include, but are not limited to, when the NMR does not contain any NC measurements, when the available set of NMRs for the mobile device location generates a set of candidate locations that does not cluster (e.g., when the individual location estimates appear to be randomly distributed over a geographic region), when an NMR has very few reporting NCs and the confidence measure is poor, and combinations thereof.

In embodiments of the present subject matter where NMR data may be missing or invalid, the coordinates of the cell serving a mobile device may be retrieved from a respective site database from the serving cell identifier. In this instance, an exemplary default location may be a location that is a configurable distance away from the serving site. The configurable distance may or may not be positioned at a heading along the serving sector azimuth. For air standards in which certain parameters (e.g., timing advance, round trip timing, etc.) are available, this data may also be converted to an approximate range estimate from the serving site and utilized with other applicable parameters. For example, when such parameters are available, the default location may be enhanced by selecting a location on the serving cell azimuth at a distance from the site given by a TA range estimate.

In embodiments of the present subject matter where an NMR may include Time Difference of Arrival ("TDOA") data, this parameter may be utilized to derive a region within the cell to constrain the default location. For example, the TDOA, assuming the base station time offsets are known, defines a hyperbola in the region of interest. An intersection of this hyperbola with the applicable TA region to this cell may be utilized as a default location estimate. Alternatively, a default location estimate may be employed that does not rely on a serving sector heading if there exists apriori knowledge of sector coverage density. For example, if a sector coverage region can be determined (e.g., through drive testing, etc.), then the centroid of the sector coverage region may be stored in the respective site database by sector for each site and retrieved as a default location.

A further aspect of embodiments of the present subject matter may also improve location accuracy by interpolating between grid point locations when more than one grid point matches the calibration or reported data within a predetermined value. Generally, grid-based signal strength pattern matching location systems determine a quantitative measure of how close each candidate grid point (e.g., NUG or UG) matches mobile device reported measurement parameters. The location estimate of the mobile device may be given by the grid point having a match within a predetermined range. Further, as the actual location of the mobile device is generally not constrained to lie at a grid point location, interpolation between grid points may result in a more accurate location estimate.

During an exemplary interpolation according to one embodiment of the present subject matter, an analysis of whether interpolation should be performed may be determined as well as a selection of the appropriate grid or calibration points for the interpolation. Distance metrics may also be determined on any number of grid points. Exemplary metrics are discussed above and may include, but are not limited to, pdfs, Mahalanobis distance between parameter vectors, ordering number between ordered NCs in the NMR, NUG, UG, and combinations thereof. By way of a non-limiting example, it may be assumed that the distance metric for each of N candidate grid points (N>1) is determined and sorted. Representing the distance metric as C, then for each $i^{th}$ candidate, i=1 . . . N, an appropriate metric may be determined by the following relationship:

$$C\_Ratio_i = [C_i - C_{min}]/[C_N - C_{min}] \quad (3)$$

where $C_i$ is a metric associated with an $i^{th}$ candidate grid point, $C_N$ is a metric associated with the worst corresponding candidate grid point, and $C_{min}$ is a metric associated with the best corresponding candidate grid point. It follows that grid points having a $C_{ratio}$ less than a predetermined and configurable threshold value may be a candidate for interpolation.

Generally, interpolation occurs between adjacent or nearby grid points. To minimize or prevent interpolation across widely spaced grid points, the distance from each interpolation candidate grid point to the minimum cost grid point may be less than a configurable distance threshold.

In embodiments when there are few grid point candidates or when there are fewer than a configurable number of candidate grid points, an appropriate metric may be determined by the following relationship:

$$C\_Ratio_i = [C_i - C_{min}]/[C_{min}] \quad (4)$$

where $C_i$ is a metric associated with an $i^{th}$ grid point and $C_{min}$ is a metric associated with the best corresponding grid point. Equation (4) may thus enable an identification of appropriate grid points for interpolation when N is small. Equation (4) may also be performed to prevent interpolation between widely separated grid points.

Once the grid points for interpolation have been identified, one embodiment of the present subject matter may employ weighted averaging to determine a final interpolated location. An exemplary weight assigned to the $i^{th}$ grid point in computing the final interpolated location may be determined by the following relationship:

$$W_i = \frac{\frac{1}{C_i}}{\sum_{i=1}^{N}\left(\frac{1}{C_i}\right)} \quad (5)$$

where $C_i$ is a metric associated with an $i^{th}$ grid point. Weighted averaging may also be utilized rather than uniform weighting to ensure that the best matching grid point (i.e., minimum cost grid point) exerts a larger influence on the final location estimate.

As discussed above, each grid point (NUG or UG) may provide one or a plurality of parameters and/or functions characterizing the grid point. Given a received set of one or more NMRs obtained at an unknown location, an accurate estimation of the unknown location may be determined using a characterization of the grid points over a geographic region. In one embodiment of the present subject matter, a distortion measure may be determined between available NMRs and grid point characteristics to assist in the estimation.

Generally, embodiments of the present subject matter may utilize any number of methods to determine a distortion measure, e.g., a mismatch distance between mobile reported measurements and a candidate grid point's stored measurement data. The associated "cost" value may also be inversely proportional to an increasing function of the probability that the mobile device is located at or in the vicinity of a grid point.

In one embodiment of the present subject matter, a distortion measure may comprise a combination of the values of each parameter in an NMR and each corresponding parameter in the grid point (NUG or UG) characteristics. The distortion measure may generally increase as the mismatch between any of the parameters increases and vice versa. For example, an exemplary cost value may be determined utilizing a Mahalanobis distance provided by the following relationship:

$$COST = \alpha(TA_{rpt} - TA_{cand})^2 + \sum_i \left[\left(\frac{RxLevDiff(i)^2}{MAXDIFF^2}\right)NCCU\right] \quad (6)$$

where $\alpha$ is 0 or 1 which controls whether TA differences are included in the determination (e.g., 1 for GSM and 0 for iDEN), $TA_{rpt}$ is the TA for the NMR, $TA_{cond}$ is the TA for the candidate grid point in the calibration database and/or a representative value, RxLevDiff(i) represents the difference in RxLev (received signal strength) for the $i^{th}$ neighbor cell or serving cell, I is an index to neighbor or serving cells (e.g., if only NC received signal strengths are used and there are six reporting NCs, then i=1 to 6; if in addition, a serving cell signal strength is included then i=1 to 7), NCCU represents an NC cost unit where an increasing NCCU increases the cost penalty for RxLev difference relative to the cost penalty for TA difference, and MAXDIFF is a configurable parameter that limits the cost incurred for differences in signal strengths. MAXDIFF may be set to 20 dB or another configurable value. RxLev differences exceeding MAXDIFF would not incur an additional cost penalty.

Embodiments of the present subject matter may determine RxLevDff(i) through any number of methods including, but not limited to, the following relationships:

$$RxLevDiff(i) = (RxLevServ - RxLevNeigh(i))_{NMR} - (RxLevServ - RxLevNeigh(i))_{CND} \quad (7)$$

for i=1:6;

$$RxLevDiff(i) = (RxLevNeigh(1))_{NMR} - (RxLevNeigh(i))_{CND} \quad (8)$$

for i=1:6;

$$RxLevDiff(i) = (RxLevNeigh(1) - RxLevNeigh(i))_{NMR} - (RxLevNeigh(1) - RxLevNeigh(i))_{CND} \quad (9)$$

for i=2:6;

$$RxLevDiff(i) = (AvgRxLevNeigh - RxLevNeigh(i))_{NMR} - (AvgRxLevNeigh - RxLevNeigh(i))_{CND} \quad (10)$$

for i=1:6;

$$RxLevDiff(i) = (AvgRxLev - RxLev(i))_{NMR} - (AvgRxLev - RxLev(i))_{CND} \quad (11)$$

for i=1:7.

With reference to the above relationships, Equation (7) provides a comparison between the signal strengths of the serving cell and the $i^{th}$ NC between NMR and candidate points, Equation (8) provides a comparison between the signal strengths of the $i^{th}$ NC between NMR and candidate points, Equation (9) provides a comparison between the signal strengths of a first common NC and the $i^{th}$ NC between NMR and candidate points, Equation (10) provides a comparison between the average signal strengths of the NCs and the signal strengths of the $i^{th}$ NC between NMR and candidate points, and Equation (11) provides a comparison of the average signal strengths of the serving cells and NCs and the signal strengths of the $i^{th}$ serving cell and NC between NMR and candidate points.

Figure 29:
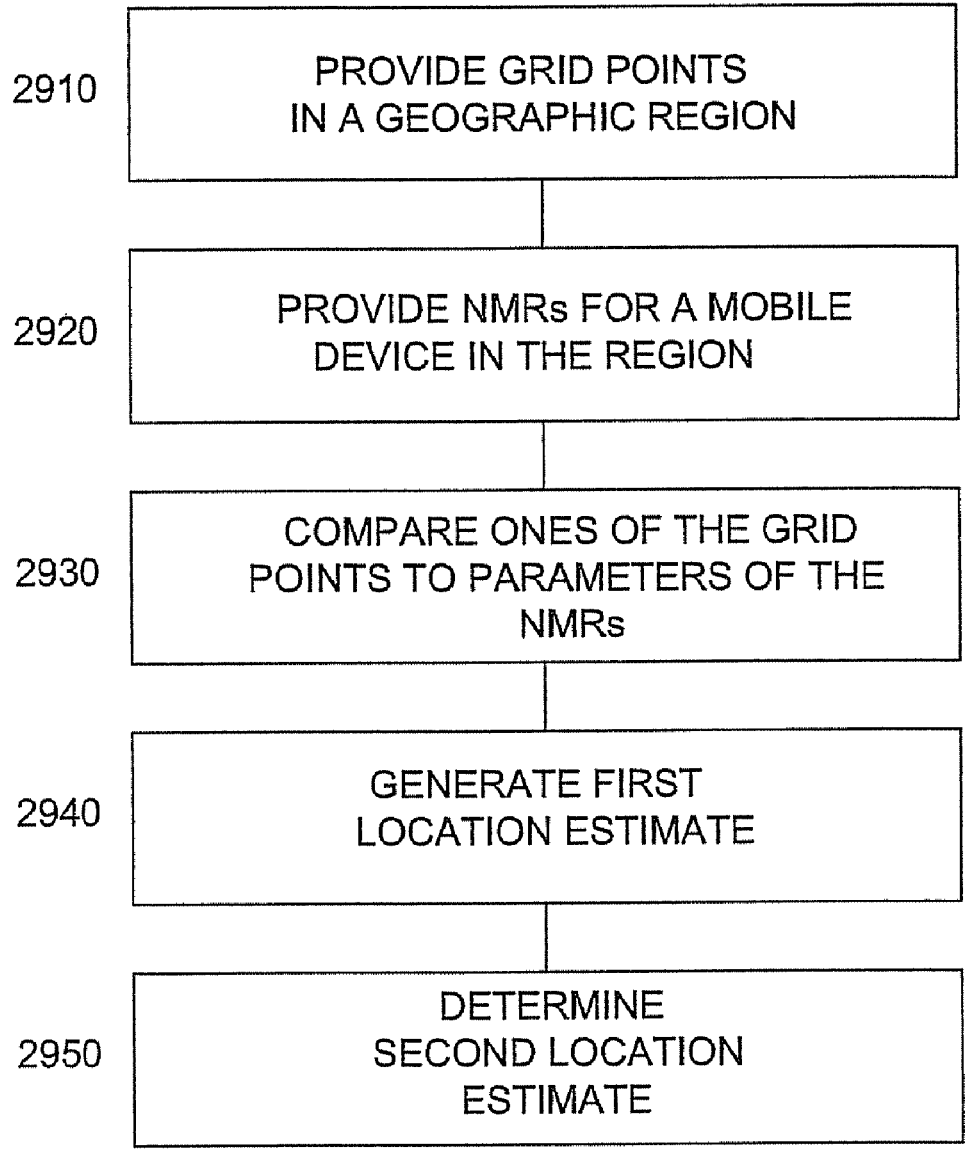
FIG. 29 is a flow chart for a method for locating a mobile device according to one embodiment of the present subject matter.

FIG. 29 is a flow chart for a method for locating a mobile device according to one embodiment of the present subject matter. With reference to FIG. 29, at block 2910, a plurality of calibration or grid points may be provided in a geographic region. At block 2920, a plurality of NMRs may be provided for a mobile device in the geographic region. Ones of the plurality of grid points may be compared to one or more parameters of ones of the plurality of NMRs in block 2930. In another embodiment of the present subject matter, the comparison may further comprise generating a distortion measure that is a function of a combination of parameters of ones of the plurality of network measurement reports and corresponding parameters of ones of the plurality of grid points. An exemplary distortion measure may be, but is not limited to, a Mahalanobis distance, a comparison of received signal strengths of a serving cell and a neighboring cell between ones of the plurality of NMRs and grid points, a comparison of received signal strengths of a neighboring cell between ones of the plurality of NMRs and grid points, a comparison of received signal strengths of a first common neighboring cell and another neighboring cell between ones of the plurality of NMRs and grid points, a comparison of average received signal strengths of reporting neighboring cells and received signal strengths of a neighboring cell between ones of the plurality of NMRs and grid points, a comparison of average received signal strengths of serving and reporting neighbor cells received signal strengths of a selected neighbor or serving cell between ones of the plurality of NMRs and grid points, and any combination thereof. A first location estimate of the mobile device may be generated for each of the ones of the plurality of NMRs in block 2940, and in block 2950, a second location estimate of the mobile device may be determined as a function of at least one of the generated first location estimates.

Figure 30:
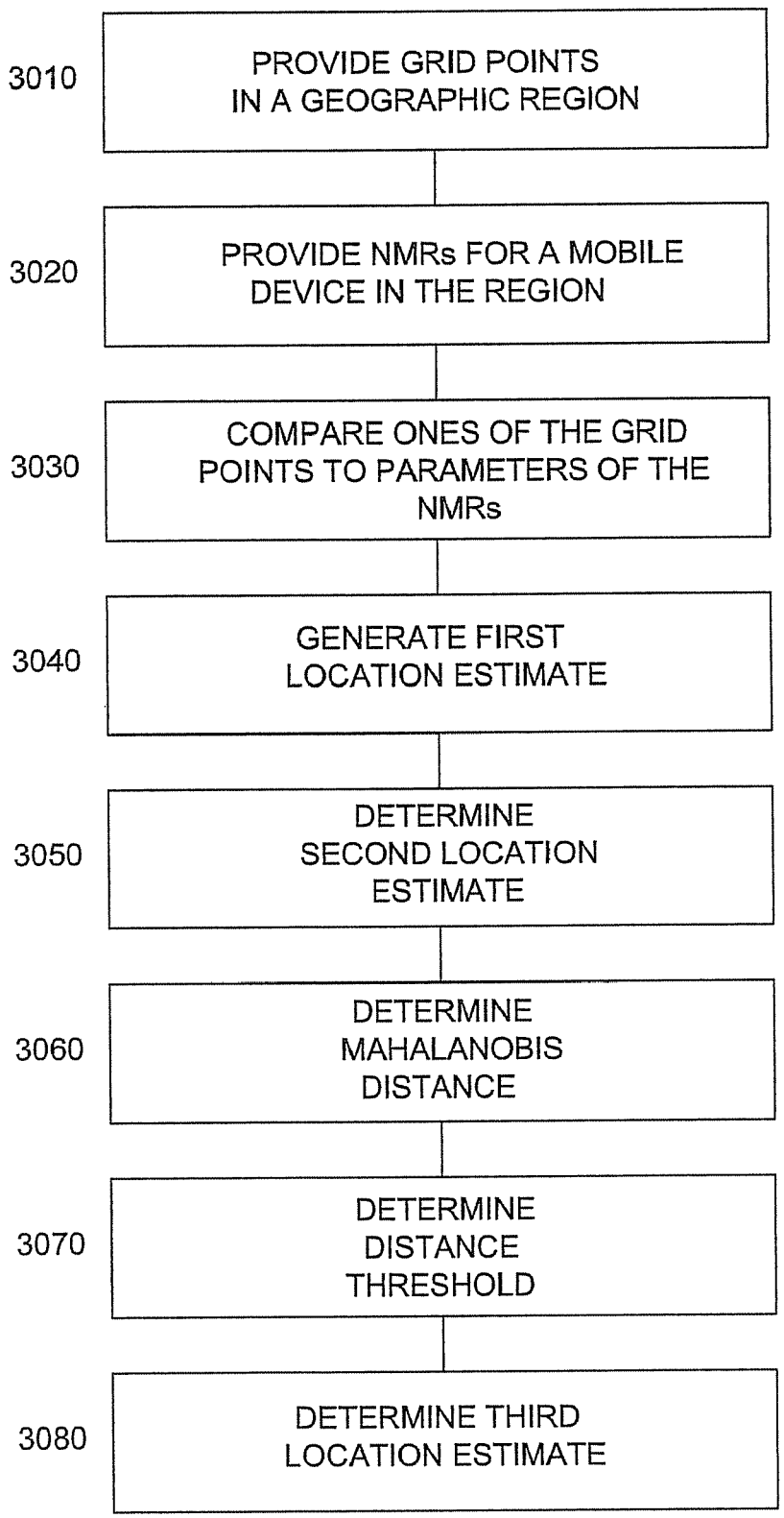
FIG. 30 is a flow chart for a method for locating a mobile device according to one embodiment of the present subject matter including identifying and omitting outlier first location estimates.

FIG. 30 is a flow chart for a method for locating a mobile device according to one embodiment of the present subject matter including identifying and omitting outlier first location estimates. With reference to FIG. 30, blocks 3010, 3020, 3030, 3040 and 3050 are similar to blocks 2910, 2920, 2930, 2940 and 2950, respectively. At block 3060, the method may further determine a Mahalanobis distance from each first location estimate to the second location estimate and at block 3070, determine a distance threshold from a median of the determined Mahalanobis distances multiplied by a predetermined factor. At block 3080, a third location estimate may then be determined by averaging two or more of the first location estimates. In such a determination the first location estimates having a Mahalanobis distance to the second location estimate greater than a predetermined distance threshold may be omitted from the third location estimate determination.

Figure 31:
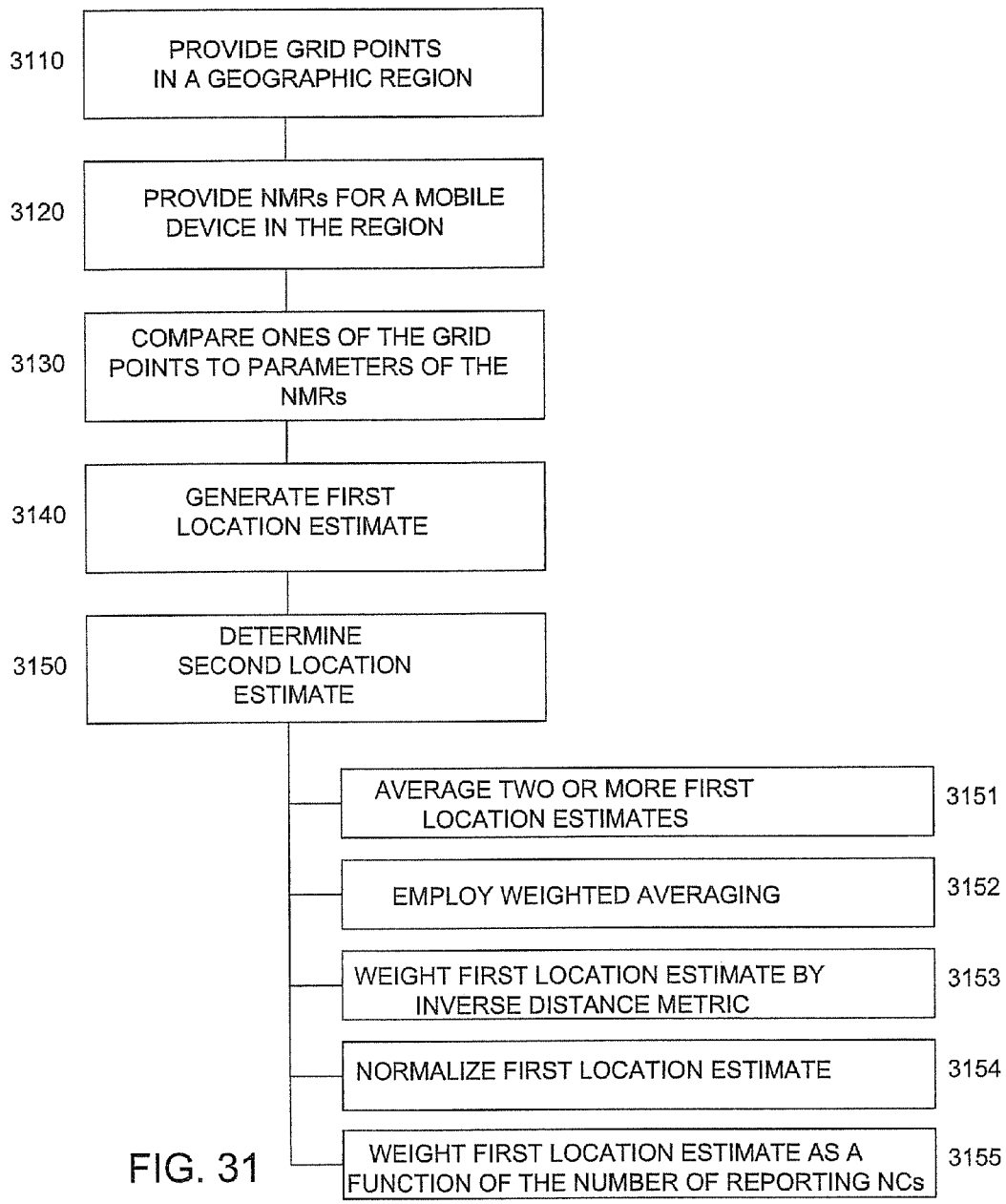
FIG. 31 is a flow chart for a method for locating a mobile device according to another embodiment of the present subject matter.

FIG. 31 is a flow chart for a method for locating a mobile device according to another embodiment of the present subject matter. With reference to FIG. 31, blocks 3110, 3120, 3130, 3140 and 3150 are similar to blocks 2910, 2920, 2930, 2940 and 2950, respectively. At block 3151, the determination of a second location estimate may further comprise averaging two or more first location estimates, or at block 3152, the determination of a second location estimate may further comprise employing a weighted averaging of ones of the first location estimates. At block 3153, the determination of a second location estimate may further comprise weighting a first location estimate by an inverse of a distance metric, or at block 3154, the determination of a second location estimate may further comprise normalizing a first location estimate by a sum of an inverse of a distance metric. Further, at block 3155, the determination of a second location estimate may further comprise weighting a first location estimate as a function of the number of reporting neighboring cells to a serving cell serving the mobile device.

Figure 32:
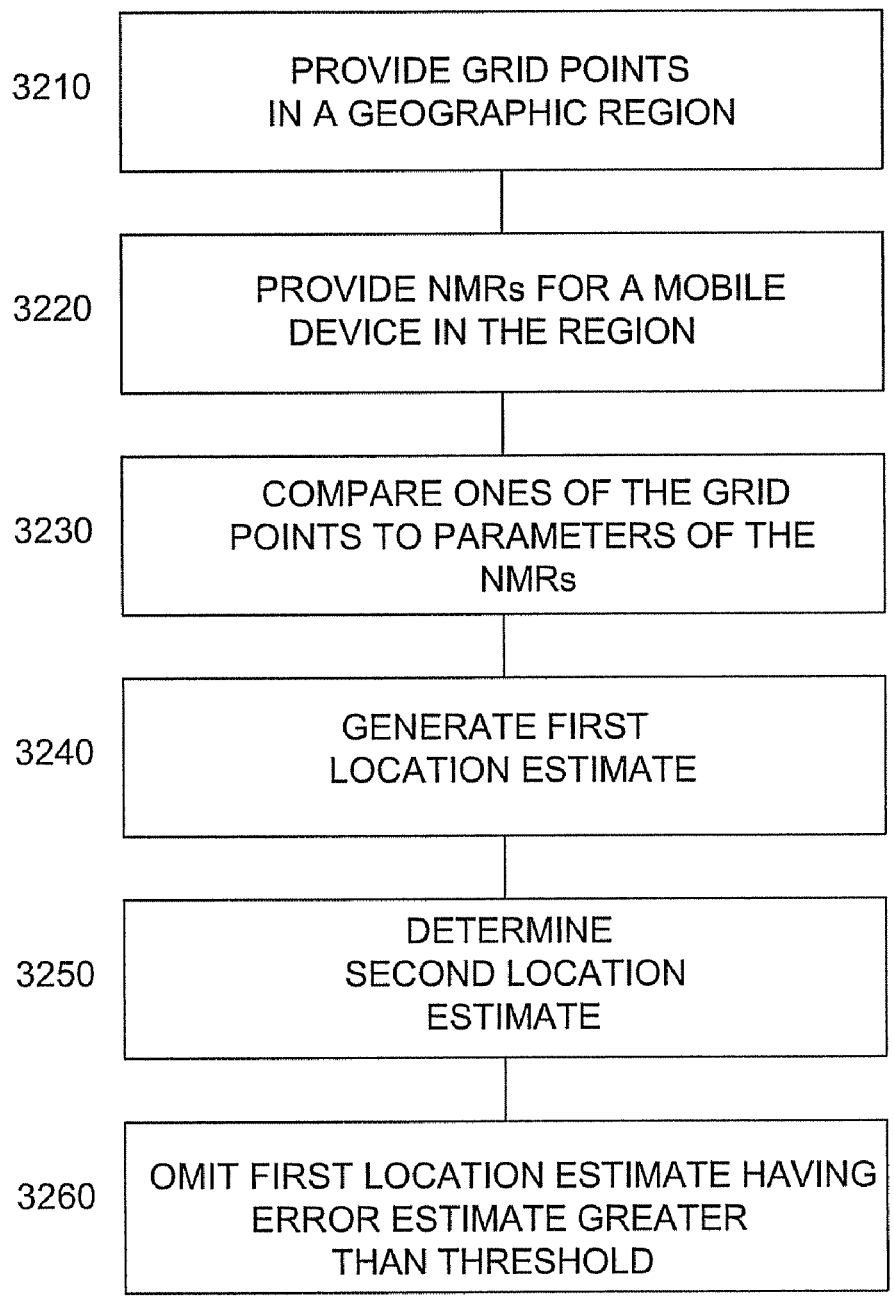
FIG. 32 is a flow chart for a method for locating a mobile device according to one embodiment of the present subject matter including omitting a first location estimate.

FIG. 32 is a flow chart for a method for locating a mobile device according to one embodiment of the present subject matter including omitting a first location estimate. With reference to FIG. 32, blocks 3210, 3220, 3230, 3240 and 3250 are similar to blocks 2910, 2920, 2930, 2940 and 2950, respectively. At block 3260, the method may further omit a first location estimate having an error greater than a predetermined threshold.

Figure 33:
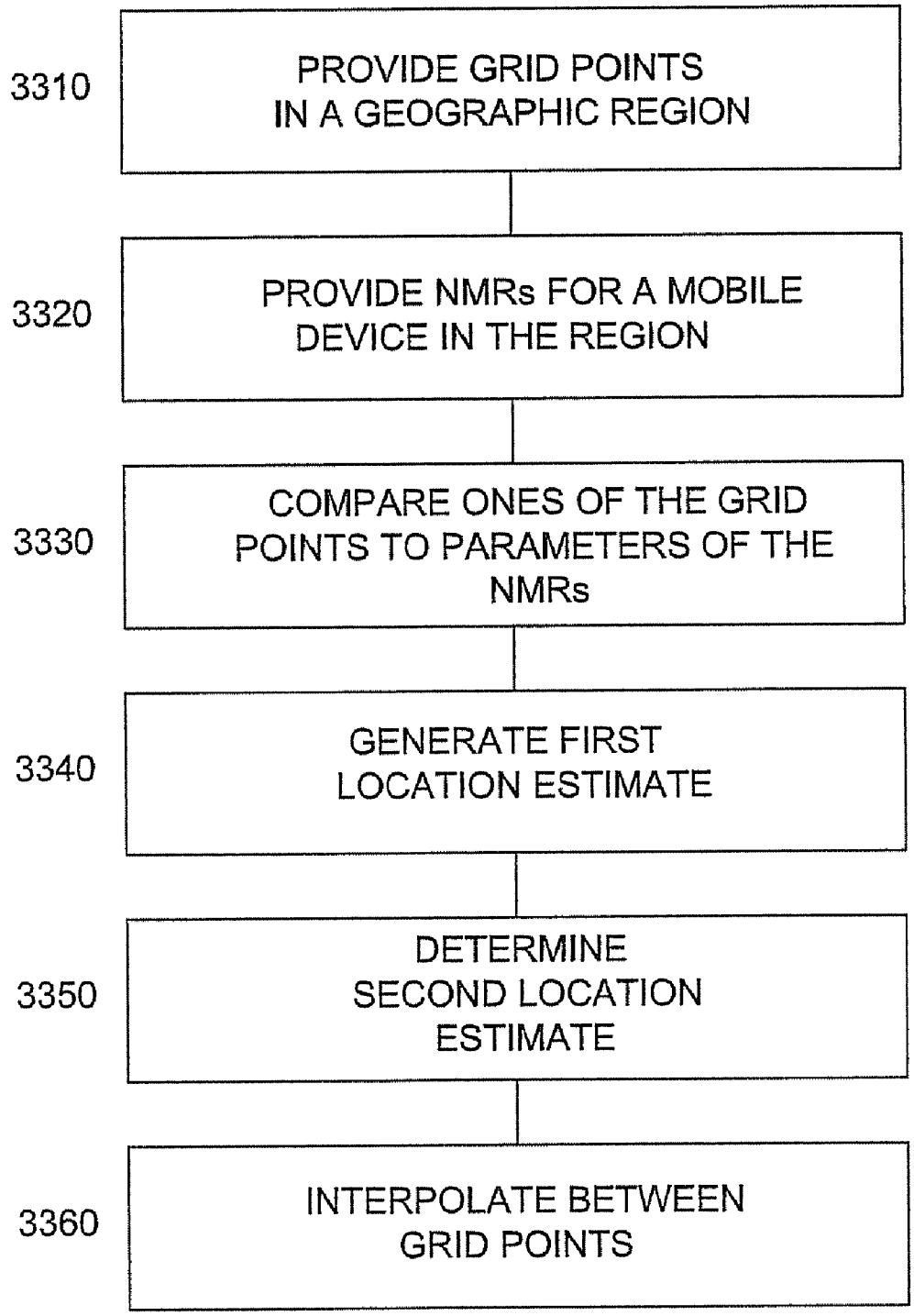
FIG. 33 is a flow chart for a method for locating a mobile device according to one embodiment of the present subject matter including interpolating between grid points.

FIG. 33 is a flow chart for a method for locating a mobile device according to one embodiment of the present subject matter including interpolating between grid points. With reference to FIG. 33, blocks 3310, 3320, 3330, 3340 and 3350 are similar to blocks 2910, 2920, 2930, 2940 and 2950, respectively. At block 3360, the method may further interpolate between ones of the plurality of grid points when more than one grid point corresponds to a parameter of the plurality of NMRs.

Figure 34:
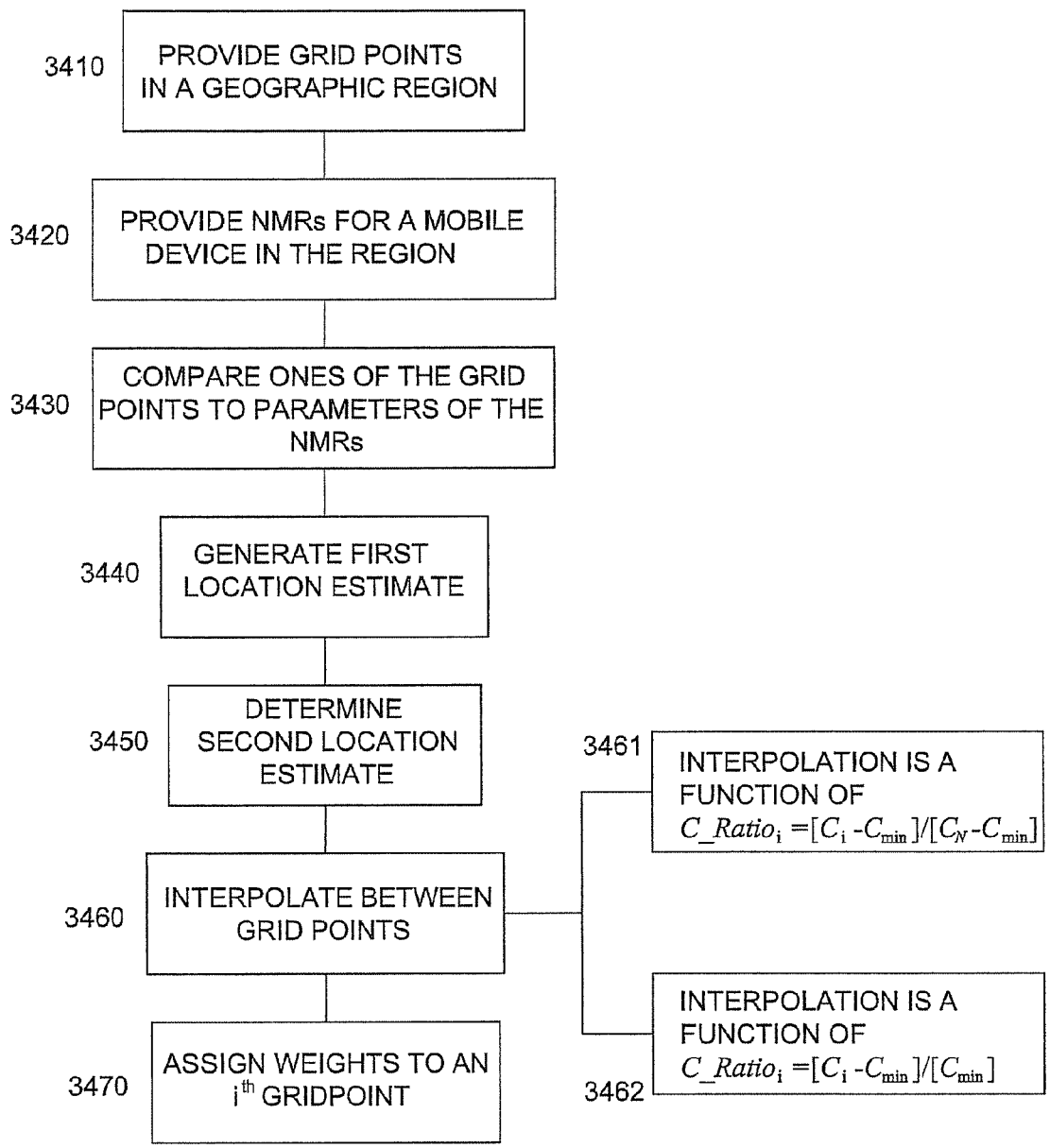
FIG. 34 is a flow chart for a method for locating a mobile device according to another embodiment of the present subject matter including interpolating between grid points and/or assigning weights to selected grid points.

FIG. 34 is a flow chart for a method for locating a mobile device according to another embodiment of the present subject matter including interpolating between grid points and/or assigning weights to selected grid points. With reference to FIG. 34, blocks 3410, 3420, 3430, 3440, 3450 and 3460 are similar to blocks 3310, 3320, 3330, 3340, 3350 and 3360, respectively. At block 3461, the interpolation may be a function of the relationship provided in Equation (3) above. With reference to Equation (3), a grid point having a $C\_Ratio_i$ less than a predetermined threshold may be a candidate grid point for the interpolation in one embodiment and/or a grid point having a distance from the best corresponding grid point less than a predetermined threshold may be a candidate grid point for the interpolation. At block 3462, the interpolation may also be a function of the relationship provided in Equation (4) above. At block 3470, the method may further assign weights to an $i^{th}$ grid point as a function of the relationship provided in Equation (5) above.

Figure 35:
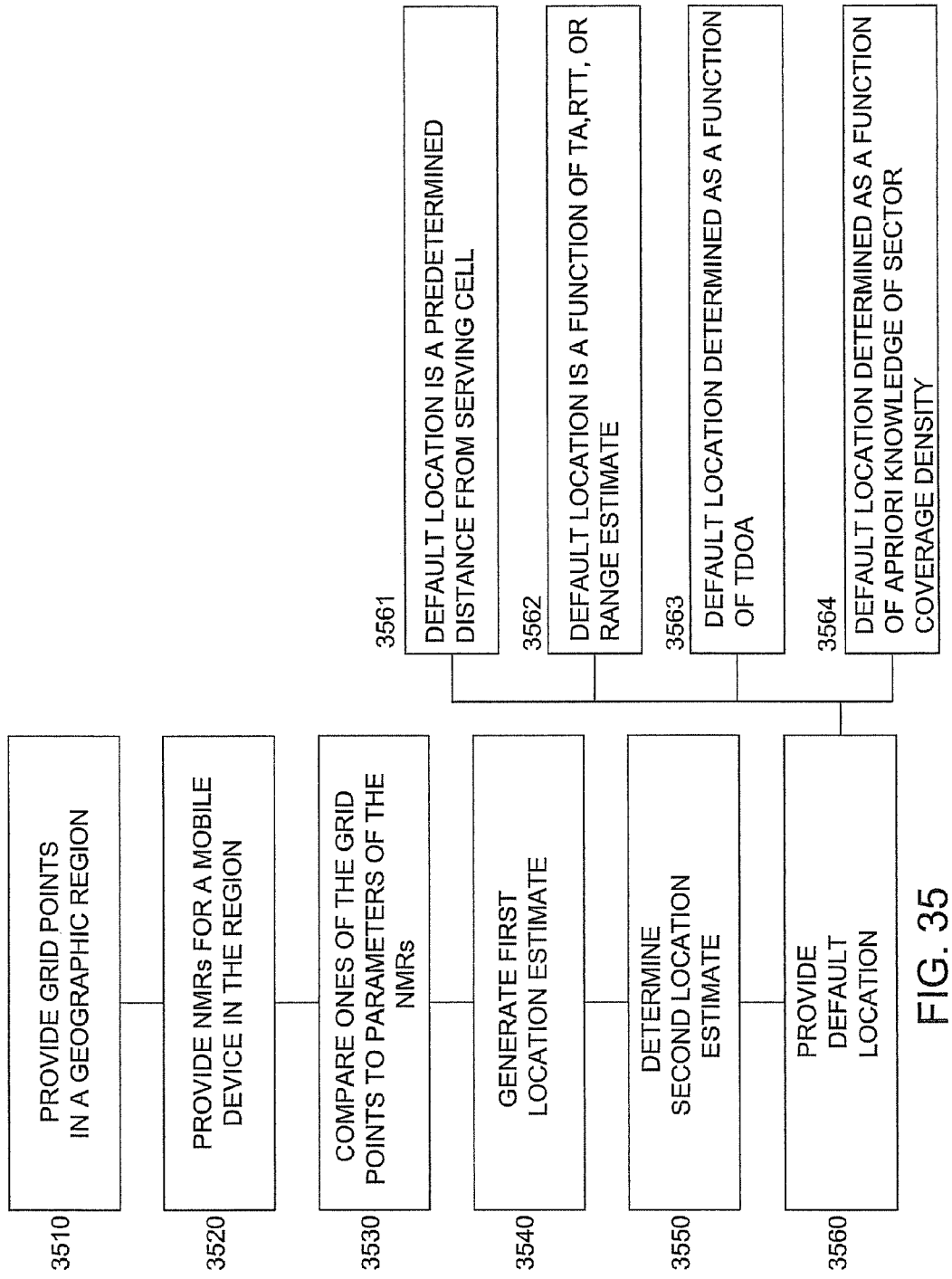
FIG. 35 is a flow chart for a method for locating a mobile device according to another embodiment of the present subject matter including providing a default location.

FIG. 35 is a flow chart for a method for locating a mobile device according to another embodiment of the present subject matter including providing a default location. With reference to FIG. 35, blocks 3510, 3520, 3530, 3540, and 3550 are similar to blocks 2910, 2920, 2930, 2940 and 2950, respectively. At block 3560, the method may further comprise providing a default location for the second location estimate if a second location estimate cannot be determined as a function of at least one of the generated first location estimates. In one embodiment at block 3561, the default location may be a predetermined distance from a serving cell serving the mobile device at a heading along a serving sector azimuth. In another embodiment at block 3562, the default location may be a function of timing advance or round trip time and/or may be an approximate range estimate from a serving cell serving the mobile device. In an additional embodiment in block 3563, the default location may be a region determined as a function of a TDOA measurement and/or where the region is the intersection of a hyperbola defined by said TDOA with a timing advance region applicable to a serving cell serving the mobile device. In yet a further embodiment in block 3564, the default location may be determined as a function of a priori knowledge of sector coverage density.

Figure 36:
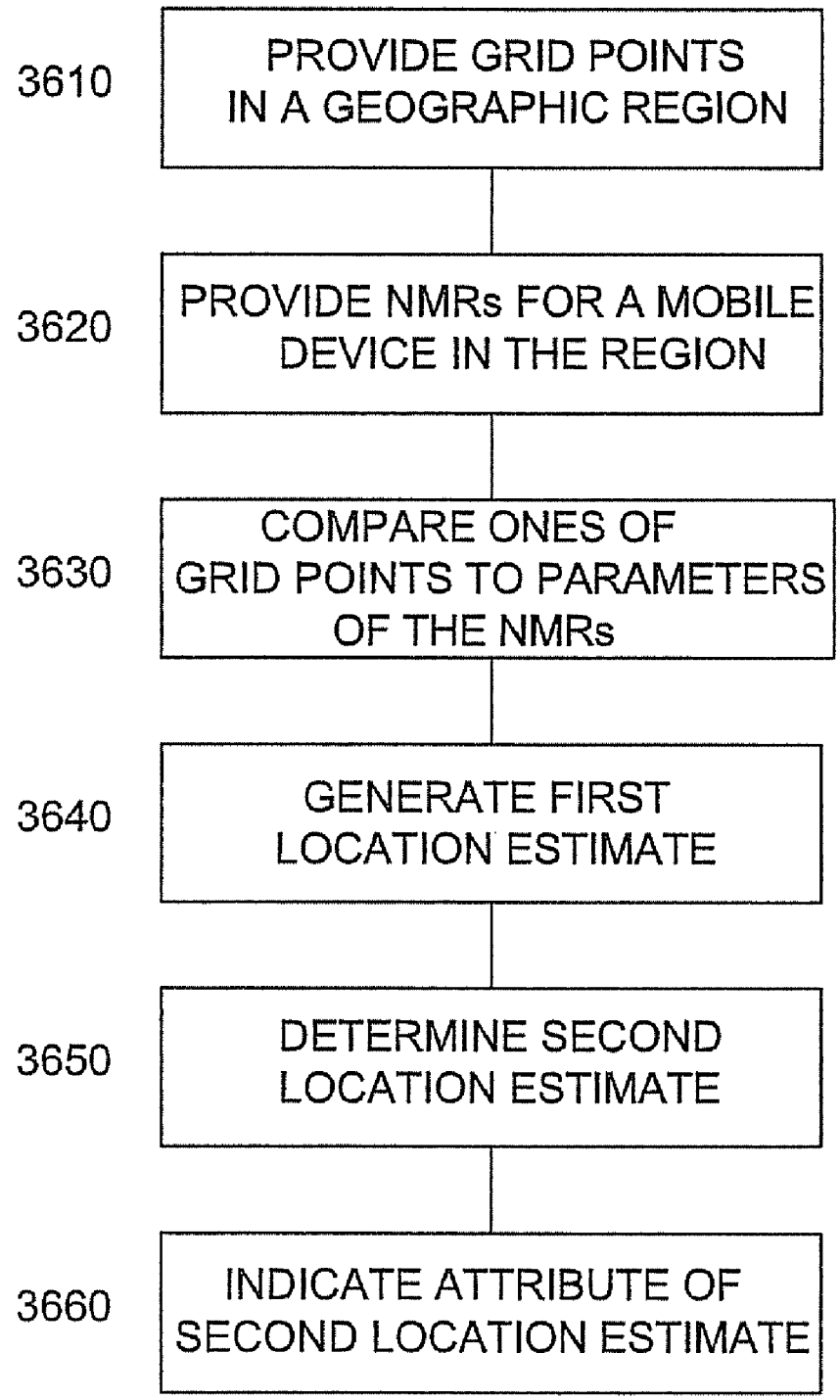
FIG. 36 is a flow chart for a method of improving a location estimate of a mobile device.

FIG. 36 is a flow chart for a method of improving a location estimate of a mobile device. With reference to FIG. 36, at block 3610, a plurality of grid points in a geographic region may be provided and at block 3620, a set of NMRs for a mobile device in the geographic region may be provided. The set of NMRs may or may not include one or more subsets of NMRs. At block 3630, ones of the plurality of grid points may be compared to at least one parameter of a subset of the NMRs, and at block 3640, a first location estimate of the mobile device may be generated for each subset of NMRs. A second location estimate of the mobile device may be determined as a function of at least one of the generated first location estimates at block 3650, and at block 3660, an attribute of the second location estimate may be indicated as a function of a parameter of a subset of the NMRs. In additional embodiments, the attribute may be determined as a function of any one or combination of a fraction of first location estimates corresponding with the second location estimate and a fraction of total first location estimates that lie within a predetermined distance of the second location estimate.

Figure 37:
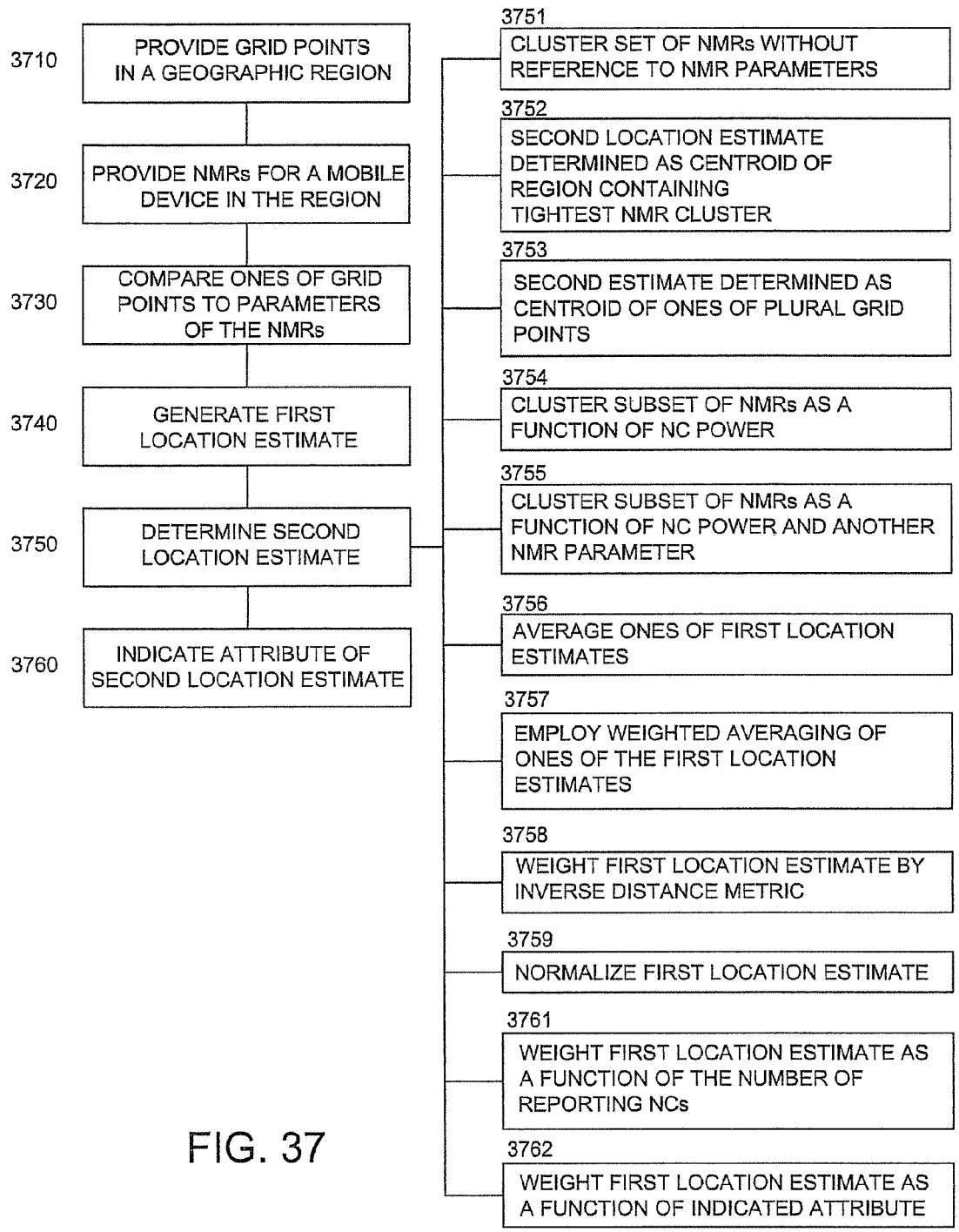
FIG. 37 is a flow chart for a method of improving a location estimate of a mobile device according to another embodiment of the present subject matter.

FIG. 37 is a flow chart for a method of improving a location estimate of a mobile device according to another embodiment of the present subject matter. With reference to FIG. 37, blocks 3710, 3720, 3730, 3740, 3750 and 3760 are similar to blocks 3610, 3620, 3630, 3640, 3650 and 3660, respectively. At block 3751, the determination of a second location estimate may further comprise clustering the set of NMRs without reference to parameters in any of the subsets of NMRs. At block 3752, the second location estimate may be determined as the centroid of a region containing the tightest cluster of NMRs in the set of NMRs. The cluster may or may not possess an aggregate measure higher than a predetermined threshold. At block 3753, the second location estimate may be determined as the centroid of ones of the plurality of grid points occurring most often in the set of NMRs. At block 3754, the determination of a second location estimate may further comprise clustering a subset of NMRs as a function of power of neighboring cells. At block 3755, the determination of a second location estimate may further comprise clustering a subset of NMRs as a function of power of neighboring cells and another parameter in the subset. At block 3756, the determination of a second location estimate may further comprise averaging two or more first location estimates. At block 3757, the determination of a second location estimate may also further comprise employing a weighted averaging of ones of the first location estimates. In another embodiment, at block 3758, the determination of a second location estimate may further comprise weighting a first location estimate by an inverse of a distance metric. At block 3759, the determination of a second location estimate may also comprise normalizing a first location estimate by a sum of an inverse of a distance metric, and at block 3761, the determination of a second location estimate may further comprise weighting a first location estimate as a function of the number of reporting neighboring cells to a serving cell serving the mobile device. In another embodiment at block 3762, the determination of a second location estimate may further comprise weighting a first location estimate as a function of the indicated attribute. Exemplary weighting may be, but is not limited to, a Mahalanobis distance, a probability density function.

Figure 38:
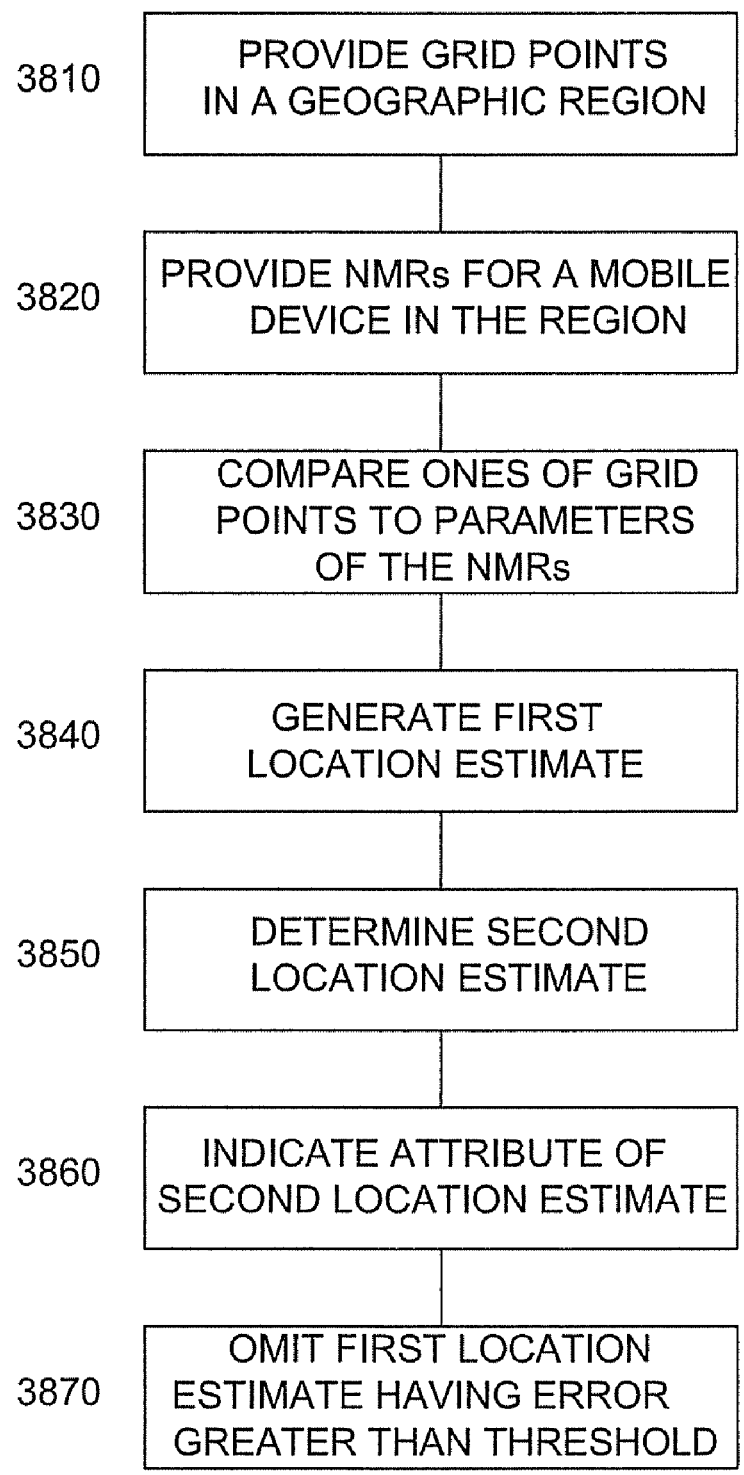
FIG. 38 is a flow chart for a method of improving a location estimate of a mobile device according to another embodiment of the present subject matter including omitting a first location estimate.

FIG. 38 is a flow chart for a method of improving a location estimate of a mobile device according to another embodiment of the present subject matter including omitting a first location estimate. With reference to FIG. 38, blocks 3810, 3820, 3830, 3840, 3850 and 3860 are similar to blocks 3610, 3620, 3630, 3640, 3650 and 3660, respectively. At block 3870, the method may further omit a first location estimate having an error greater than a predetermined threshold.

Figure 39:
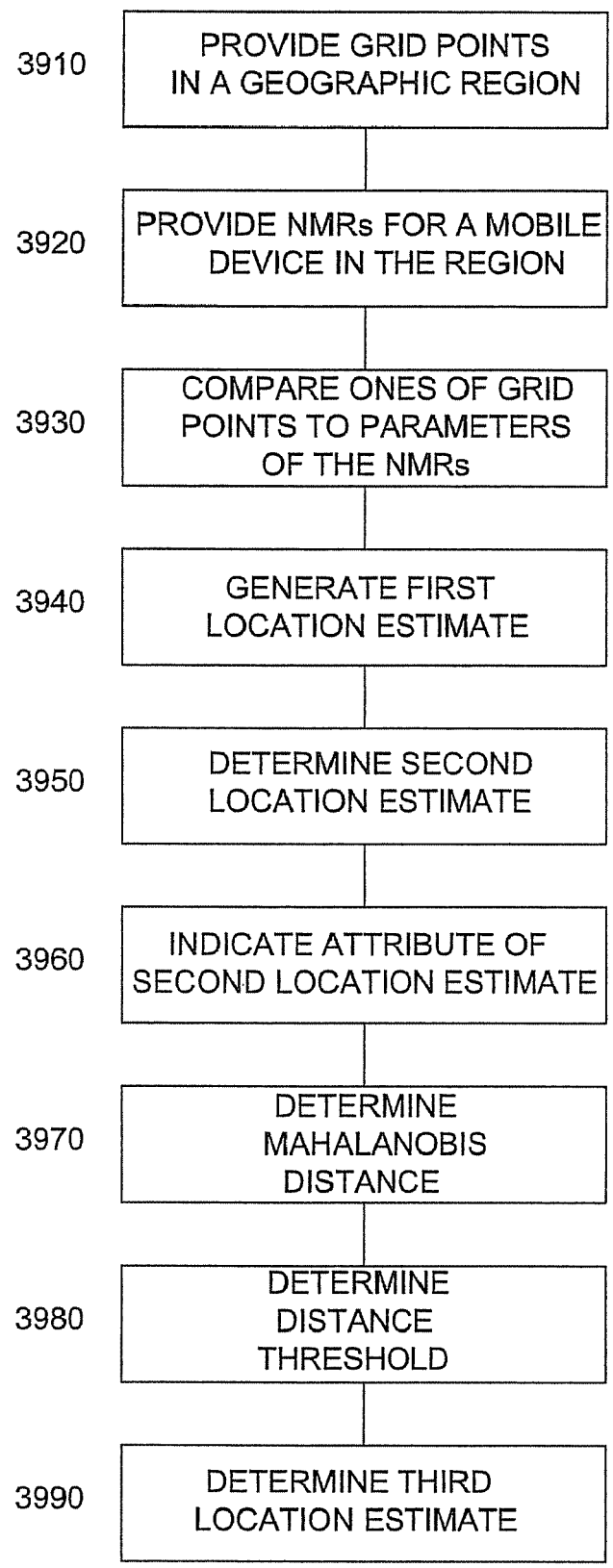
FIG. 39 is a flow chart for a method for locating a mobile device according to one embodiment of the present subject matter including identifying and omitting outlier first location estimates.

FIG. 39 is a flow chart for a method for locating a mobile device according to one embodiment of the present subject matter including identifying and omitting outlier first location estimates. With reference to FIG. 39, blocks 3910, 3920, 3930, 3940, 3950 and 3960 are similar to blocks 3610, 3620, 3630, 3640, 3650 and 3660 respectively. At block 3970, the method may further determine a Mahalanobis distance from each first location estimate to the second location estimate and at block 3980, determine a distance threshold from a median of the determined Mahalanobis distances multiplied by a predetermined factor. At block 3990, a third location estimate may then be determined by averaging two or more of the first location estimates. In such a determination the first location estimates having a Mahalanobis distance to the second location estimate greater than a predetermined distance threshold may be omitted from the third location estimate determination.

Figure 40:
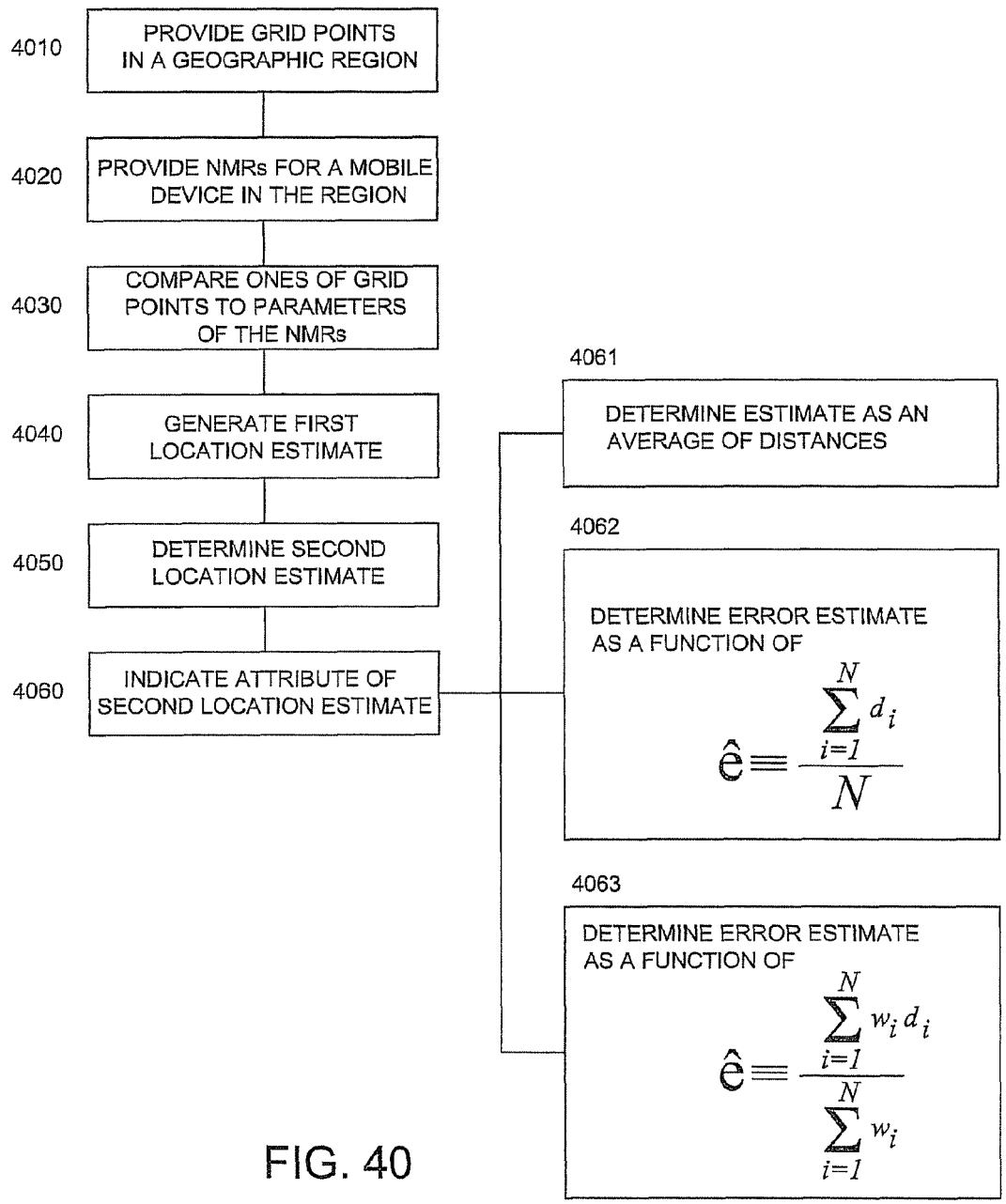
FIG. 40 is a flow chart for a method of improving a location estimate of a mobile device according to a further embodiment of the present subject matter.

FIG. 40 is a flow chart for a method of improving a location estimate of a mobile device according to a further embodiment of the present subject matter. With reference to FIG. 40, blocks 4010, 4020, 4030, 4040, 4050 and 4060 are similar to blocks 3610, 3620, 3630, 3640, 3650 and 3660, respectively. At block 4061, the indication of an attribute of the second location estimate may further comprise determining an error estimate as an average of distances from each first location estimate to the second location estimate. In one embodiment at block 4062, the error estimate may be determined as a function of the relationship provided in Equation (1) above. In a further embodiment at block 4063, the error estimate may be determined as a function of the relationship provided in Equation (2) above. With reference to Equation (2), exemplary weighting factors may be, but are not limited to probabilities determined during the first location estimate generation, probabilities determined during the second location estimate determination, distortion function values determined during the first location estimate generation, distortion function values determined during the second location estimate determination, and combinations thereof. In yet another embodiment in block 4064, the error estimate may be determined as a function of subset NMR cluster separation between a highest aggregate weighted cluster.

Figure 41:
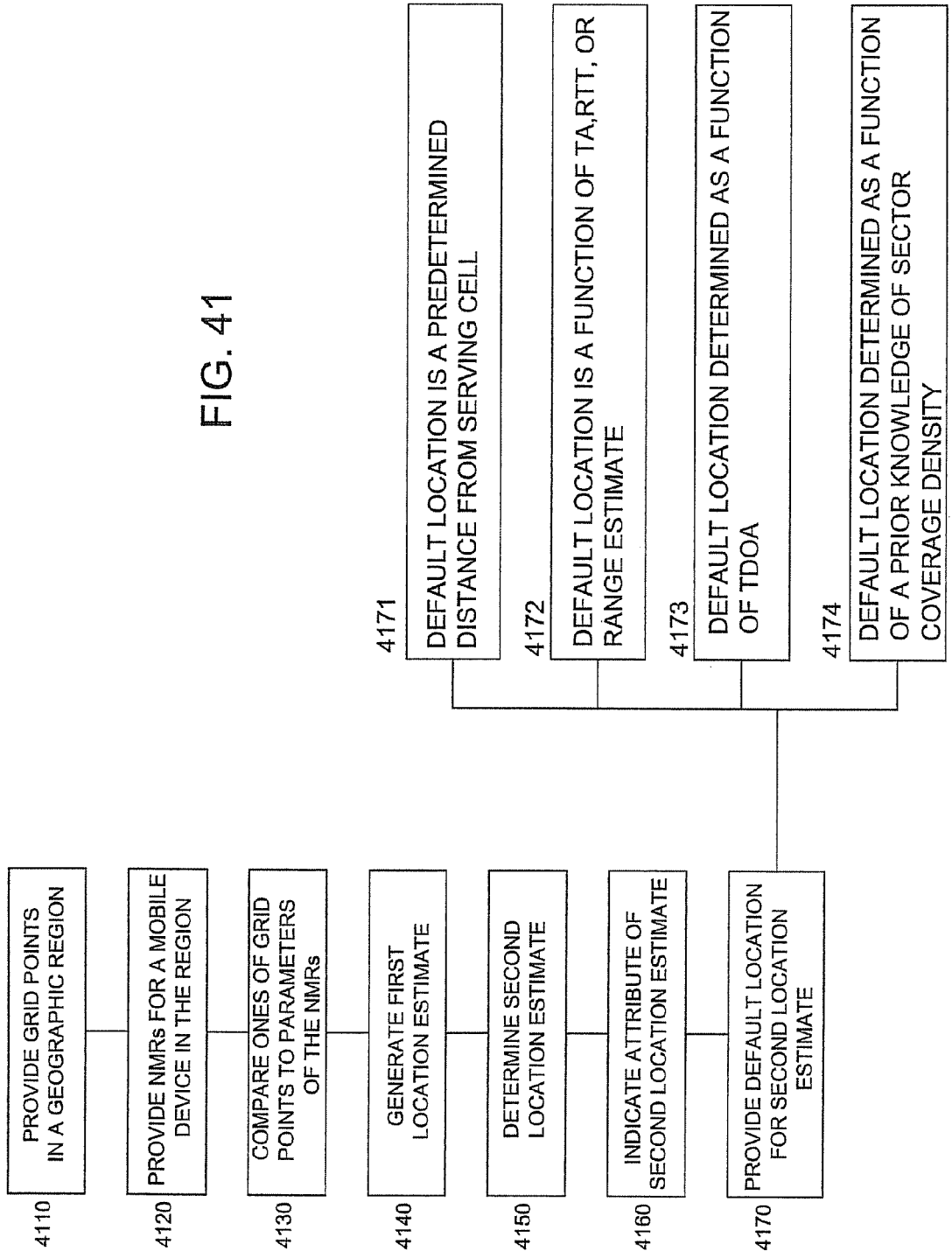
FIG. 41 is a flow chart for a method of improving a location estimate of a mobile device according to a further embodiment of the present subject matter including providing a default location.

FIG. 41 is a flow chart for a method of improving a location estimate of a mobile device according to a further embodiment of the present subject matter including providing a default location. With reference to FIG. 41, blocks 4110, 4120, 4130, 4140, 4150 and 4160 are similar to blocks 3610, 3620, 3630, 3640, 3650 and 3660, respectively. At block 4170, a default location may be provided for the second location estimate if the attribute is less than a predetermined threshold. In one embodiment at block 4171, the default location may be a predetermined distance from a serving cell serving the mobile device at a heading along a serving sector azimuth. In another embodiment at block 4172, the default location may be a function of timing advance or round trip time and/or may be an approximate range estimate from a serving cell serving the mobile device. In an additional embodiment in block 4173, the default location may be a region determined as a function of a TDOA measurement and/or where the region is the intersection of a hyperbola defined by said TDOA with a timing advance region applicable to a serving cell serving the mobile device. In yet a further embodiment in block 4174, the default location may be determined as a function of a priori knowledge of sector coverage density.

As shown by the various configurations and embodiments illustrated in FIGS. 1-41, a method and system for optimizing a location estimate for a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:
1. A method of locating a mobile device comprising the steps of:
  (a) providing a plurality of grid points in a geographic region using a processor in a component of a communications network, each of said grid points including at least one characterizing parameter of calibration data;
  (b) providing a plurality of network measurement reports for a mobile device in the geographic region;
  (c) comparing data values associated with ones of said plurality of grid points to at least one parameter of ones of said plurality of network measurement reports;

(d) generating a first location estimate of the mobile device for each of said ones of said plurality of network measurement reports ("NMR") based on the comparison performed in step (c);
(e) determining a second location estimate of the mobile device as a function of at least one of said generated first location estimates; and
(f) interpolating between ones of said plurality of grid points when more than one grid point corresponds to said at least one parameter of said plurality of network measurement reports,
wherein said interpolating is a function of the following relationship:

$$C\_Ratio_i = [C_i - C_{min}]/[C_N - C_{min}]$$

for a set of N grid points, N>1, where $C_i$ is a metric associated with an $i^{th}$ grid point, $C_N$ is a metric associated with the worst grid point, and $C_{min}$ is a metric associated with the best corresponding grid point.

2. The method of claim 1 further comprising the step of identifying and omitting outlier first location estimates by:
(i) determining a Mahalanobis distance from each first location estimate to the second location estimate;
(ii) determining a distance threshold from a median of the Mahalanobis distances multiplied by a predetermined factor; and
(iii) determining a third location estimate by averaging two or more of said first location estimates,
wherein first location estimates having a Mahalanobis distance to the second location estimate greater than the distance threshold are omitted from said determined third location estimate.

3. The method of claim 1 wherein determining a second location estimate further comprises averaging two or more first location estimates.

4. The method of claim 1 further comprising the step of omitting a first location estimate having an error estimate greater than a predetermined threshold.

5. The method of claim 1 wherein determining a second location estimate further comprises employing a weighted averaging of ones of said first location estimates.

6. The method of claim 1 wherein determining a second location estimate further comprises weighting a first location estimate by an inverse of a distance metric.

7. The method of claim 1 wherein determining a second location estimate further comprises normalizing a first location estimate by a sum of an inverse of a distance metric.

8. The method of claim 1 wherein determining a second location estimate further comprises weighting a first location estimate as a function of the number of reporting neighboring cells to a serving cell serving said mobile device.

9. The method of claim 1 wherein a grid point having a $C\_Ratio_i$ less than a predetermined threshold is a candidate grid point for said interpolating.

10. The method of claim 1 wherein a grid point having a distance from the best corresponding grid point less than a predetermined threshold is a candidate grid point for said interpolating.

11. The method of claim 1 wherein comparing ones of said plurality of grid points further comprises generating a distortion measure which is a function of a combination of parameters of ones of said plurality of network measurement reports and corresponding parameters of ones of said plurality of grid points.

12. The method of claim 11 wherein said distortion measure is selected from the group consisting of: a Mahalanobis distance; a comparison of received signal strengths of a serving cell and a neighboring cell between ones of said plurality of NMRs and grid points; a comparison of received signal strengths of a neighboring cell between ones of said plurality of NMRs and grid points; a comparison of received signal strengths of a first common neighboring cell and another neighboring cell between ones of said plurality of NMRs and grid points; a comparison of average received signal strengths of reporting neighboring cells and received signal strengths of a neighboring cell between ones of said plurality of NMRs and grid points; a comparison of average received signal strengths of serving and reporting neighbor cells received signal strengths of a selected neighbor or serving cell between ones of said plurality of NMRs and grid points; and any combination thereof.

13. The method of claim 1 further comprising the step of providing a default location for said second location estimate when a second location estimate cannot be determined as a function of at least one of said generated first location estimates.

14. The method of claim 13 wherein said default location is a predetermined distance from a serving cell serving said mobile device at a heading along a serving sector azimuth.

15. The method of claim 13 wherein said default location is a function of timing advance or round trip time.

16. The method of claim 15 wherein said default location is an approximate range estimate from a serving cell serving said mobile device.

17. The method of claim 13 wherein said default location is a region determined as a function of a time difference of arrival ("TDOA") measurement.

18. The method of claim 17 wherein said region is the intersection of a hyperbola defined by said TDOA with a timing advance region applicable to a serving cell serving said mobile device.

19. The method of claim 13 wherein said default location is determined as a function of a priori knowledge of sector coverage density.

20. A method of locating a mobile device comprising the steps of:
(a) providing a plurality of grid points in a geographic region using a processor in a component of a communications network, each of said grid points including at least one characterizing parameter of calibration data;
(b) providing a plurality of network measurement reports for a mobile device in the geographic region;
(c) comparing data values associated with ones of said plurality of grid points to at least one parameter of ones of said plurality of network measurement reports;
(d) generating a first location estimate of the mobile device for each of said ones of said plurality of network measurement reports ("NMR") based on the comparison performed in step (c);
(e) determining a second location estimate of the mobile device as a function of at least one of said generated first location estimates; and
(f) interpolating between ones of said plurality of grid points when more than one grid point corresponds to said at least one parameter of said plurality of network measurement reports,
wherein said interpolating is a function of the following relationship:

$$C\_Ratio_i = [C_i - C_{min}]/[C_{min}]$$

for a set of N grid points, N>1, where $C_i$ is a metric associated with an $i^{th}$ grid point and $C_{min}$ is a metric associated with the best corresponding grid point.

21. A method of locating a mobile device comprising the steps of:
   (a) providing a plurality of grid points in a geographic region using a processor in a component of a communications network, each of said grid points including at least one characterizing parameter of calibration data;
   (b) providing a plurality of network measurement reports for a mobile device in the geographic region;
   (c) comparing data values associated with ones of said plurality of grid points to at least one parameter of ones of said plurality of network measurement reports;
   (d) generating a first location estimate of the mobile device for each of said ones of said plurality of network measurement reports ("NMR") based on the comparison performed in step (c);
   (e) determining a second location estimate of the mobile device as a function of at least one of said generated first location estimates;
   (f) interpolating between ones of said plurality of grid points when more than one grid point corresponds to said at least one parameter of said plurality of network measurement reports; and
   (g) assigning weights to the $i^{th}$ grid point as a function of the following relationship:

$$Wi = \frac{\frac{1}{Ci}}{\sum_{i=1}^{N} \left(\frac{1}{Ci}\right)}$$

for a set of N grid points, N>1, where $C_i$ is a metric associated with an $i^{th}$ grid point.

* * * * *